US012452931B2

(12) United States Patent
Zhou et al.

(10) Patent No.: US 12,452,931 B2
(45) Date of Patent: Oct. 21, 2025

(54) RANDOM ACCESS ASSOCIATED WITH BUFFER STATUS REPORTING

(71) Applicant: Comcast Cable Communications, LLC, Philadelphia, PA (US)

(72) Inventors: Hua Zhou, Vienna, VA (US); Mohammad Ghadir Khoshkholgh Dashtaki, Burnaby (CA); Esmael Hejazi Dinan, McLean, VA (US); Ali Cagatay Cirik, Chantilly, VA (US); Yunjung Yi, Vienna, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 840 days.

(21) Appl. No.: 17/710,179

(22) Filed: Mar. 31, 2022

(65) Prior Publication Data

US 2022/0322459 A1 Oct. 6, 2022

Related U.S. Application Data

(60) Provisional application No. 63/168,625, filed on Mar. 31, 2021.

(51) Int. Cl.

| | |
|---|---|
| ***H04W 74/0833*** | (2024.01) |
| ***H04W 72/1263*** | (2023.01) |
| ***H04W 72/21*** | (2023.01) |
| ***H04W 72/23*** | (2023.01) |
| ***H04W 74/08*** | (2009.01) |
| ***H04W 74/0836*** | (2024.01) |

(Continued)

(52) U.S. Cl.

CPC ... *H04W 74/0841* (2013.01); *H04W 72/1263* (2013.01); *H04W 72/21* (2023.01); *H04W 72/23* (2023.01); *H04W 74/0836* (2024.01); *H04W 74/0866* (2013.01); *H04W 74/0833* (2013.01); *H04W 74/0838* (2024.01); *H04W 80/02* (2013.01)

(58) Field of Classification Search

CPC ......... H04W 74/0841; H04W 72/1263; H04W 72/21; H04W 72/23; H04W 74/0866; H04W 80/02; H04W 74/0838; H04W 28/0278; H04W 74/0836; H04W 74/0833

See application file for complete search history.

(56) References Cited

U.S. PATENT DOCUMENTS

| | | | | |
|---|---|---|---|---|
| 2018/0324872 | A1 | 11/2018 | Babaei et al. | |
| 2020/0022094 | A1 * | 1/2020 | You | H04W 72/21 |
| 2021/0250804 | A1 | 8/2021 | Chen et al. | |

(Continued)

OTHER PUBLICATIONS

3GPP TS 38.321 V16.4.0 (Mar. 2021) 3rd Generation Partnership Project; Technical Specification Group Radio Access Network; NR; Medium Access Control (MAC) protocol specification (Release 16).

(Continued)

*Primary Examiner* — Abdullahi Ahmed
(74) *Attorney, Agent, or Firm* — Banner & Witcoff, Ltd.

(57) ABSTRACT

Wireless communications may comprise one or more random access procedures. A random access procedure may be associated with a buffer status report (BSR). The BSR report may be maintained based on one or more conditions associated with the RA procedure, such as awaiting a random access response, an ongoing RA delay trigger timer, and/or transmission of the BSR.

20 Claims, 40 Drawing Sheets

(51) Int. Cl.

*H04W 74/0838* (2024.01)

*H04W 80/02* (2009.01)

(56) References Cited

U.S. PATENT DOCUMENTS

| | | | | |
|---|---|---|---|---|
| 2021/0250989 | A1* | 8/2021 | Chin | H04W 80/02 |
| 2021/0274555 | A1* | 9/2021 | Alfarhan | H04W 74/0833 |
| 2021/0307108 | A1 | 9/2021 | Babaei | |
| 2021/0314991 | A1 | 10/2021 | Tenny et al. | |
| 2021/0329731 | A1* | 10/2021 | Gu | H04W 76/28 |
| 2021/0360469 | A1* | 11/2021 | Shrestha | H04W 72/23 |
| 2022/0201765 | A1* | 6/2022 | Huang | H04W 24/08 |
| 2022/0369368 | A1* | 11/2022 | Sedin | H04W 72/23 |

OTHER PUBLICATIONS

Aug. 1, 2022—EP Search Report—EP App. No. 22166056.6.

R2-2101580 3GPP TSG-RAN WG2 #113-e, E-meeting, Jan. 25-Feb. 5, 2021, Source: LG Electronics Inc., Title: Discussion on scheduling enhancement.

R2-2101494 3GPP TSG-RAN WG2 #113e, E-Meeting, Jan. 25-Feb. 5, 2021, Source: Ericsson, Title: On Random Access in NTNs.

R2-2101493 3GPP TSG-RAN WG2 #113-e, E-Meeting, Jan. 25-Feb. 5, 2021, Source: Ericsson, Title: On scheduling, HARQ, and DRX for NTNs.

R2-2101254 3GPP TSG-RAN WG2 #113-e, e-Meeting, Jan. 25-Feb. 5, 2021, Source: Thales, Title: Enhancements on UL scheduling for NTN.

R2-2101063 3GPP TSG-RAN WG2 Meeting #113 Electronic, Elbonia, Jan. 25-Feb. 5, 2021, Source: Nokia, Nokia Shanghai Bell, Title: On UL scheduling enhancements and UE-calculated TA report in NTN.

R2- 2100740 3GPP TSG-RAN WG2 Meeting #113e, E-Meeting, Jan. 25-Feb. 5, 2021, Source: Qualcomm Incorporated, Title: Details of the start offset in Random Access procedure.

R2-2100663 3GPP TSG-RAN WG2 Meeting #113-e, Online, Jan. 25-Feb. 5, 2021, Source: Spreadtrum Communications, Title: Discussion on Random Access in NTN.

R2-2100415 TSG-RAN WG2 Meeting #113 electronic, Online, Jan. 25-Feb. 5, 2021, Source: CAICT, Title: Considerations on RACH procedure enhancements in NTN.

R2-2100334 3GPP TSG-RAN WG2 Meeting #113-e, Electronic meeting, Jan. 25-Feb. 5, 2021, Source: CATT, Title: Discussion on UL Scheduling Enhancements in NR NTN.

R2-2100251 3GPP TSG RAN WG2 Meeting #113, e-Meeting, Jan. 25-Feb. 5, 2021, Source: Samsung, Title: RACH Aspects for an NTN—Observations and Proposals.

R2-2100161 3GPP TSG-RAN WG2 Meeting #113-e, Electronic, Jan. 25-Feb. 5, 2021, Source: OPPO, Title: Report of [Post112-e][152][NTN] UL scheduling enhancements.

R2-2010455 e3GPP RAN WG2 Meeting #112e, Nov. 2-13, 2020, Source: InterDigital (email discussion Rapporteur), Title: Summary of [Post111-e][908][NTN] RACH and HARQ feedback aspects.

R2-2010335 3GPP TSG-RAN WG2 #112-e, E-meeting , Nov. 2-13, 2020, Source: LG Electronics Inc., Title: Discussion on scheduling enhancement.

R2-2010168 3GPP TSG-RAN WG2 #112, E-Meeting , Nov. 2-13, 2020, Source: Ericsson, Title: On scheduling, HARQ, and DRX for NTN.

R2-2009895 3GPP TSG-RAN WG2 Meeting #112 electronic, Online, Nov. 2020, Source: Sony, Title: Other MAC enhancements in NTN.

R2-2009064 3GPP TSG-RAN WG2 #112-e, e-Meeting, Nov. 2-13, 2020, Source: Nomor Research GmbH, Thales, Title: Enhancements on UL scheduling for NTN.

R2-2009063 3GPP TSG-RAN WG2 #112-e, e-Meeting, Nov. 2-13, 2020, Source: Nomor Research GmbH, Thales, Title: Enhancements for NTN on MAC Layer.

R2-2008214 3GPP RAN WG2 Meeting #111e, Aug. 17-28, 2020, Source: InterDigital (email discussion Rapporteur), Title: Summary of [AT111][107][NTN] Pre-compensation and other MAC issues Phase 2.

R2-2008188 3GPP RAN WG2 Meeting #111e, Aug. 17-28, 2020, Source: InterDigital (email discussion Rapporteur), Title: Summary of [AT111][107][NTN] Pre-compensation and other MAC issues.

R2-2007888 3GPP TSG-RAN WG2 #111-e, E-meeting, Aug. 17-28, 2020, Source: LG Electronics Inc., Title: Discussion on MAC aspects for NTN.

R2-2007714 3GPP TSG-RAN WG2 Meeting #111, E-meeting, Aug. 17-28, 2020, Source: Ericsson, Title: On scheduling, HARQ, DRX, RLC, and PDCP for NTN.

R2-2007186 3GPP TSG-RAN WG2 Meeting #111 electronic, Online, Aug. 17-28, 2020, Source: Sony, Title: MAC enhancements in NTN.

R2-2007176 3GPP TSG RAN WG2 #111, e-Meeting, Aug. 17-28, 2020, Source: Xiaomi, Title: Discussion on UL scheduling enhancement.

R2-2007056 3GPP TSG-RAN WG2 Meeting #111-e, Online, Aug. 17-28, 2020, Source: Spreadtrum Communications, Title: Introducing offsets in MAC.

R2-2006974 3GPP TSG-RAN WG2 Meeting #111e, E-Meeting, Aug. 17-28, 2020, Source: Qualcomm Inc., Title: UP aspects including Random Access procedure enhancements.

R2-2006702 3GPP TSG-RAN WG2 #111-e, e-Meeting, Aug. 17-28, 2020, Source: Nomor Research GmbH, Thales, Title: Enhancements for NTN on MAC Layer—Impact Analysis on TS.

3GPP TS 38.331 V16.3.1 (Jan. 2021) 3rd Generation Partnership Project; Technical Specification Group Radio Access Network; NR; Radio Resorce Control (RRC) protocol specification (Release 16).

3GPP TS 38.321 V16.3.0 (Dec. 2020) 3rd Generation Partnership Project; Technical Specification Group Radio Access Network; NR; Medium Access Control (MAC) protocol specification (Release 16).

3GPP TS 38.300 V16.3.0 (Sep. 2020) 3rd Generation Partnership Project; Technical Specification Group Radio Access Network; NR; NR and NG-RAN Overall Description; Stage 2 (Release 16).

3GPP TS 38.214 V16.4.0 (Dec. 2020) 3rd Generation Partnership Project; Technical Specification Group Radio Access Network; NR; Physical layer procedures for data (Release 16).

3GPP TS 38.213 V16.4.0 (Dec. 2020) 3rd Generation Partnership Project; Technical Specification Group Radio Access Network; NR; Physical layer procedures for control (Release 16).

3GPP TS 38.212 V16.4.0 (Dec. 2020) 3rd Generation Partnership Project; Technical Specification Group Radio Access Network; NR; Multiplexing and channel coding (Release 16).

3GPP TS 36.331 V16.3.0 (Dec. 2020), Technical Specification, 3rd Generation Partnership Project; Technical Specification Group Radio Access Network; Evolved Universal Terrestrial Radio Access (E-UTRA); Radio Resource Control (RRC); Protocol specification (Release 16).

* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

```
PhysicalCellGroupConfig ::=        SEQUENCE {
   harq-ACK-SpatialBundlingPUCCH      ENUMERATED {true}
   harq-ACK-SpatialBundlingPUSCH      ENUMERATED {true}
   p-NR-FR1                      P-Max
   pdsch-HARQ-ACK-Codebook          ENUMERATED {semiStatic, dynamic},
   ...,
     pdcch-BlindDetection            SetupRelease { PDCCH-BlindDetection }
   [[
   dcp-Config-r16                SetupRelease { DCP-Config-r16 }
   ...]]
}

DCP-Config-r16 ::=              SEQUENCE {
   ps-RNTI-r16                   RNTI-Value,
   ps-Offset-r16                 INTEGER (1..120),
   sizeDCI-2-6-r16                 INTEGER (1..maxDCI-2-6-Size-r16),
   ps-PositionDCI-2-6-r16            INTEGER (0..maxDCI-2-6-Size-1-r16),
   ps-WakeUp-r16                  ENUMERATED {true}
   ps-TransmitPeriodicL1-RSRP-r16     ENUMERATED {true}
   ps-TransmitOtherPeriodicCSI-r16    ENUMERATED {true}
}
```

FIG. 22A

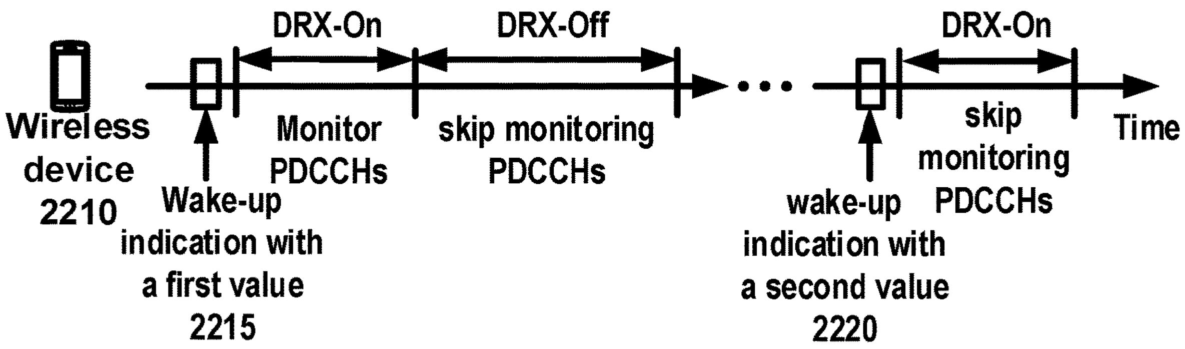

FIG. 22B

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of wireless devices of the slot format, available RB sets, COT duration and search space set group switching |
| 2_1 | Notifying a group of wireless devices of the PRB(s) and OFDM symbol(s) where wireless device may assume no transmission is intended for the wireless device |
| 2_2 | Transmission of TPC commands for PUCCH and PUSCH |
| 2_3 | Transmission of a group of TPC commands for SRS transmissions by one or more wireless devices |
| 2_4 | Notifying a group of wireless devices of the PRB(s) and OFDM symbol(s) where wireless device cancels the corresponding UL transmission from the wireless device |
| 2_5 | Notifying the availability of soft resources |
| 2_6 | Notifying the power saving information outside DRX Active Time for one or more wireless devices |
| 3_0 | Scheduling of NR sidelink in one cell |
| 3_1 | Scheduling of LTE sidelink in one cell |

FIG. 24

| RAT type/ Platform type | Altitude range | Orbit | Typical beam footprint size |
|---|---|---|---|
| LEO satellite | 250 – 1500 km | Circular around the earth | 100 – 500 km |
| MEO satellite | 5000 – 25000 km | | 100 – 500 km |
| GEO satellite | 35,786 km | Notional station keeping position fixed in terms of elevation/azimuth with respect to a given earth point | 200 – 1000 km |
| UAS platform | 8-50 km (20km for HAPS) | | 5 – 200 km |
| HEO platform | 400 – 50000km | Elliptical around the earth | 200 – 1000km |

FIG. 26

| Class of Orbit | Elevation angle (degrees) | | |
|---|---|---|---|
| Altitude (km) | 0 | 10 | 90 |
| LEO satellite | Propagation delay – satellite to UE (millisec) | | |
| 800 | 11.0 | 7.9 | 2.7 |
| 1400 | 14.8 | 11.6 | 4.7 |
| MEO satellite | Propagation delay – satellite to UE (millisec) | | |
| 8000 | 43.0 | 39.4 | 26.7 |
| GEO satellite | Propagation delay – satellite to UE (millisec) | | |
| 35,786 | 138.9 | 135.3 | 119.3 |

Types of non-terrestrial network platforms

FIG. 27

RANDOM ACCESS ASSOCIATED WITH BUFFER STATUS REPORTING

CROSS-REFERENCE TO RELATED APPLICATIONS

This application claims the benefit of U.S. Provisional Application No. 63/168,625, filed on Mar. 31, 2021. The above-referenced application is hereby incorporated by reference in its entirety.

BACKGROUND

Wireless communications may experience delay based on various conditions. For example, a round-trip propagation delay (RTD) between a satellite and other devices in a non-terrestrial network (NTN) may be longer than that of a terrestrial network.

SUMMARY

The following summary presents a simplified summary of certain features. The summary is not an extensive overview and is not intended to identify key or critical elements.

Wireless communications may use one or more random access procedures (e.g., a 2-step RA and/or a 4-step RA). A random access procedure may be initiated by a wireless device after triggering a buffer status report (BSR), for example, based on data being available for uplink transmission. The random access procedure associated with the BSR may encounter various inefficiencies such as additional communication overhead with a base station, triggering parallel BSRs, and/or retriggering of the BSR. Signal propagation delay (e.g., RTD) may be increased in some systems (e.g., in an NTN) and/or disadvantages may result such as increased power consumption of the wireless device, increased uplink interferences to other wireless devices, and/or increased transmission latency of uplink data delivery. Improvements described herein may reduce such inefficiencies and/or disadvantages such as by delaying initiation of a random access procedure after triggering a BSR. An uplink grant, which may accommodate a transmission of the new uplink data, may be received during a delayed random access process, which may avoid a required performance of a random access procedure. Triggering parallel BSRs may be avoided and/or reduced, for example, by selectively determining whether to generate a new packet data unit (e.g., to be transmitted in a message associated with the 4-step RA) based on at least one configuration parameter (e.g., a BSR validation timer, a BSR size threshold, a size of the uplink grant, or a wireless device capability). The retriggering of the BSR may be avoided and/or reduced by keeping the triggered BSR pending, after sending a message associated with the random access procedure, at least until a response to the message is received. The aforementioned approaches may provide advantages such as reduced power consumption of the wireless device, reduced uplink interferences to other wireless devices, and/or reduce transmission latency of uplink data delivery.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 19 shows example logical channel identifier (LCID) values.

FIG. 20 shows example LCID values.

FIG. 22A and FIG. 22B show examples of discontinuous reception (DRX) configurations.

FIG. 24 shows examples of various downlink control information (DCI) formats.

FIG. 26 shows examples of various NTN communications.

FIG. 27 shows examples of various propagation delays of different NTN communications.

DETAILED DESCRIPTION

Figure 1A:
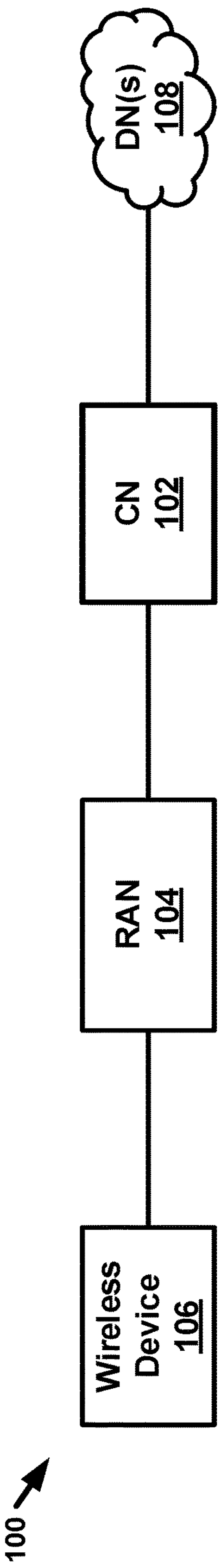
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communication exposure detection and/or reporting.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
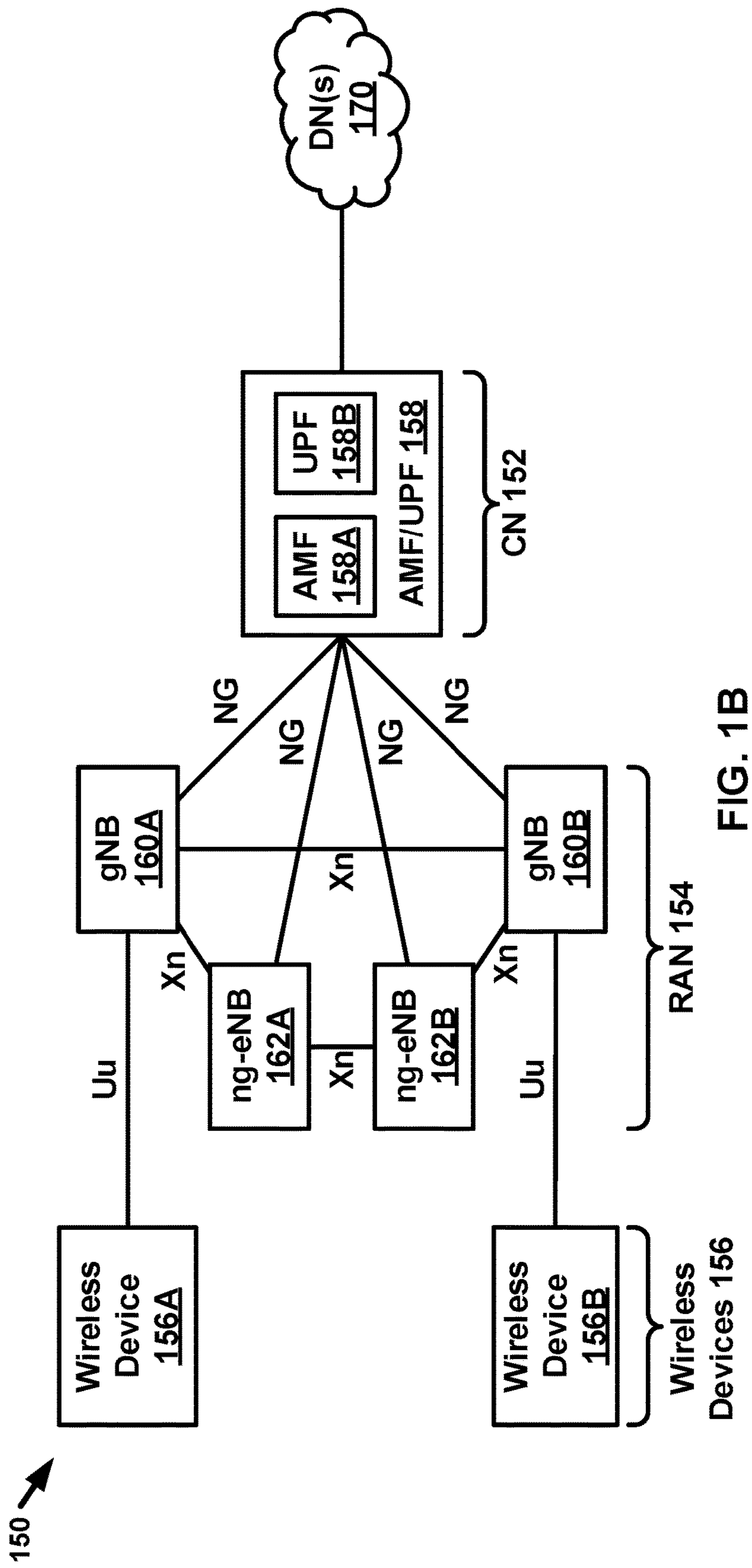

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
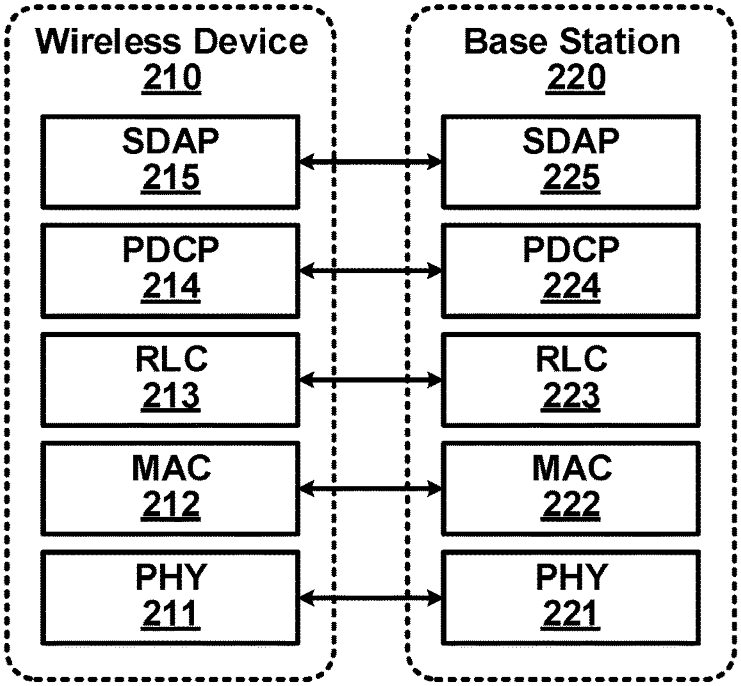
FIG. 2A shows an example user plane.
Figure 2B:
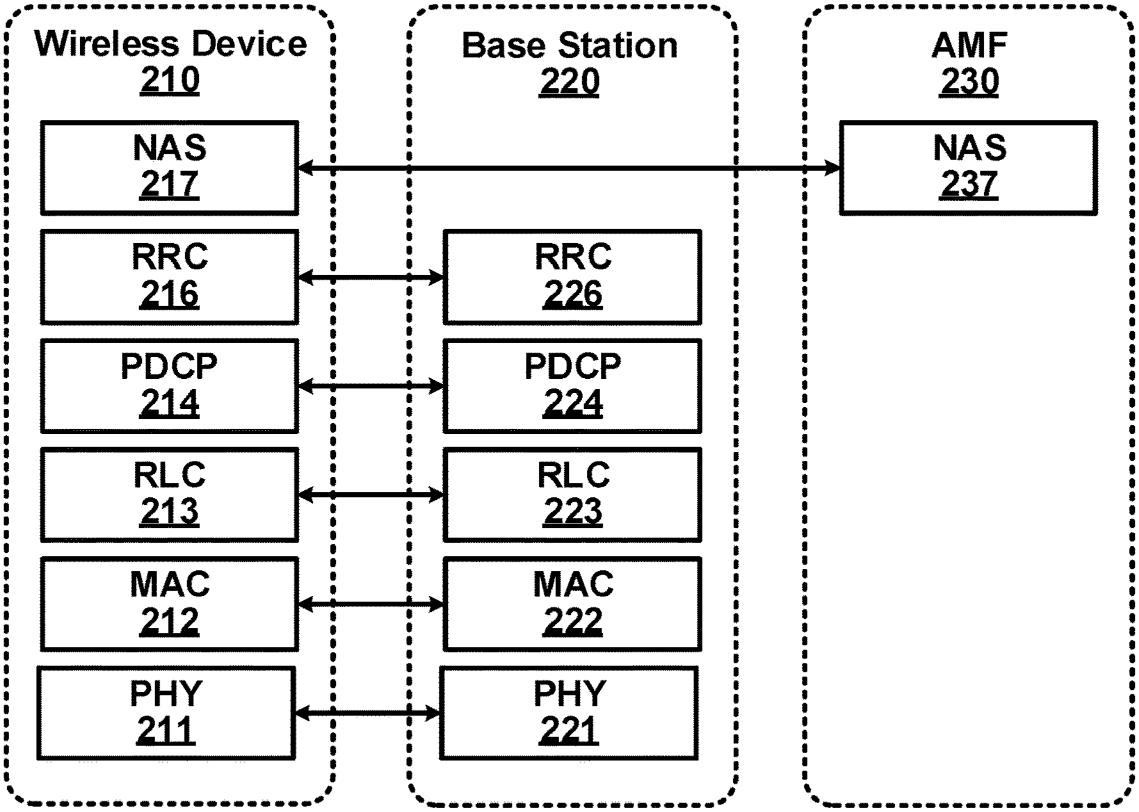
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
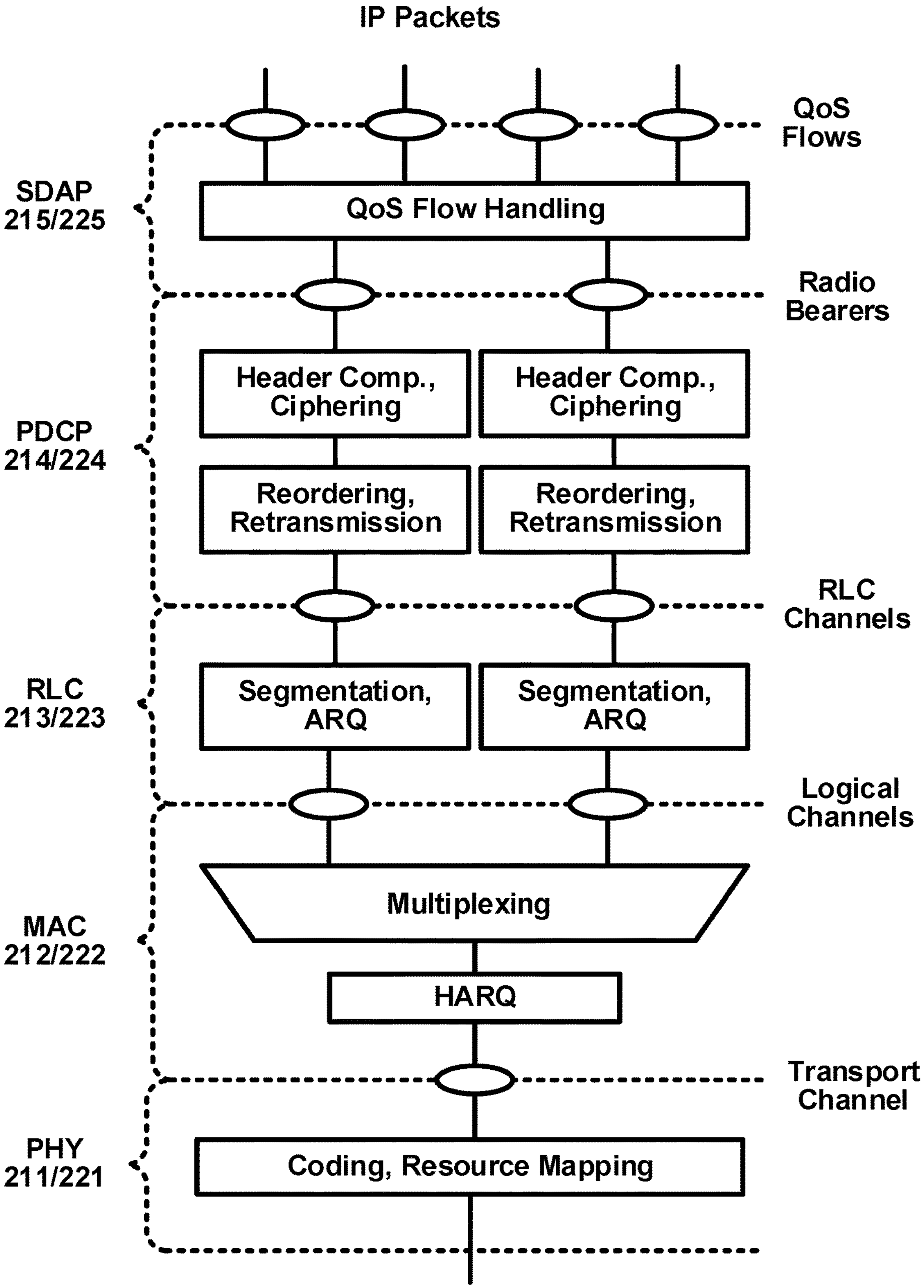
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
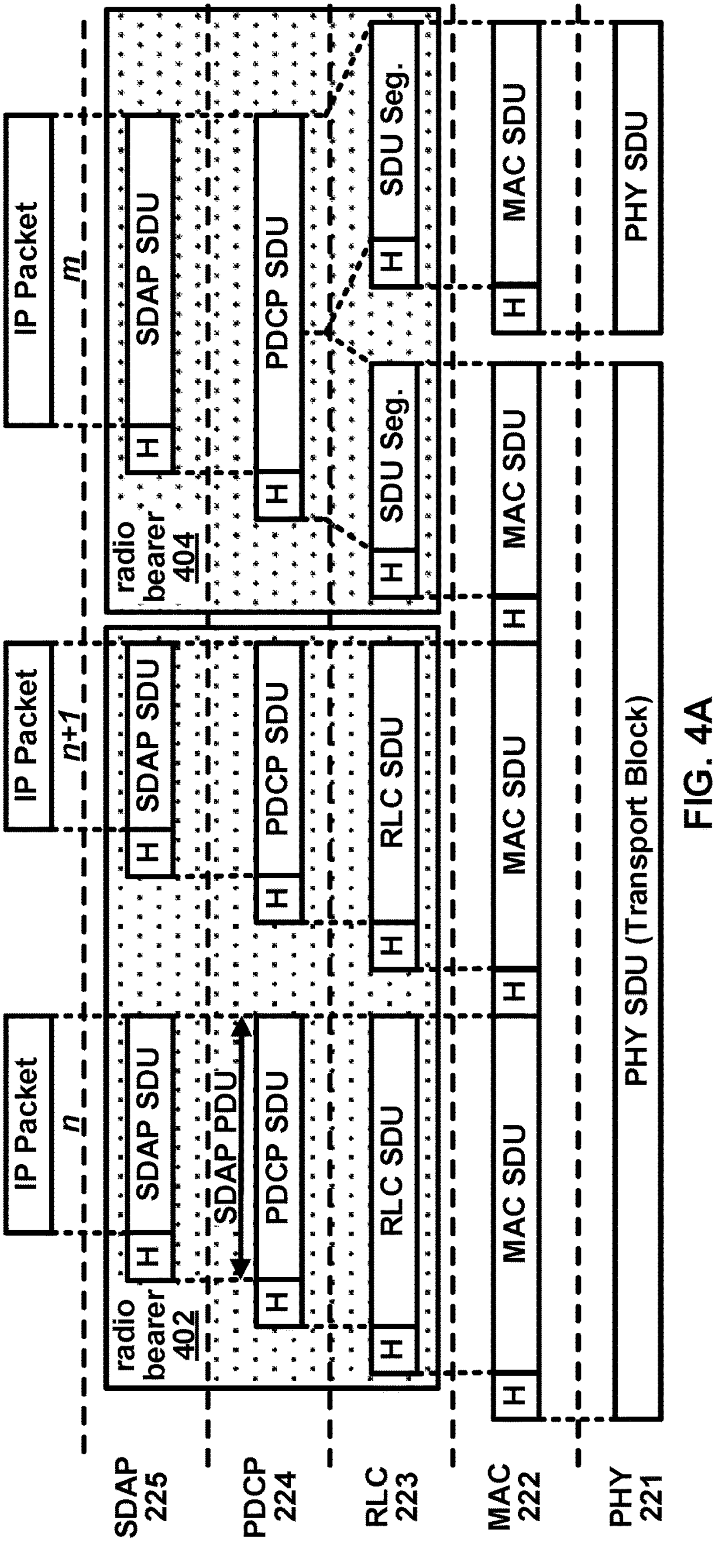
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
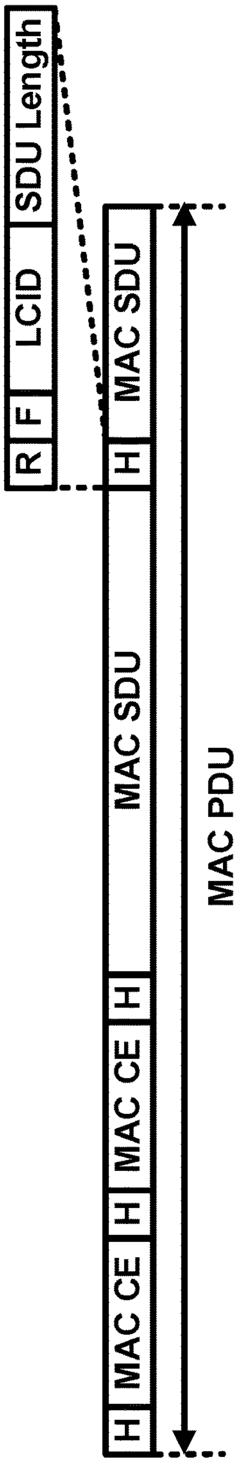
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
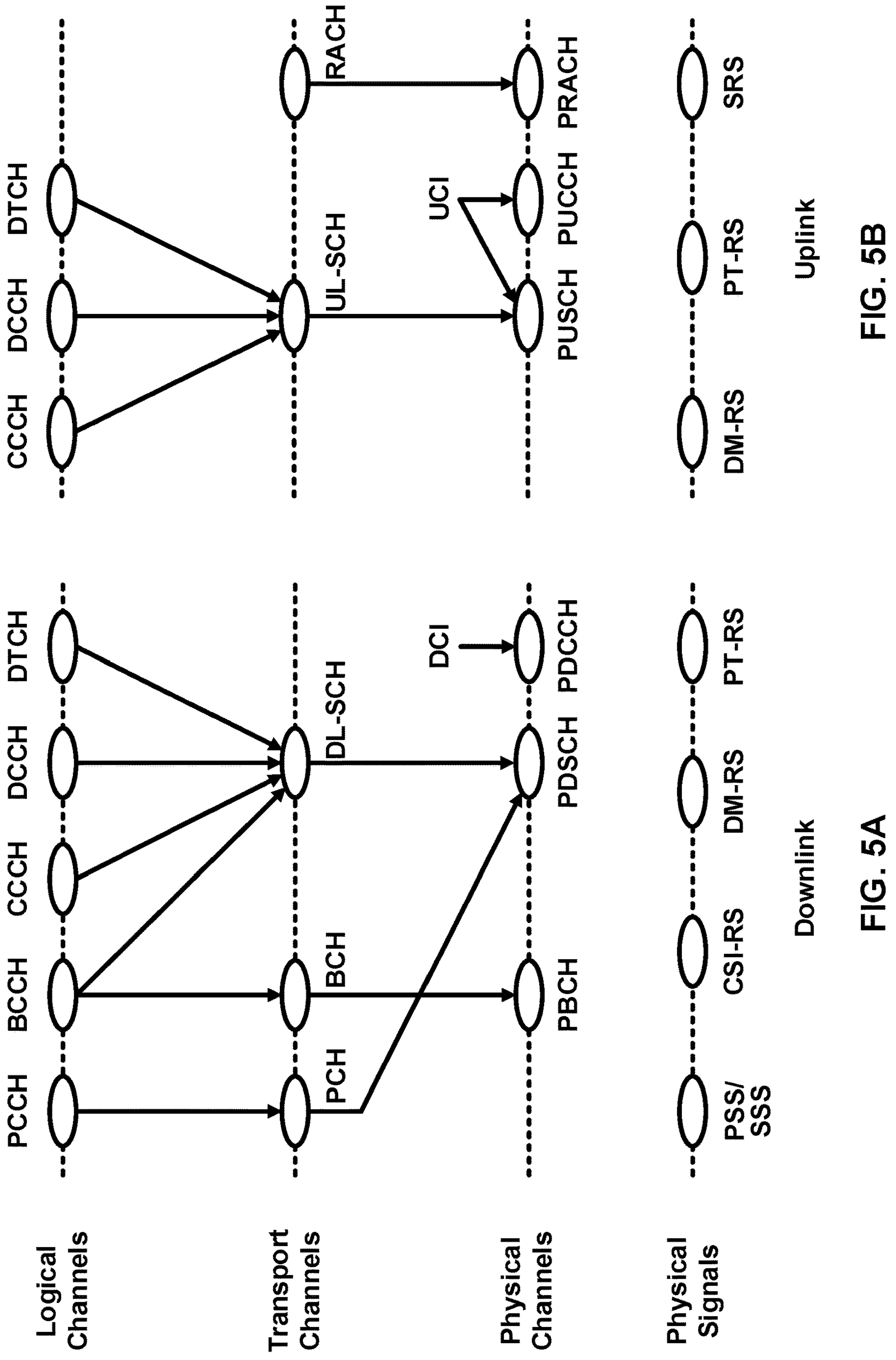
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
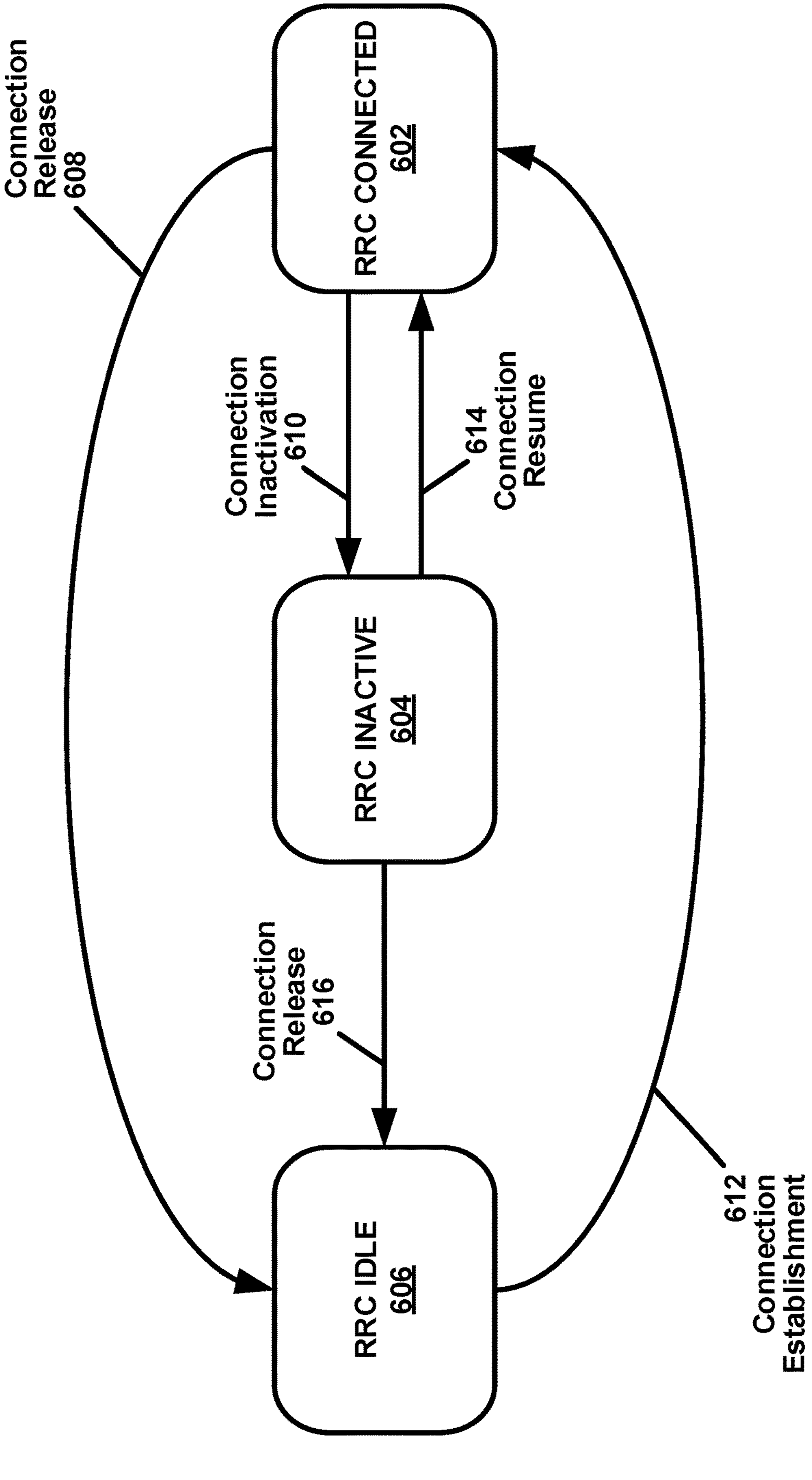
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
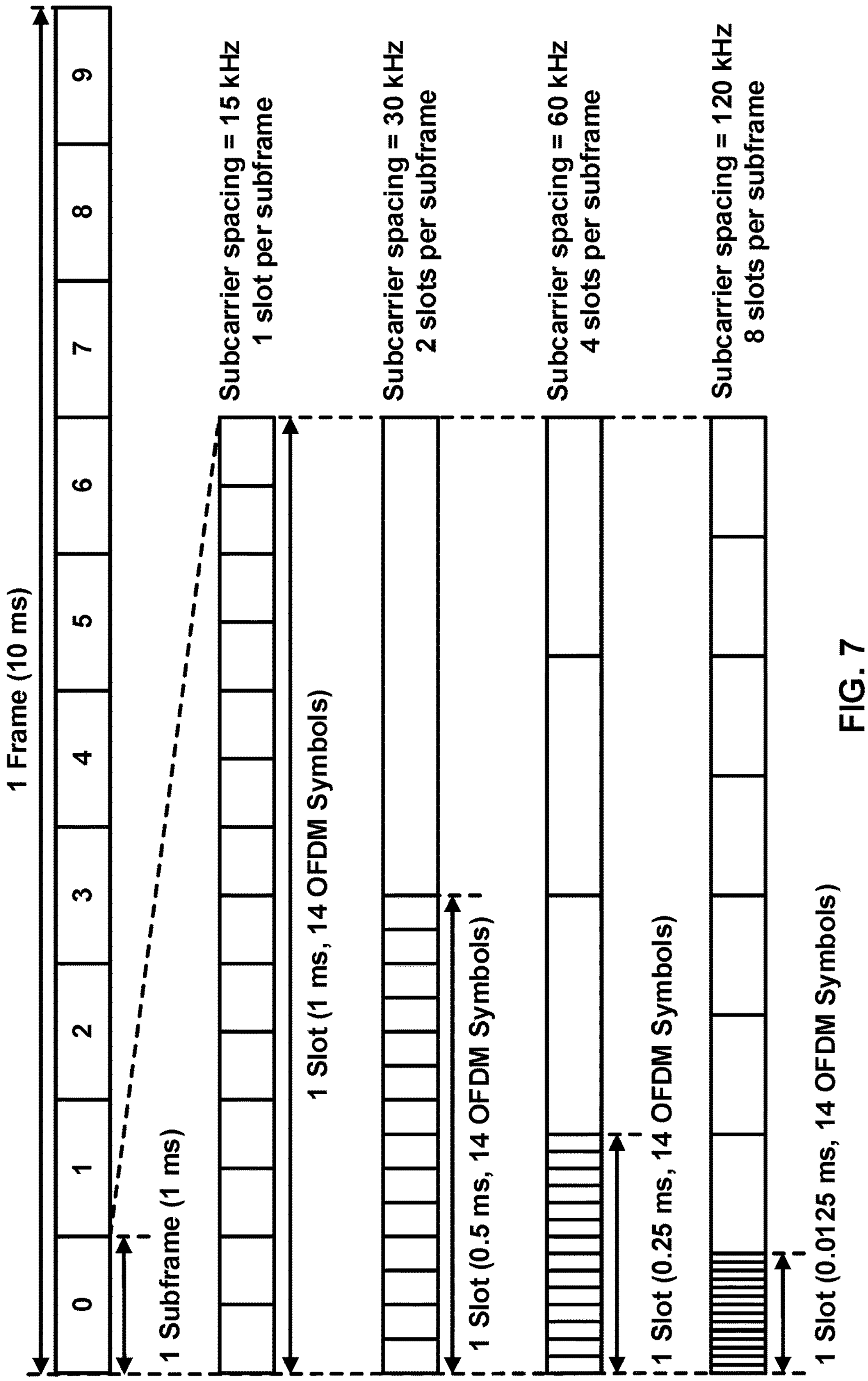
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
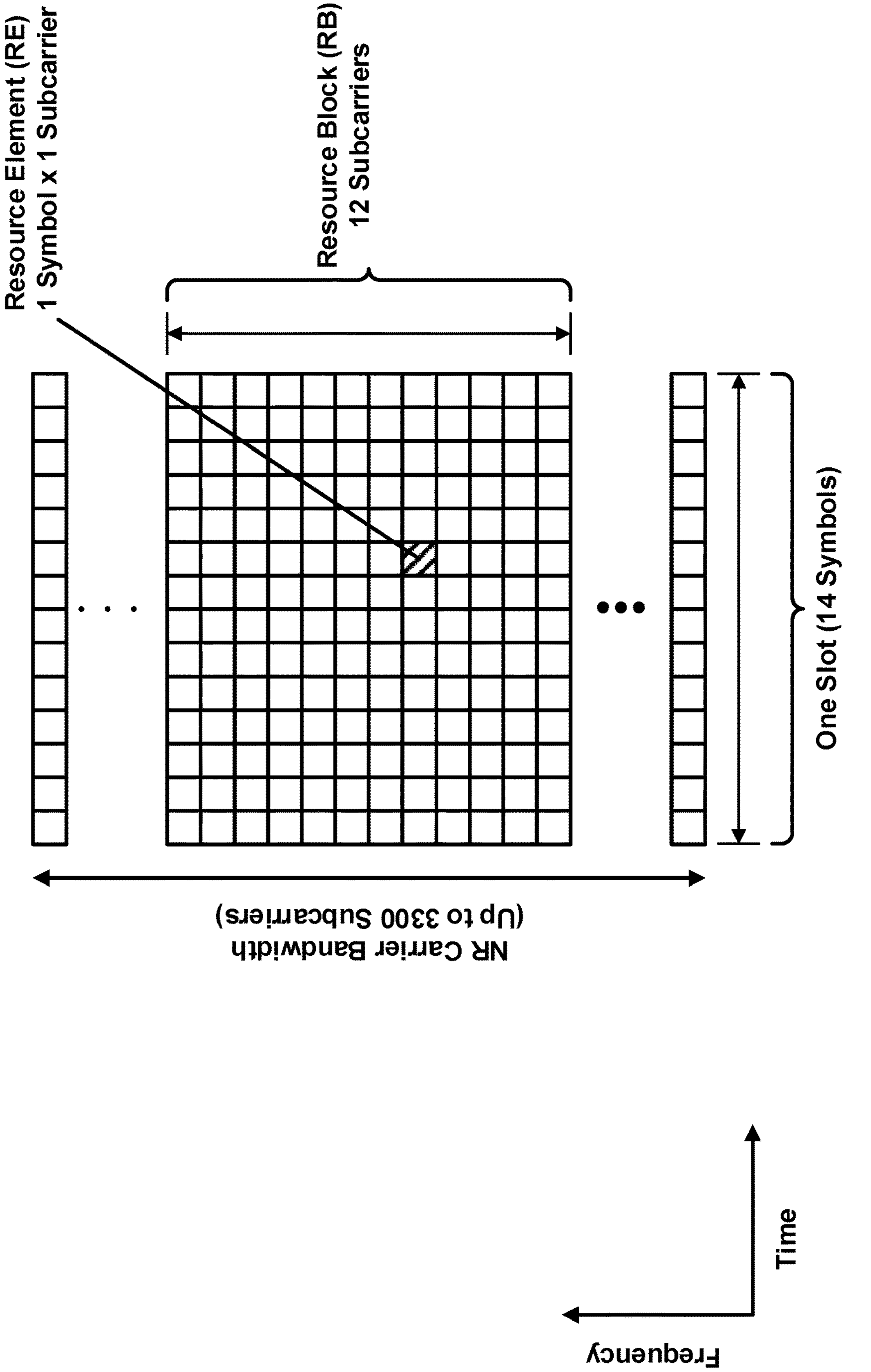
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
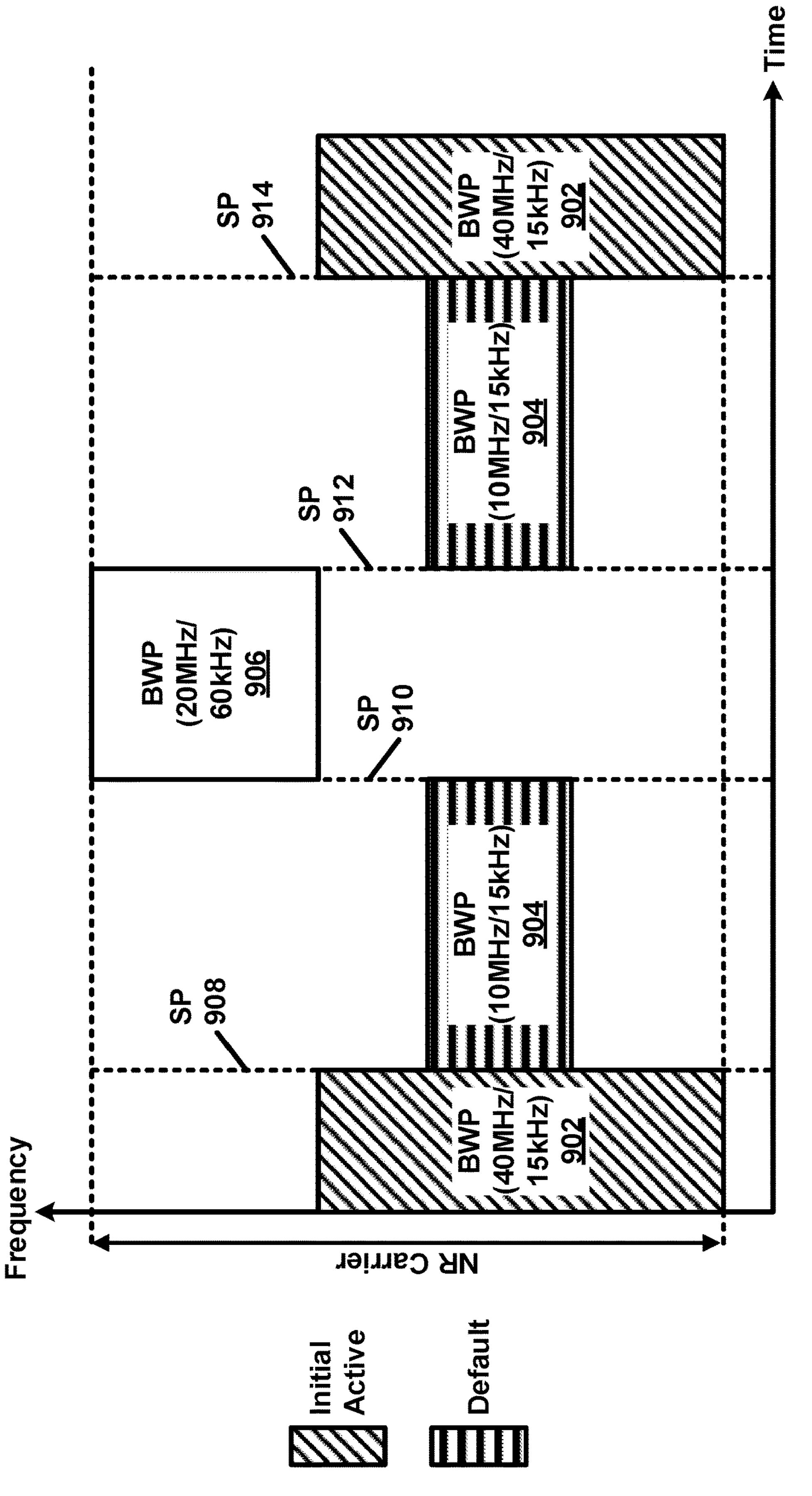
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
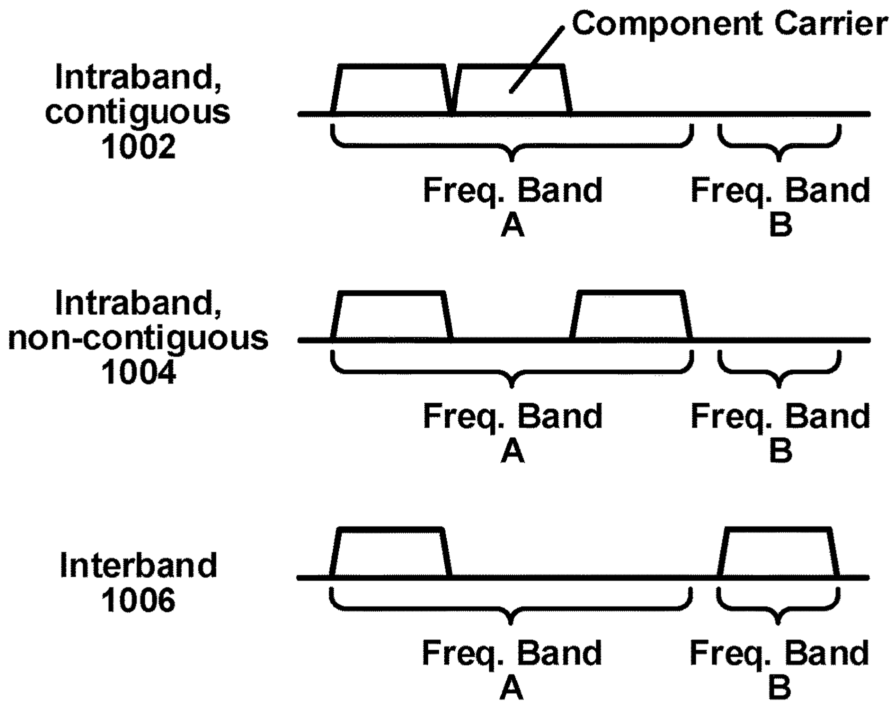
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
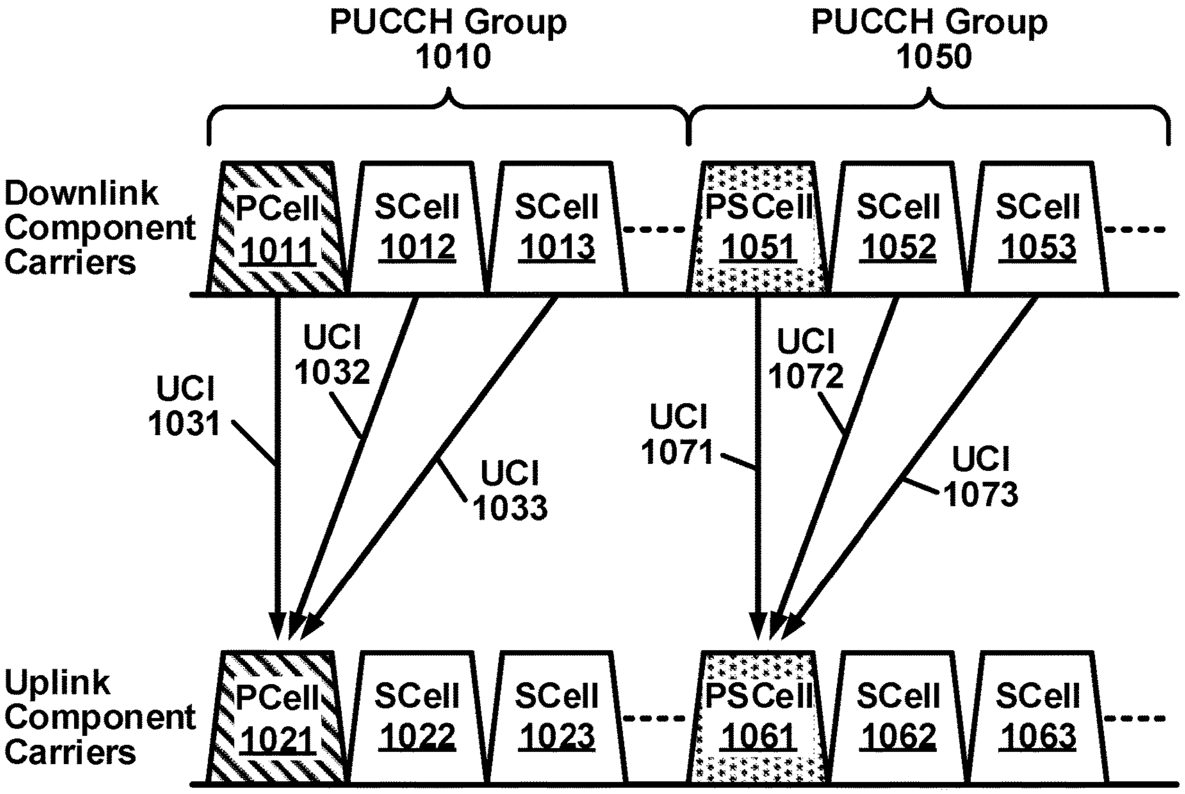
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
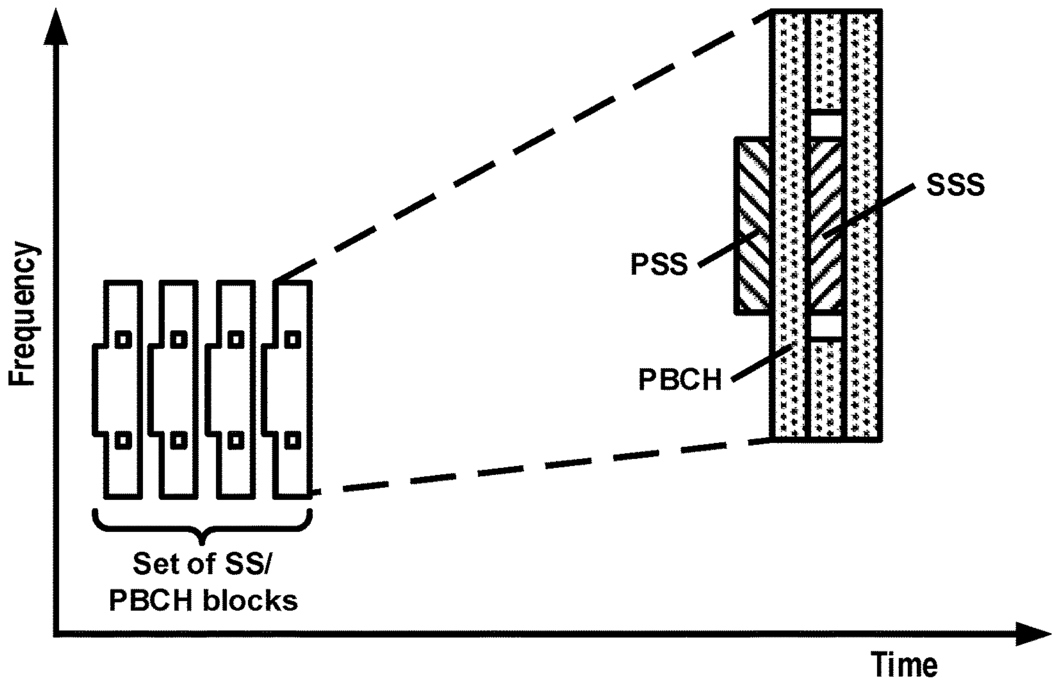
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB 1. The SIB1 may be decoded using parameters provided/comprised in the MIB. The PBCH may indicate an absence of SIB 1. The wireless device may be pointed to a frequency, for example, based on the PBCH indicating the absence of SIB 1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
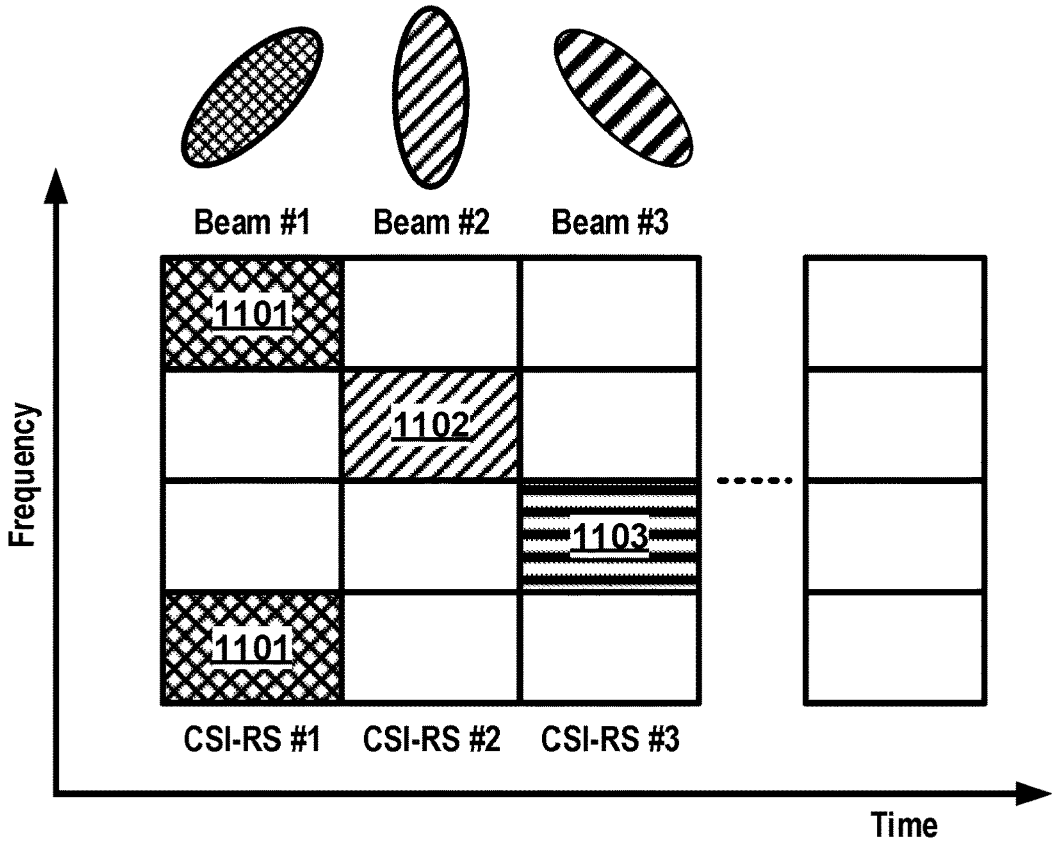
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
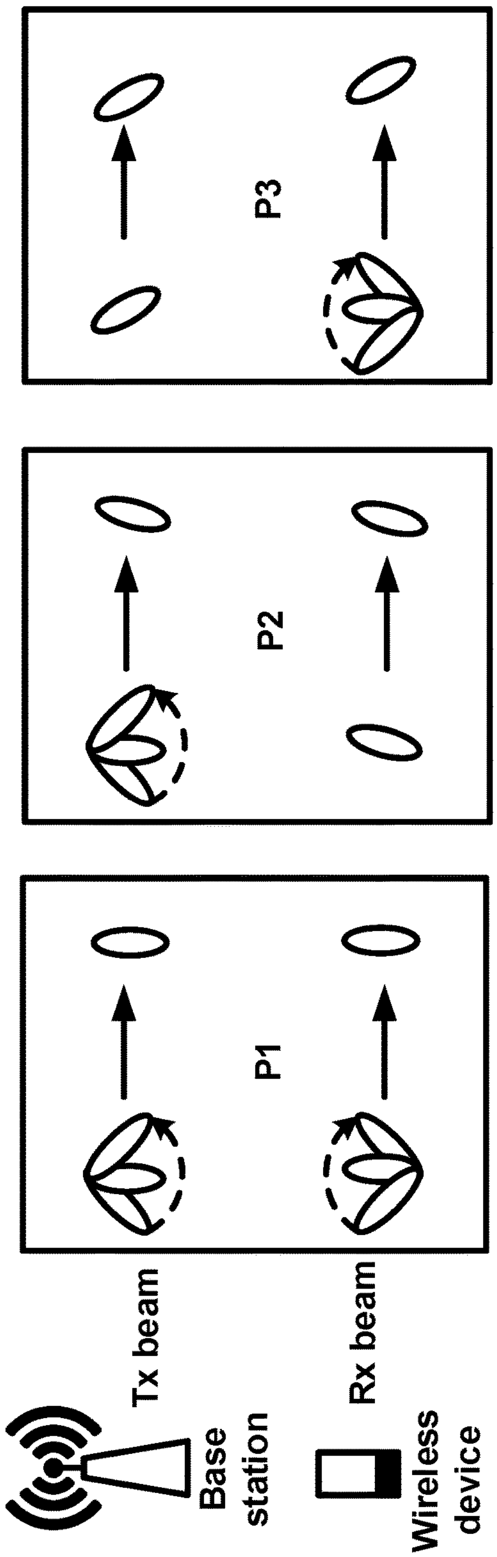
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
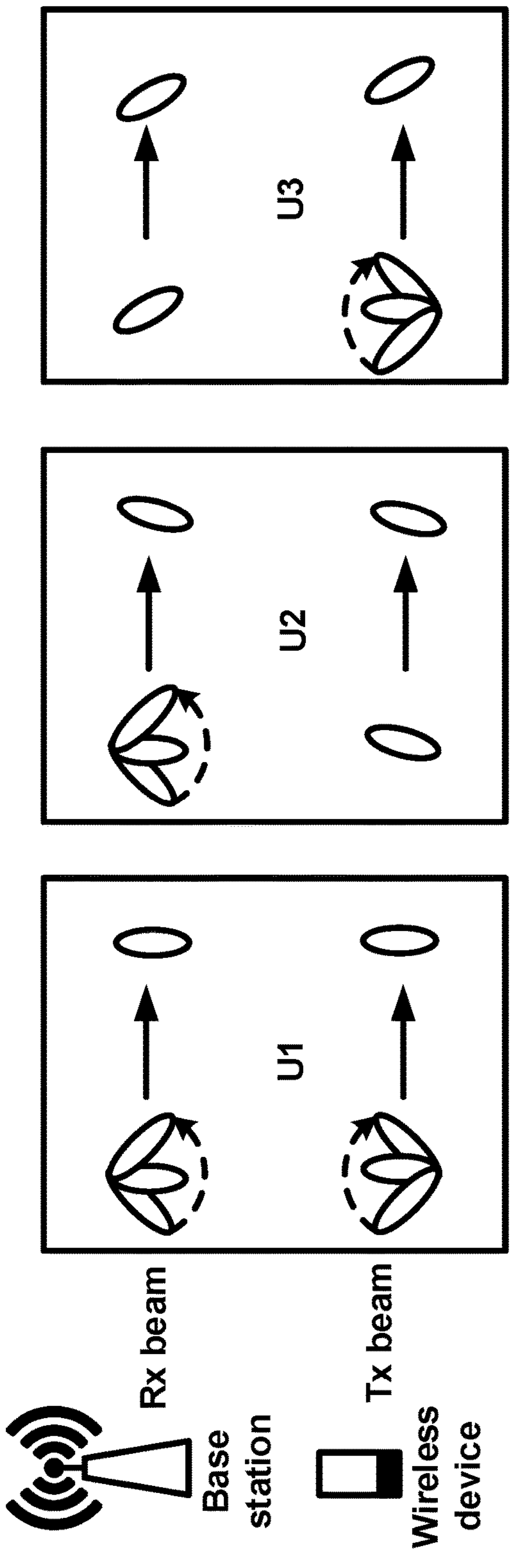
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
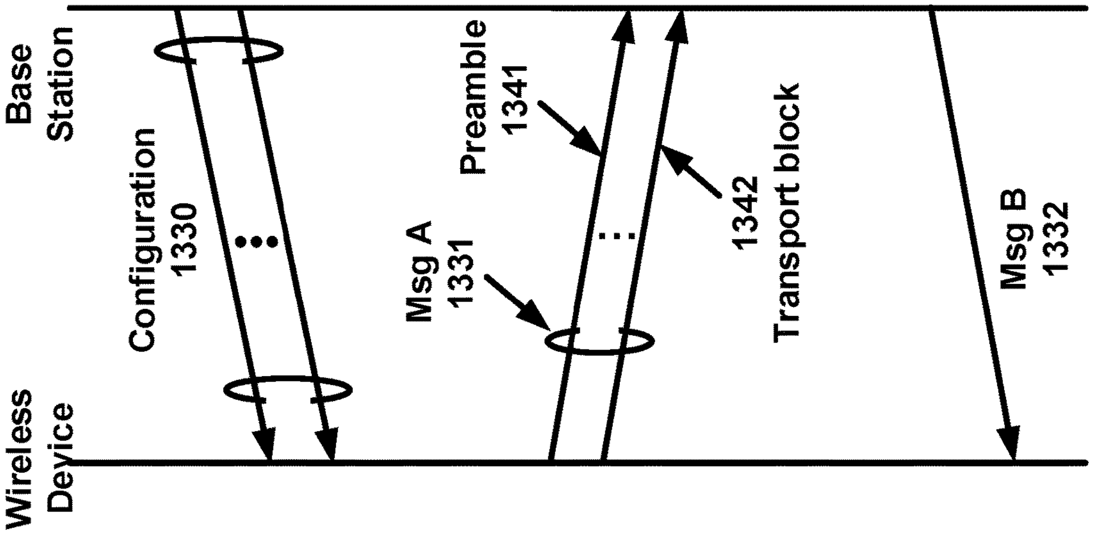
FIG. 13C shows an example two-step random access procedure.
Figure 13B:
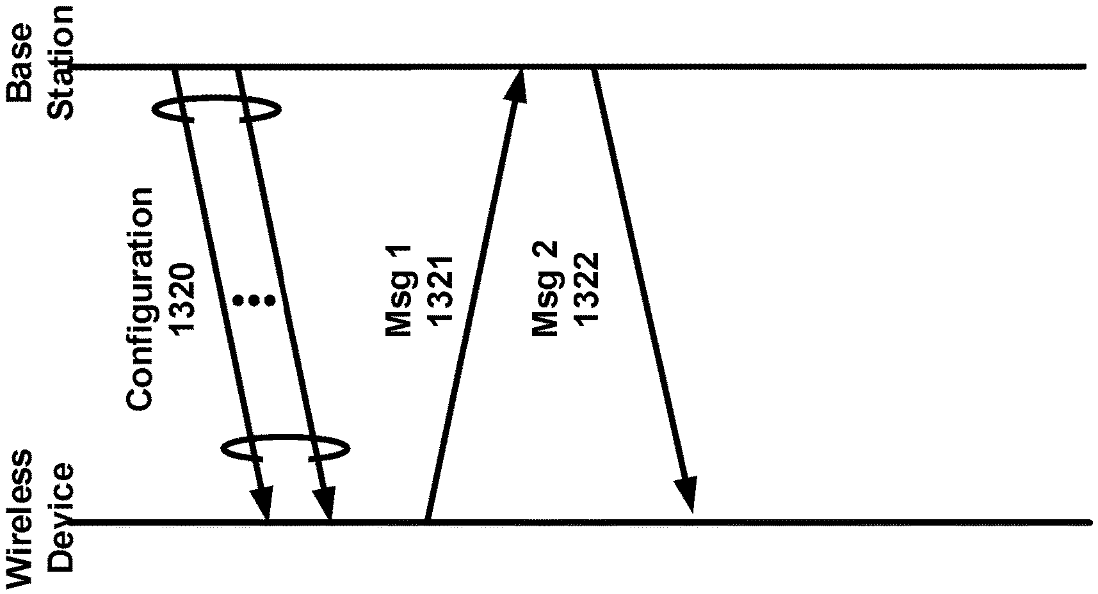
FIG. 13B shows an example two-step random access procedure.
Figure 13A:
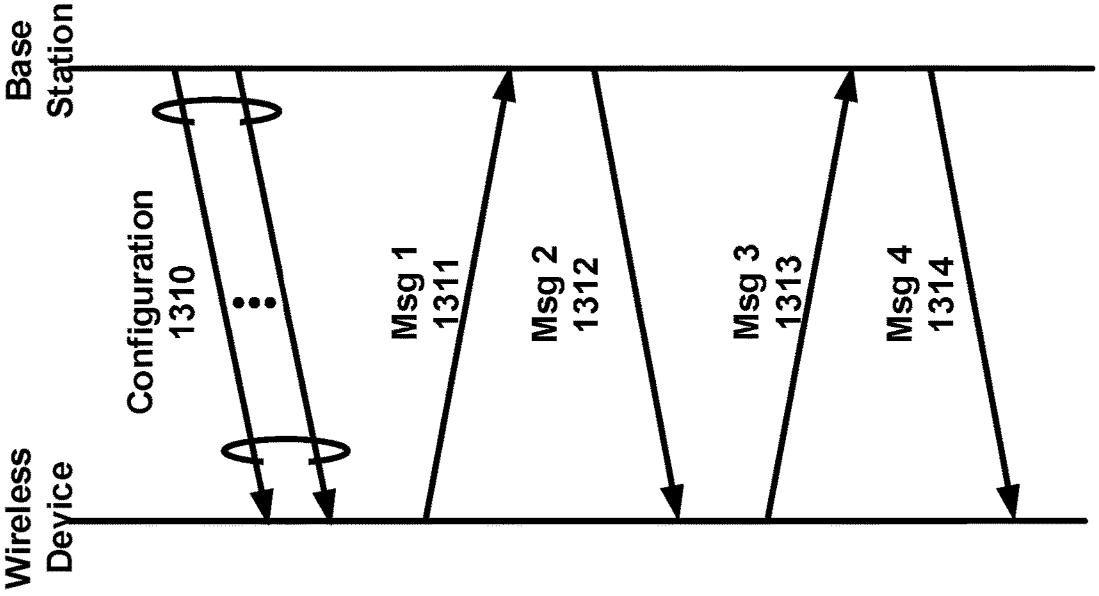
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_\text{id}+14\times t\_\text{id}+14\times 80\times f\_\text{id}+14\times 80\times 8\times \text{ul\_carrier\_id}$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤t_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
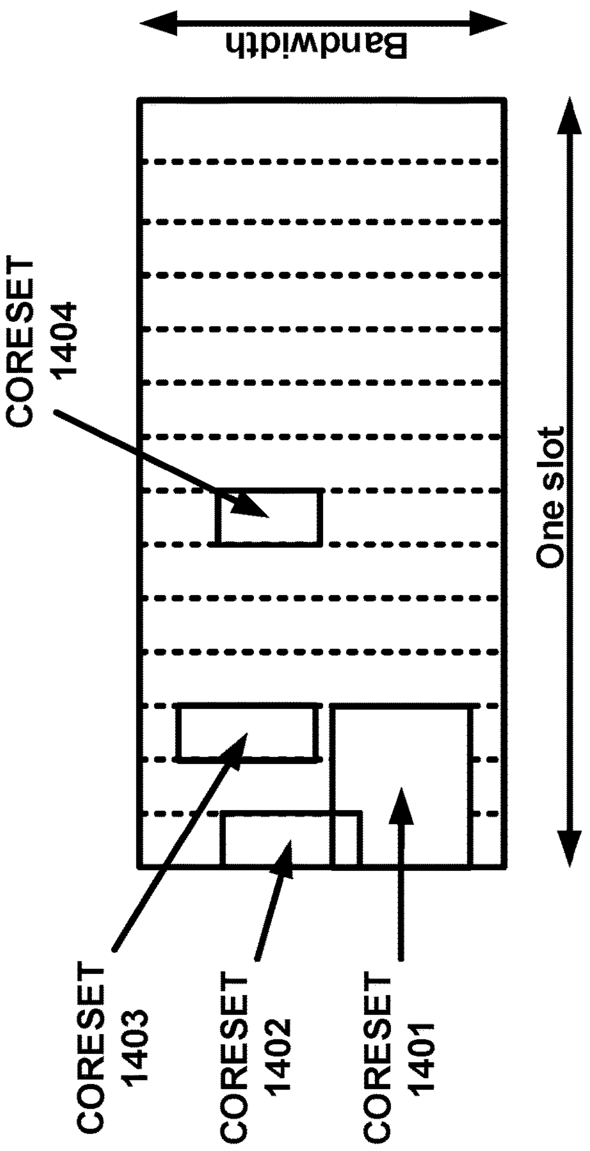
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
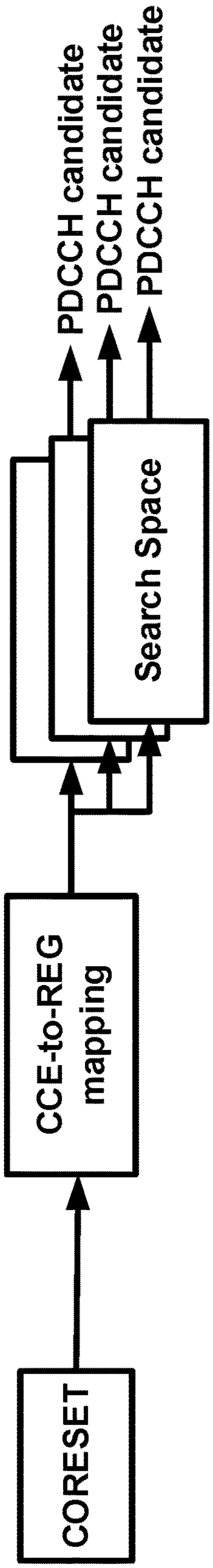
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-ResourceId), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
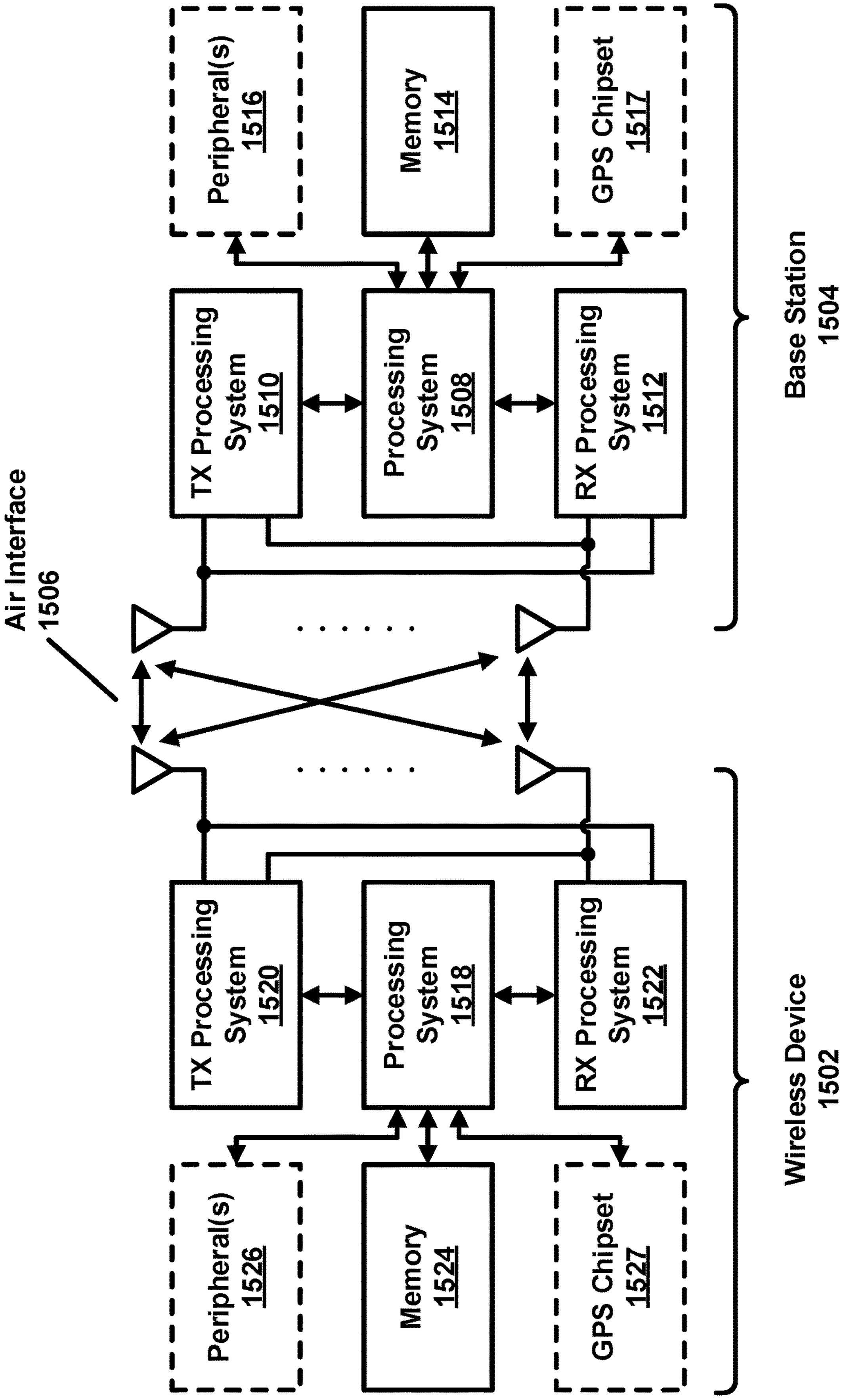
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
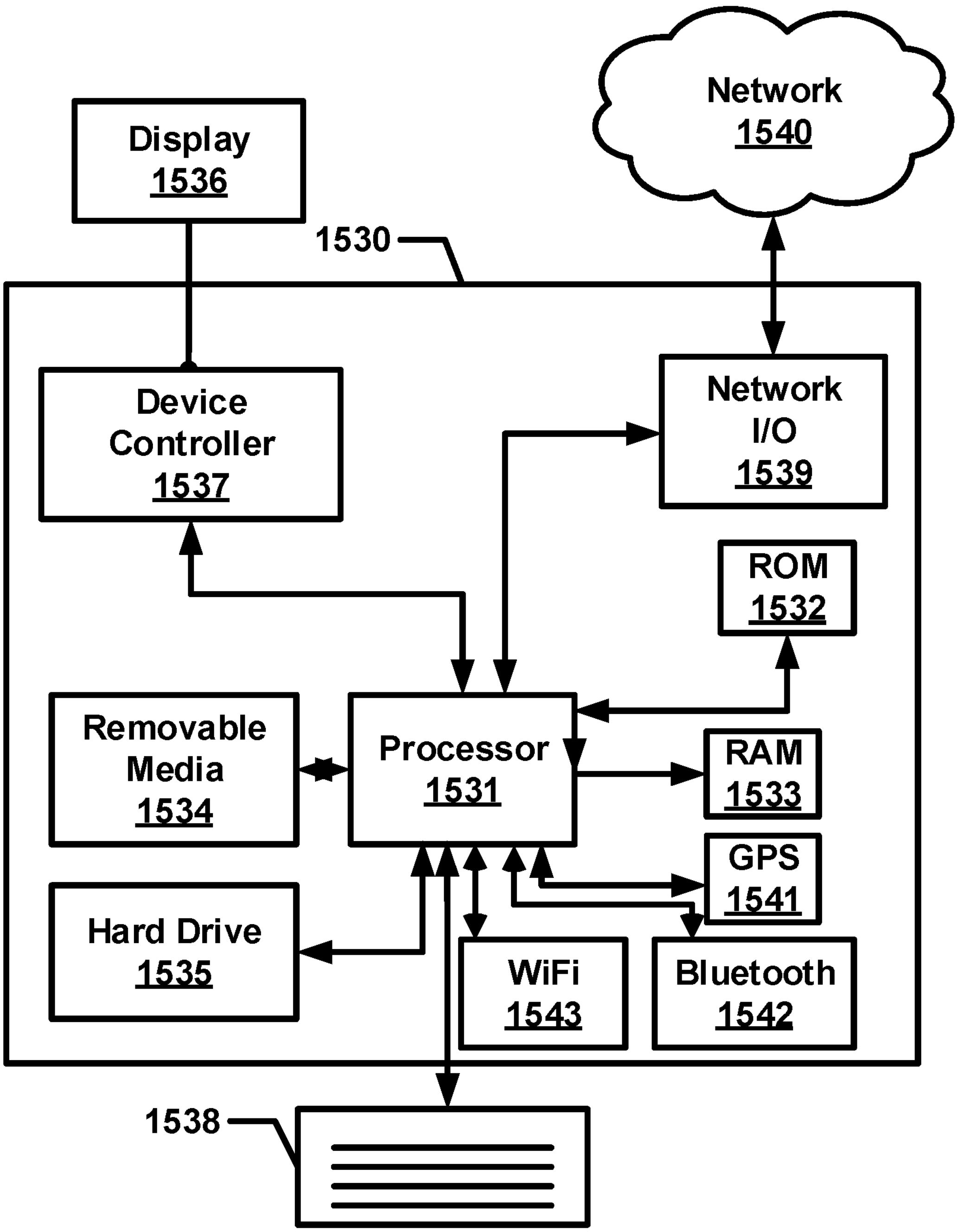
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
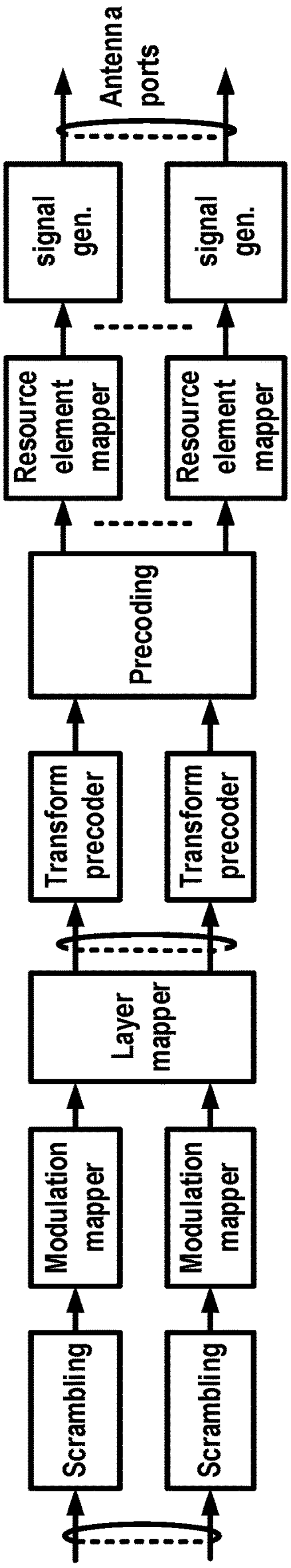
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
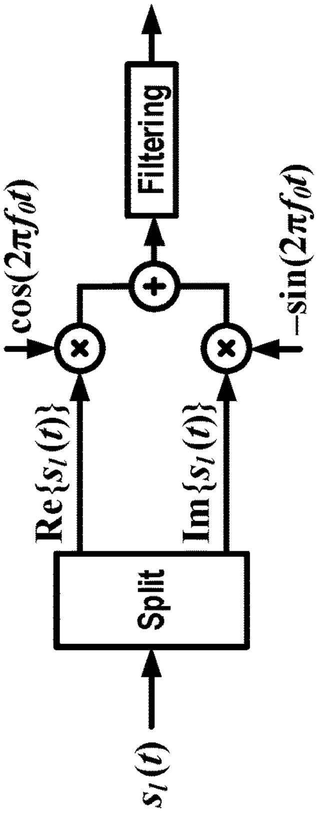

FIG. 16B shows an example structure for modulation and up-conversion of a baseband signal to a carrier frequency. The baseband signal may be a complex-valued SC-FDMA, CP-OFDM baseband signal (or any other baseband signals)

for an antenna port and/or a complex-valued Physical Random Access Channel (PRACH) baseband signal. Filtering may be performed/employed, for example, prior to transmission.

Figure 16C:
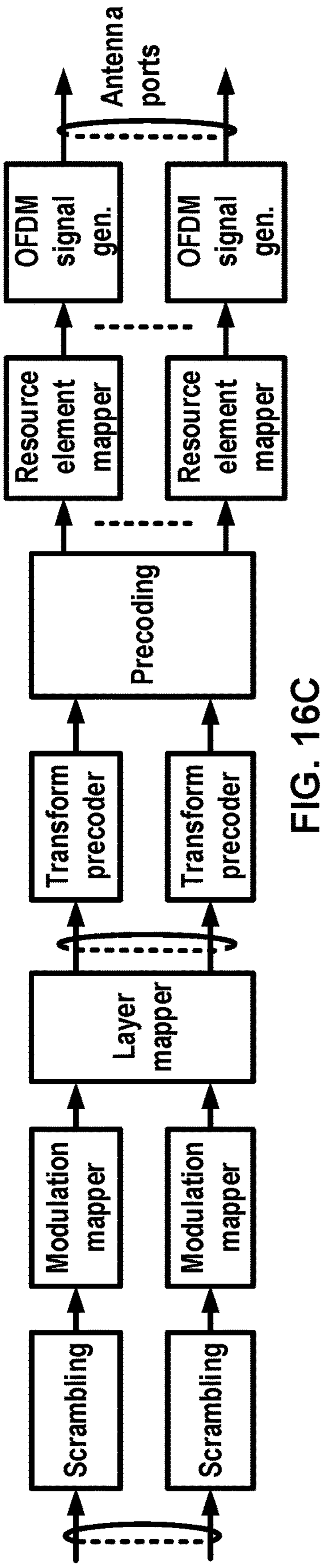

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

Figure 16D:
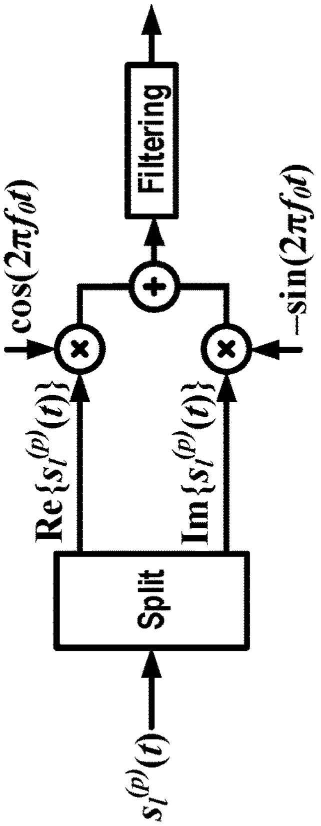

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., aligned to a multiple of eight bits) in length. Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottommost line of the table). The bit order of a parameter field within a MAC PDU may be represented with the first and most significant bit in the leftmost bit and the last and least significant bit in the rightmost bit.

A MAC SDU may be a bit string that is byte aligned (e.g., aligned to a multiple of eight bits) in length. A MAC SDU may be comprised in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, and/or a combination thereof. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; an L field with a multi-bit length; and/or a combination thereof, for example, if the MAC subheader corresponds to a MAC SDU, a variable-sized MAC CE, or padding.

Figure 17A:
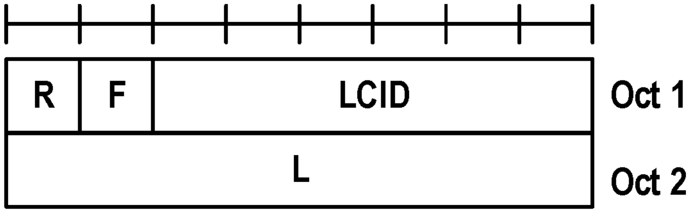
FIG. 17A, FIG. 17B, and FIG. 17C show example MAC subheaders.
Figure 17B:
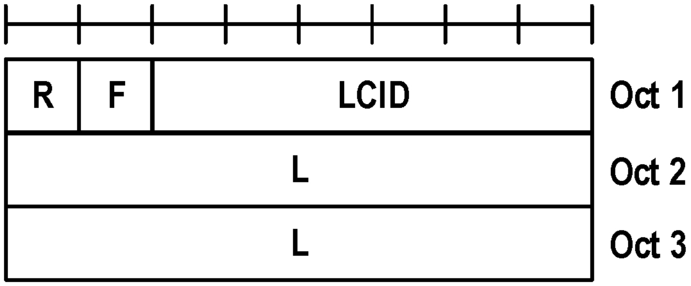
Figure 17C:
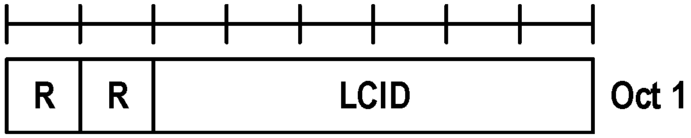

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field. Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

Figure 18A:
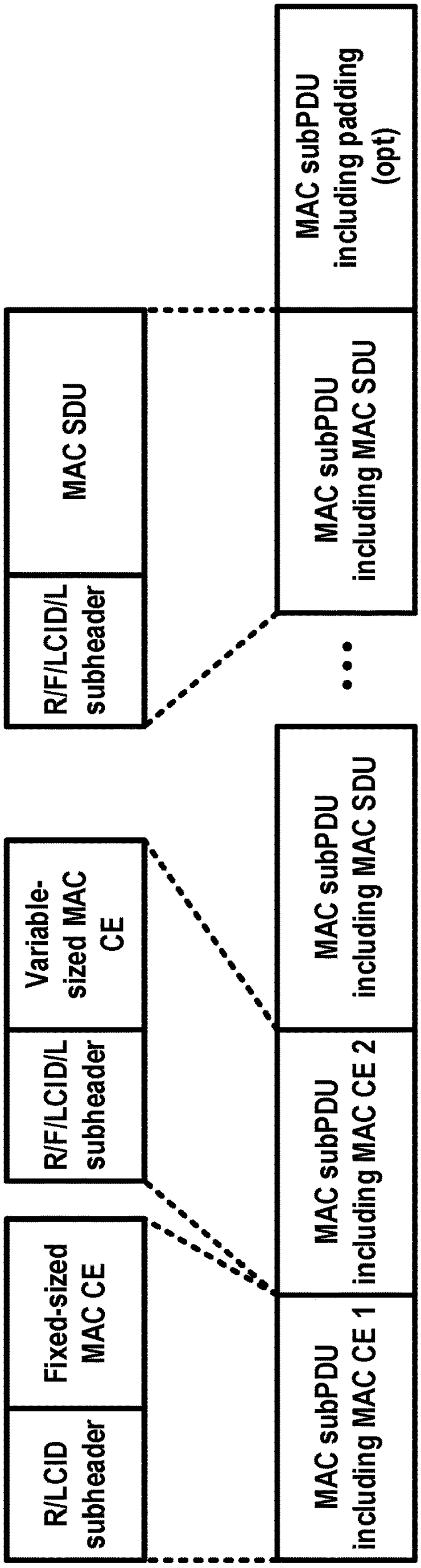
FIG. 18A and FIG. 18B show example MAC PDUs.

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

Figure 18B:
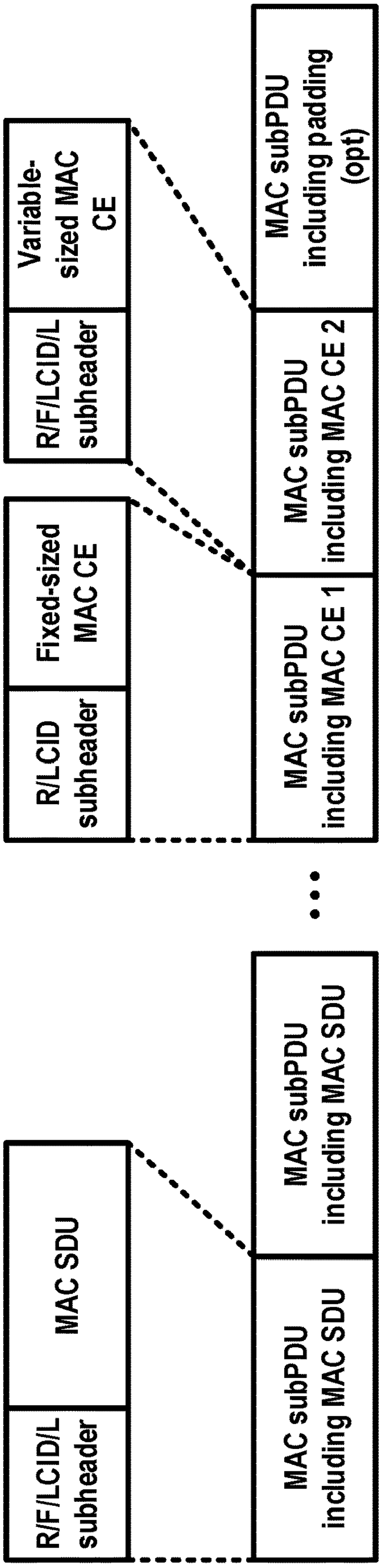

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the corresponding MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more component carriers (CCs) may be aggregated, such as in carrier aggregation (CA). A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., “activated”) or a dormant state (e.g., “dormant”), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

Figure 21A:
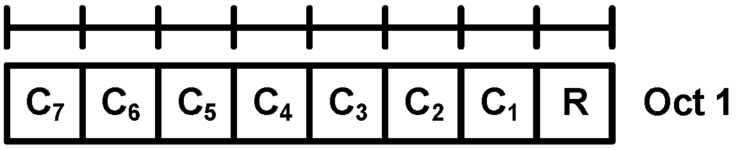
FIG. 21A and FIG. 21B show example secondary cell (SCell) Activation/Deactivation MAC control elements (CEs).

FIG. 21A shows an example SCell Activation/Deactivation MAC CE of one octet. A first MAC PDU subheader comprising a first LCID (e.g., ‘111010’ as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

Figure 21B:
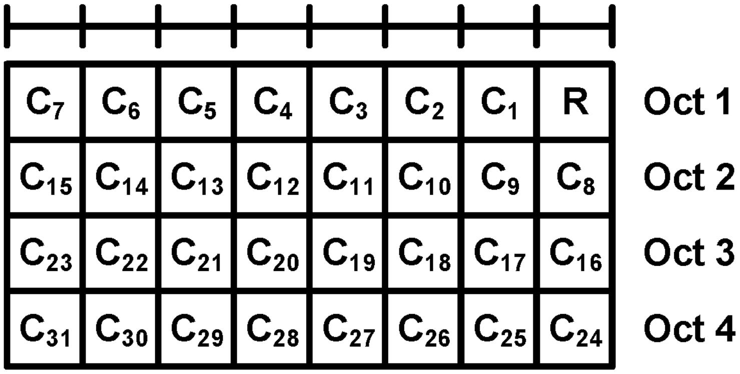

FIG. 21B shows an example SCell Activation/Deactivation MAC CE of four octets. A second MAC PDU subheader comprising a second LCID (e.g., ‘111001’ as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

FIG. 22A shows an example of DRX configurations. A base station may send (e.g., transmit) (e.g., to a wireless device) one or more configuration parameters (e.g., parameters of a power saving operation or a DRX operation in RRC messages). A wireless device (e.g., a MAC entity of the wireless device), based on the configuration parameters of the DRX operation, may control a downlink transmission (e.g., PDCCH transmission) monitoring activity of the MAC entity’s identifier (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, or AI-RNTI). The wireless device (e.g., the MAC entity of the wireless device) may monitor the PDCCH transmission discontinuously using the DRX operation for the activated serving cells, for example, if DRX is configured during a time that the wireless device is in a connected state (e.g., RRC_CONNECTED). Otherwise, the wireless device (e.g., the MAC entity of the wireless device) may monitor (e.g., continuously monitor) the PDCCH transmission.

The configuration parameters of the DRX operation may comprise timing information. For example, the configuration parameters of the DRX operation may comprise at least one of: a timer for a cycle period (e.g., drx-onDurationTimer) indicating a duration at the beginning of a DRX cycle, an offset (e.g., drx-SlotOffset) indicating a delay before starting the timer (e.g., drx-onDurationTimer), an inactive period (e.g., drx-InactivityTimer) indicating a duration after a PDCCH transmission occasion in which a PDCCH transmission indicates a new UL or DL transmission for the wireless device (e.g., the MAC entity of the wireless device), a retransmission downlink timer indicating a maximum wait period for a reception of a downlink retransmission (e.g., drx-RetransmissionTimerDL) (per DL HARQ process except for the broadcast process) indicating a maximum duration until a DL retransmission is received (e.g., detected), a retransmission uplink timer indicating a maximum wait period for a reception of a uplink retransmission (e.g., drx-RetransmissionTimerUL) (per UL HARQ process) indicating a maximum duration until a grant for UL retransmission is received (e.g., detected), a cycle length/offset (e.g., drx-LongCycleStartOffset) indicating a length of a long DRX cycle and an offset for a DRX cycle (e.g., drx-StartOffset, which defines a subframe where a long and short DRX cycle starts), a duration for a short DRX cycle (e.g., drx-ShortCycle), a short DRX cycle timer (e.g., drx-ShortCycleTimer) indicating a duration the wireless device may follow the short DRX cycle, a sleep period before a downlink assignment (e.g., drx-HARQ-RTT-TimerDL) (per DL HARQ process except for the broadcast process) indicating a minimum duration before a DL assignment for HARQ retransmission is expected by the wireless device (e.g., the MAC entity of the wireless device), or a sleep period before a uplink assignment (e.g., drx-HARQ-RTT-TimerUL) (per UL HARQ process) indicating a minimum duration before a UL HARQ retransmission grant is expected by the wireless device (e.g., the MAC entity).

Configuration parameters of a power saving operation (e.g., associated with a DRX operation) may comprise timing information. For example, configuration parameters of the power saving operation may comprise at least one of: a wakeup signal (e.g., ps-Wakeup) indicating whether to start associated the timer (e.g., drx-onDurationTimer) in case a DCI message with CRC scrambled by a PS-RNTI (DCP) is monitored but not detected by the wireless device, an indicator to report CSI (e.g., ps-TransmitOtherPeriodicCSI) indicating whether to report periodic CSI that is not based on L1-RSRP measurements on PUCCH during the time duration indicated by the timer (e.g., drx-onDurationTimer) if the DCP is configured but associated timer (e.g., drx-onDurationTimer) is not started, or an indicator to report CSI of layer 1 (e.g., L1-RSRP) measurement (e.g., ps-TransmitPeriodicL1-RSRP) indicating whether to send (e.g., transmit) periodic CSI that is based on L1-RSRP measurements on PUCCH during the time duration indicated by the timer (e.g., drx-onDurationTimer) if the DCP is configured but associated timer (e.g., drx-onDurationTimer) is not started.

The configuration parameters of the power saving operation may comprise format and/or search space information. For example, the configuration parameters of the power saving operation may comprise at least one of: ps-RNTI indicating a PS-RNTI for DCI format 2_6 (e.g., based on examples of various DCI formats of FIG. 24), dci-Format2-6 indicating a number/quantity of search space sets for monitoring PDCCH transmission for detection of DCI format 2_6 on an active DL BWP of the PCell or of the SpCell according to a common search space, size-DCI-2-6 indicating a payload size for DCI format 2_6. The configuration parameters may comprise ps-PositionDCI-2-6 indicating a location in DCI format 2_6 of a Wake-up indication bit wherein the Wake-up indication bit setting to zero, for example, if reported to higher layers, indicates to not start the timer (e.g., drx-onDurationTimer) for the next long DRX cycle, or the Wake-up indication bit setting to one, for example, if reported to higher layers, indicates start the timer (e.g., drx-onDurationTimer) for the next long DRX cycle.

A wireless device (e.g., a physical layer of the wireless device) may report a value of the Wake-up indication bit for the wireless device to higher layers (e.g., MAC entity/layer of the wireless device) for the next long DRX cycle, for example, if the wireless device is provided with search space sets to monitor PDCCH transmission for detection of DCI format 2_6 in the active DL BWP of the PCell or of the SpCell and the wireless device detects DCI format 2_6. The physical layer of the wireless device may not report a value of the Wake-up indication bit to higher layers (e.g., MAC entity/layer of the wireless device) for the next long DRX cycle, for example, if the wireless device does not detect DCI format 2_6.

The physical layer of the wireless device may report a value of one for the Wake-up indication bit to higher layers (e.g., MAC entity/layer of the wireless device) for the next long DRX cycle, for example, if the wireless device is provided with search space sets to monitor PDCCH transmission for detection of DCI format 2_6 in the active DL BWP of the PCell or of the SpCell and the wireless device is not required to monitor PDCCH transmission for detection of DCI format 2_6 for corresponding PDCCH transmission monitoring occasions outside active time prior to a next long DRX cycle, and/or if the wireless device does not have any PDCCH transmission monitoring occasions for detection of DCI format 2_6 outside active time of a next long DRX cycle.

One or more serving cells (e.g., of a MAC entity) may be configured by configuration parameters (e.g., parameters of RRC message) in at least two DRX groups with one or more separate DRX parameters. There may be one DRX group and one or more serving cells (or all serving cells) may belong to that one DRX group, for example, if an RRC message does not configure a secondary DRX group. A serving cell (e.g., each serving cell) may be uniquely assigned to either of the at least two DRX groups, for example, if the at least two DRX groups are configured. The DRX parameters that are separately configured for a DRX group (e.g., each DRX group) may include at least the timer (e.g., drx-onDurationTimer) and/or the inactive period (e.g., drx-InactivityTimer). The DRX parameters that are common to the DRX groups may include at least one of the offset (e.g., drx-SlotOffset), the retransmission downlink timer (e.g., drx-RetransmissionTimerDL), retransmission uplink timer (e.g., drx-RetransmissionTimerUL), the cycle length/offset (e.g., drx-LongCycleStartOffset), the duration for a short DRX cycle (e.g., drx-ShortCycle) (optional), the short DRX cycle timer (e.g., drx-ShortCycleTimer) (optional) (e.g., expressed as multiples of drx-ShortCycle), the sleep period before a downlink assignment (e.g., drx-HARQ-RTT-TimerDL), or the sleep period before a uplink assignment (e.g., drx-HARQ-RTT-TimerUL).

A wireless device may determine that the active time for serving cells in a DRX group includes time information, for example, if a DRX cycle is configured. The time information may be associated with, for example, the timer (e.g., drx-onDurationTimer) or the inactive period (e.g., drx-InactivityTimer) that are configured and running for the DRX group, the retransmission downlink timer (e.g., drx-RetransmissionTimerDL) or the retransmission uplink timer (e.g., drx-RetransmissionTimerUL) that are running on any serving cell in the DRX group, or a contention resolution timer (e.g., ra-ContentionResolutionTimer) (or msgB-ResponseWindow) that is running. The time information may be associated with, for example, an SR that is sent on PUCCH and is pending or a PDCCH transmission indicating that a new transmission addressed to the C-RNTI of the wireless device (e.g., a MAC entity of the wireless device) has not been received (e.g., detected) after successful reception of an RAR for the random access preamble that is not selected or indicated by the wireless device (e.g., the MAC entity of the wireless device) among the contention-based random access preamble.

A wireless device (e.g., a MAC entity of the wireless device) may start the sleep period before a downlink assignment (e.g., drx-HARQ-RTT-TimerDL) for a corresponding HARQ process in a first symbol after the end of a corresponding transmission carrying a DL HARQ feedback, for example, if a DRX operation is configured and a MAC PDU is received (e.g., detected) in a configured downlink assignment. The wireless device may stop the retransmission downlink timer (e.g., drx-RetransmissionTimerDL) for the corresponding HARQ process, for example, if the DRX operation is configured and the MAC PDU is received (e.g., detected) in the configured downlink assignment.

A wireless device (e.g., a MAC entity of the wireless device) may start the sleep period before a uplink assignment (e.g., drx-HARQ-RTT-TimerUL) for the corresponding HARQ process in the first symbol after the end of the first transmission (e.g., within a bundle) of the corresponding PUSCH transmission, for example, if a DRX operation is configured, a MAC PDU is sent (e.g., transmitted) in a configured uplink grant, and an LBT failure indication is not received (e.g., detected) from lower layers. The wireless device may stop the retransmission uplink timer (e.g., drx-RetransmissionTimerUL) for the corresponding HARQ process at the first transmission (within a bundle) of the corresponding PUSCH transmission, for example, if the DRX operation is configured, the MAC PDU is sent (e.g., transmitted) in the configured uplink grant, and the LBT failure indication is not received (e.g., detected) from the lower layers.

A wireless device (e.g., a MAC entity of the wireless device) may start the retransmission downlink timer (e.g., drx-RetransmissionTimerDL) for the corresponding HARQ process in the first symbol after the expiry of the sleep period before a downlink assignment (e.g., drx-HARQ-RTT-TimerDL), for example, if a DRX operation is configured, the sleep period before a downlink assignment (e.g., a drx-HARQ-RTT-TimerDL) expires, and the data of the corresponding HARQ process was not successfully decoded. The wireless device (e.g., the MAC entity of the wireless device) may start the retransmission uplink timer (e.g., drx-RetransmissionTimerUL) for the corresponding HARQ process in the first symbol after the expiry of the sleep period before a uplink assignment (e.g., drx-HARQ-RTT-TimerUL), for example, if a DRX operation is configured and the sleep period before a uplink assignment (e.g., a drx-HARQ-RTT-TimerUL) expires. The wireless device (e.g., the MAC entity of the wireless device) may stop the timer (e.g., drx-onDurationTimer) for a DRX group (e.g., each DRX group) and/or stop the inactive period (e.g., drx-Inactivity-Timer) for a DRX group (e.g., each DRX group), for example, if a DRX operation is configured and a DRX Command MAC CE or a long DRX Command MAC CE is received (e.g., detected).

A wireless device (e.g., a MAC entity of the wireless device) may start or restart the short DRX cycle timer (e.g., drx-ShortCycleTimer) for a DRX group in the first symbol after the expiry of the inactive period (e.g., drx-Inactivity-Timer), for example, if a DRX operation is configured for a DRX group. The wireless device may use the short DRX cycle for the DRX group, for example, if the DRX operation is configured, the inactive period (e.g., drx-InactivityTimer) for the DRX group expires, and the short DRX cycle is configured. The wireless device (e.g., the MAC entity of the wireless device) may use the long DRX cycle for a DRX group, for example, if the inactive period (e.g., drx-InactivityTimer) for the DRX group expires and the short DRX cycle is not configured.

A wireless device (e.g., a MAC entity of the wireless device) may start or restart the short DRX cycle timer (e.g., drx-ShortCycleTimer) for a DRX group (e.g., each DRX group) in the first symbol after the end of DRX Command MAC CE reception, for example, if a DRX operation is configured and a DRX Command MAC CE is received (e.g., detected). The wireless device may use the short DRX cycle for a DRX group (e.g., each DRX group), for example, if the DRX operation is configured, and the DRX Command MAC CE is received (e.g., detected), and the short DRX cycle is configured. The wireless device (e.g., the MAC entity of the wireless device) may use the long DRX cycle for a DRX group, for example, if a DRX Command MAC CE is received (e.g., detected) and the short DRX cycle is not configured.

A wireless device (e.g., a MAC entity of the wireless device) may use the long DRX cycle for a DRX group, for example, if a DRX operation is configured and the short DRX cycle timer (e.g., drx-ShortCycleTimer indicating a number/quantity of drx-ShortCycles to follow) for the DRX group expires. The wireless device (e.g., the MAC entity of the wireless device) may stop the short DRX cycle timer (e.g., drx-ShortCycleTimer) for a DRX group (e.g., each DRX group), for example, if a long DRX Command MAC CE is received (e.g., detected). The wireless device may use the long DRX cycle for the DRX group (e.g., each DRX group), for example, if the Long DRX Command MAC CE is received (e.g., detected). The wireless device (e.g., the MAC entity of the wireless device) may start the timer (e.g., drx-onDurationTimer) for the DRX group after the offset (e.g., drx-SlotOffset) from a beginning of a subframe, for example, if the DRX operation is configured, the short DRX cycle (e.g., drx-ShortCycle) is used for the DRX group, and an offset (e.g., drx-StartOffset) for a DRX cycle is set based on the system frame number (SFN) and the short DRX cycle. The offset for the DRX cycle (e.g., drx-StartOffset) and [(SFN×10)+subframe number] may be, for example, congruent modulo the short DRX cycle, and expressed as [(SFN×10)+subframe number] modulo (drx-ShortCycle)=(drx-StartOffset) modulo (drx-ShortCycle).

FIG. 22B shows an example of DRX configuration. The DRX configuration may be for a power saving operation based on DCP reception). A wireless device 2210 may start the timer (e.g., a drx-onDurationTimer) associated with a DRX operation and/or may monitor PDCCH transmission, for example, if the timer is running and the wireless device receives/detects a wake-up indication 2215 (e.g., included in a DCP message) being set to a first value. The wireless device may stop monitoring the PDCCH transmission, for example, if the timer expires or the state of DRX switches from a DRX-On to a DRX-Off. The wireless device may not start the timer (e.g., a drx-onDurationTimer) associated with the DRX operation and/or may skip monitoring PDCCH transmission for the DRX-On, for example, if a wireless device receives/detects a DCP message comprising a wake-up indication 2220 being set to a second value.

A wireless device (e.g., a MAC entity of the wireless device) may start the timer (e.g., drx-onDurationTimer) after a delay (e.g., drx-SlotOffset) from a beginning of a subframe, for example, if a DRX operation is configured, the long DRX cycle is used for a DRX group, an offset (e.g., drx-StartOffset) for the DRX cycle is set based on the SFN and the long DRX cycle (e.g., drx-LongCycle), and DCP monitoring is configured for the active DL BWP. The offset (e.g., drx-StartOffset) may be set as a remainder after [(SFN×10)+subframe number] is divided by the long DRX cycle (e.g., drx-LongCycle) (e.g., [(SFN×10)+subframe number] modulo (drx-LongCycle)=drx-StartOffset). The wireless device may start the timer (e.g., drx-onDuration-Timer) after the delay (e.g., drx-SlotOffset) from the beginning of the subframe, for example, if DCP indication (e.g., associated with the current DRX cycle received from a lower layer) indicates to start the timer (e.g., drx-onDurationTimer).

The wireless device may start the timer (e.g., drx-onDurationTimer) after the delay (e.g., drx-SlotOffset) from the beginning of the subframe, for example, if the DRX operation is configured, the long DRX cycle is used for the DRX group, the offset (e.g., drx-StartOffset) is set based on the SFN and the long DRX cycle, and DCP monitoring is configured for the active DL BWP. The wireless device may start the timer (e.g., drx-onDurationTimer) after the delay (e.g., drx-SlotOffset) from the beginning of the subframe, for example, if DCP occasion(s) in time domain, associated with the current DRX cycle, occurred in active time, or during a measurement gap, or when the wireless device (e.g., the MAC entity of the wireless device) monitors for a PDCCH transmission on the search space indicated by an identifier (e.g., recoverySearchSpaceId) of the SpCell identified/indicated by the C-RNTI and the time window (e.g., ra-ResponseWindow) is running. The active time (e.g., of a DRX configuration) may be determined by considering grants, assignments, DRX Command MAC CE, long DRX Command MAC CE received (e.g., detected), and/or SR sent, until a period of time (e.g., 4 ms or any other duration) prior to start of the last DCP occasion.

The wireless device may start the timer (e.g., drx-onDurationTimer) after the delay (e.g., drx-SlotOffset) from the beginning of the subframe, for example, if the DRX operation is configured, the long DRX cycle is used for the DRX group, the offset (e.g., drx-StartOffset) is set based on the SFN and the long DRX cycle (e.g., drx-LongCycle), and DCP monitoring is configured for the active DL BWP. The wireless device may start the timer (e.g., drx-onDuration-Timer) after the delay (e.g., drx-SlotOffset) from the beginning of the subframe, for example, if the wireless device (e.g., the MAC entity of the wireless device) monitors for a PDCCH transmission on the search space indicated by an identifier (e.g., recoverySearchSpaceId) of the SpCell identified/indicated by the C-RNTI and the time window (e.g., ra-ResponseWindow) is running. The wireless device may start the timer (e.g., drx-onDurationTimer) after the delay (e.g., drx-SlotOffset) from the beginning of the subframe, for example, if the DRX operation is configured, the long DRX cycle is used for the DRX group, the offset (e.g., drx-StartOffset) is set based on the SFN and the long DRX cycle (e.g., drx-LongCycle), DCP monitoring is configured for the active DL BWP, the wakeup signal (e.g., ps-Wakeup) is configured with value true, and DCP indication associated with the current DRX cycle has not been received (e.g., detected) from lower layers.

The wireless device (e.g., the MAC entity of the wireless device) may start the timer (e.g., drx-onDurationTimer) for the DRX group after the delay (e.g., drx-SlotOffset) from the beginning of the subframe, for example, if the DRX operation is configured, the long DRX cycle is used for the DRX group, the offset (e.g., drx-StartOffset) is set based on the SFN and the long DRX cycle (e.g., drx-LongCycle), and DCP monitoring is not configured for the active DL BWP. The wireless device (e.g., the MAC entity of the wireless device) may monitor the PDCCH transmission on the serving cells in the DRX group, for example, if the DRX operation is configured and the DRX group is in active time. The wireless device (e.g., the MAC entity of the wireless device) may start the sleep period before a downlink assignment (e.g., drx-HARQ-RTT-TimerDL) for the corresponding HARQ process in the first symbol after the end of the corresponding transmission carrying the DL HARQ feedback, for example, if the PDCCH transmission indicates a DL transmission.

The wireless device (e.g., a MAC entity of the wireless device) may stop the retransmission downlink timer (e.g., drx-RetransmissionTimerDL) for the corresponding HARQ process, for example, if the PDCCH transmission indicates a DL transmission. The wireless device (e.g., the MAC entity of the wireless device) may start the retransmission downlink timer (e.g., drx-RetransmissionTimerDL) in the first symbol after the PDSCH transmission for the corresponding HARQ process, for example, if the PDSCH-to-HARQ_feedback timing indicates a non-numerical value (e.g., a non-numerical kl value). A corresponding transmission opportunity to send a DL HARQ feedback may be indicated in a later PDCCH transmission requesting HARQ-ACK feedback, for example, if the HARQ feedback is postponed by PDSCH-to-HARQ_feedback timing indicating the non-numerical kl value.

The wireless device (e.g., the MAC entity of the wireless device) may monitor the PDCCH transmission on the serving cells in a DRX group, for example, if a DRX operation is configured and the DRX group is in active time. The wireless device (e.g., the MAC entity of the wireless device) may start the sleep period before an uplink assignment (e.g., drx-HARQ-RTT-TimerUL) for the corresponding HARQ process in the first symbol after the end of the first transmission (within a bundle) of the corresponding PUSCH transmission, for example, if the PDCCH transmission indicates a UL transmission. The wireless device (e.g., the MAC entity of the wireless device) may stop the retransmission uplink timer (e.g., drx-RetransmissionTimerUL) for the corresponding HARQ process, for example, if the PDCCH transmission indicates a UL transmission.

The wireless device (e.g., the MAC entity of the wireless device) may monitor the PDCCH transmission on the serving cells in a DRX group, for example, if a DRX operation is configured and the DRX group is in active time. The wireless device (e.g., the MAC entity of the wireless device) may start or restart the inactive period (e.g., drx-InactivityTimer) for this DRX group in the first symbol after the end of the PDCCH transmission reception, for example, if the PDCCH transmission indicates a new transmission (DL or UL) on a Serving Cell in this DRX group. The wireless device (e.g., the MAC entity of the wireless device) may stop the retransmission uplink timer (e.g., drx-RetransmissionTimerUL) for the corresponding HARQ process, for example, if a HARQ process receives/detects downlink feedback information and acknowledgement is indicated.

The wireless device (e.g., the MAC entity of the wireless device) may not send (e.g., transmit) periodic SRS and semi-persistent SRS or may not report semi-persistent CSI configured on PUSCH transmission under certain conditions. The wireless device may not report periodic CSI that is L1-RSRP on PUCCH (e.g., if ps-TransmitPeriodicL1-RSRP is not configured with value true) or may not report periodic CSI that is not L1-RSRP on PUCCH (e.g., if ps-TransmitOtherPeriodicCSI is not configured with value true) under the certain conditions. The certain conditions may include that DRX operation is configured, DCP monitoring is configured for the active DL BWP, the current symbol n occurs within a duration of the timer (e.g., drx-onDurationTimer), the duration of time associated with the current DRX cycle is not started, and the wireless device (e.g., the MAC entity of the wireless device) may not be in active time considering grants, assignments, DRX Command MAC CE, long DRX Command MAC CE received (e.g., detected), and/or SR sent, until a period of time (e.g., 4 ms) prior to symbol n for evaluating DRX active time conditions.

The wireless device (e.g., the MAC entity of the wireless device) may not send (e.g., transmit) periodic SRS and semi-persistent SRS in a DRX group, may not report CSI on PUCCH and semi-persistent CSI configured on PUSCH transmission in a DRX group, or may not report CSI on PUCCH in the DRX group, for example, if CSI masking (csi-Mask) is setup by upper layers, in current symbol n, the timer (e.g., drx-onDurationTimer) of a DRX group not running considering grants or assignments scheduled on Serving Cell(s) in the DRX group, DRX Command MAC CE, long DRX Command MAC CE received (e.g., detected) at least until a period of time (e.g., 4 ms or any other duration) prior to symbol n for evaluating DRX active time conditions, a DRX operation is configured, and/or DCP monitoring is not configured for the active DL BWP. The wireless device (e.g., the MAC entity of the wireless device) may not send (e.g., transmit) periodic SRS and semi-persistent SRS in a DRX group, may not report CSI on PUCCH and semi-persistent CSI configured on PUSCH transmission in the DRX group, and/or may not report CSI on PUCCH in the DRX group, for example, if CSI masking (csi-Mask) is setup by upper layers, in current symbol n, the timer (e.g., drx-onDurationTimer) of a DRX group would not be considering grants or assignments scheduled on Serving Cell(s) in the DRX group and DRX Command MAC CE, long DRX Command MAC CE received (e.g., detected) at least until a period of time (e.g., 4 ms or any other duration) prior to symbol n for evaluating DRX active time conditions, and the current symbol n occurs not within a duration of the timer (e.g., drx-onDurationTimer).

The wireless device (e.g., the MAC entity of the wireless device) may not send (e.g., transmit) periodic SRS and semi-persistent SRS in a DRX group, may not report CSI on PUCCH and semi-persistent CSI configured on PUSCH transmission in the DRX group, or may not report CSI on PUCCH in the DRX group, for example, if CSI masking (csi-Mask) is setup by upper layers, in current symbol n, the timer (e.g., drx-onDurationTimer) of a DRX group would not be considering grants or assignments scheduled on Serving Cell(s) in the DRX group and DRX Command MAC CE, long DRX Command MAC CE received (e.g., detected), until a period of time (e.g., 4 ms) prior to symbol n for evaluating DRX active time conditions, and the timer (e.g., drx-onDurationTimer) associated with the current DRX cycle is started. The wireless device (e.g., the MAC entity of the wireless device) may not send (e.g., transmit) periodic SRS and semi-persistent SRS in a DRX group, may not report CSI on PUCCH and semi-persistent CSI configured on PUSCH transmission in the DRX group, and/or may not report CSI on PUCCH in the DRX group, for example, if CSI masking (csi-Mask) is setup by upper layers, in current symbol n, the timer (e.g., drx-onDurationTimer) of a DRX group would not be considering grants or assignments scheduled on Serving Cell(s) in the DRX group and DRX Command MAC CE, long DRX Command MAC CE received (e.g., detected), until a period of time (e.g., 4 ms or any other duration) prior to symbol n for evaluating DRX active time conditions.

The wireless device (e.g., the MAC entity of the wireless device) may send (e.g., transmit) HARQ feedback, aperiodic CSI on PUSCH transmission, and aperiodic SRS on the serving cells in a DRX group if such sending or transmission is expected, for example, regardless of whether the wireless device (e.g., the MAC entity of the wireless device) is monitoring PDCCH transmission or not on the serving cells in the DRX group. The wireless device (e.g., the MAC entity of the wireless device) may not monitor the PDCCH transmission, for example, if the PDCCH transmission is not a complete PDCCH transmission occasion (e.g. the active time starts or ends in the middle of a PDCCH transmission occasion).

A base station may configure a wireless device with uplink (UL) bandwidth parts (BWPs) and downlink (DL) BWPs to enable bandwidth adaptation (BA) on a PCell. The base station may further configure the wireless device with at least DL BWP(s) (i.e., there may be no UL BWPs in the UL) to enable BA on an SCell, for example, if carrier aggregation is configured. An initial active BWP may be a first BWP used for initial access, for example, for a PCell. A first active BWP may be a second BWP configured for the wireless device to operate on a SCell upon the SCell being activated. A base station and/or a wireless device may independently switch a DL BWP and an UL BWP, for example, in paired spectrum (e.g., FDD). A base station and/or a wireless device may simultaneously switch a DL BWP and an UL BWP, for example, in unpaired spectrum (e.g., TDD).

A base station and/or a wireless device may switch a BWP between configured BWPs using a DCI message or a BWP inactivity timer. The base station and/or the wireless device may switch an active BWP to a default BWP based on (e.g., after or in response to) an expiry of the BWP inactivity timer associated with the serving cell, for example, if the BWP inactivity timer is configured for a serving cell. The default BWP may be configured by the network. One UL BWP for an uplink carrier (e.g., each uplink carrier) and one DL BWP may be active at a time in an active serving cell, for example, if FDD systems are configured with BA. One DL/UL BWP pair may be active at a time in an active serving cell, for example, for TDD systems. Operating on the one UL BWP and the one DL BWP (or the one DL/UL pair) may improve wireless device battery consumption. BWPs other than the one active UL BWP and the one active DL BWP that the wireless device may work on may be deactivated. The wireless device may not monitor PDCCH transmission, for example, on deactivated BWPs. The wireless device may not send (e.g., transmit) on PUCCH, PRACH, and UL-SCH, for example, on deactivated BWPs.

A serving cell may be configured with at most a first number/quantity (e.g., four) of BWPs. There may be one active BWP at any point in time, for example, for an activated serving cell. A BWP switching for a serving cell may be used to activate an inactive BWP and deactivate an active BWP at a time. The BWP switching may be controlled by a PDCCH transmission indicating a downlink assignment or an uplink grant. The BWP switching may be controlled by a BWP inactivity timer (e.g., bwp-InactivityTimer). The BWP switching may be controlled by a wireless device (e.g., a MAC entity of the wireless device) based on (e.g., after or in response to) initiating a Random Access procedure. One BWP may be initially active without receiving a PDCCH transmission indicating a downlink assignment or an uplink grant, for example, upon addition of an SpCell or activation of an SCell. The active BWP for a serving cell may be indicated by configuration parameter(s) (e.g., parameters of RRC message) and/or PDCCH transmission. A DL BWP may be paired with a UL BWP for unpaired spectrum, and BWP switching may be common for both UL and DL.

Figure 23:
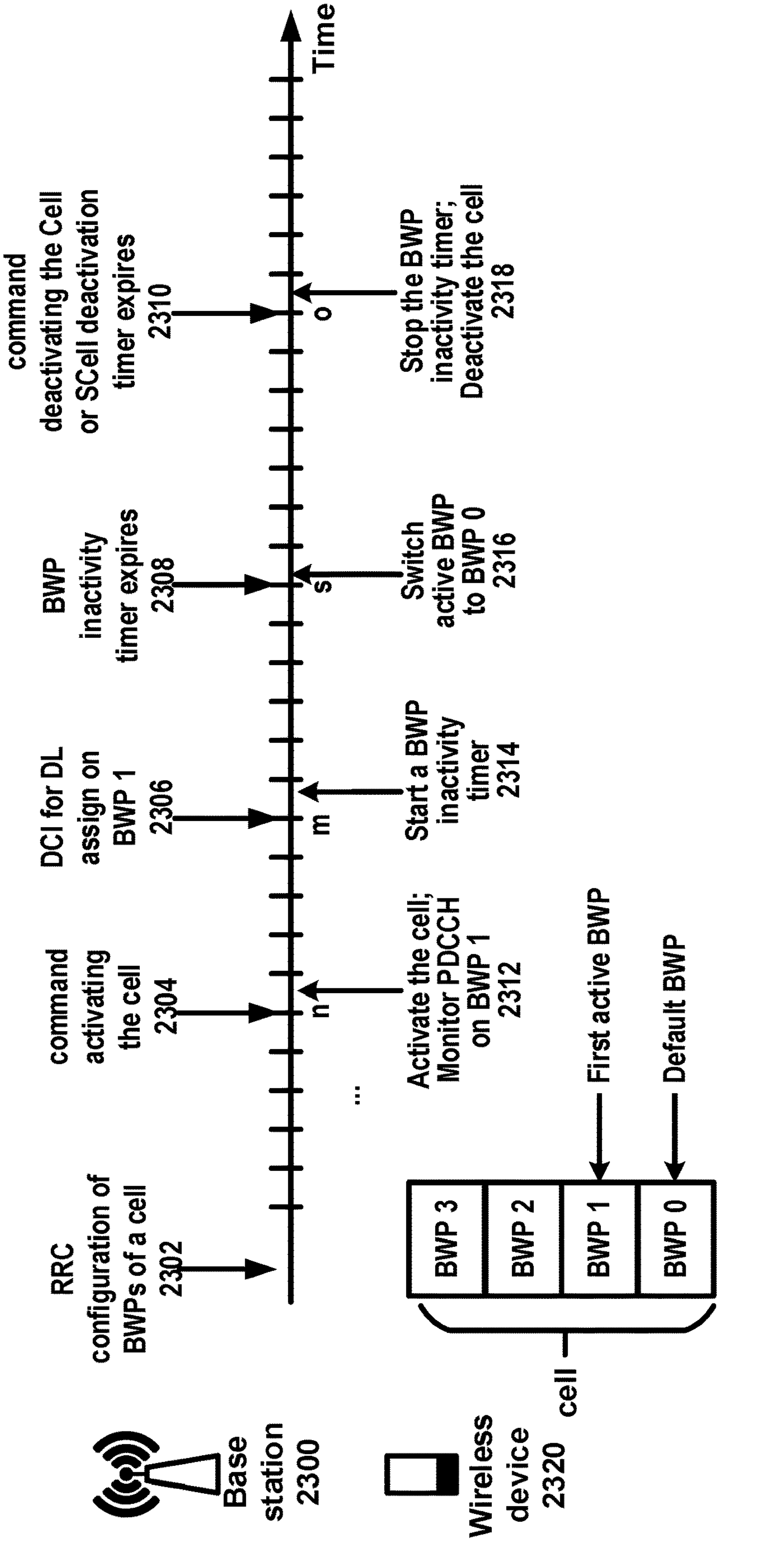
FIG. 23 shows an example of BWP activation/deactivation.

FIG. 23 shows an example of BWP activation/deactivation. The BWP activation/deactivation may be on a cell (e.g., PCell or SCell). The BWP activation/deactivation may be associated with BWP switching (e.g., BWP switching may comprise the BWP activation/deactivation). A wireless device 2320 may receive (e.g., detect) at step 2302, (e.g., from a base station 2300), at least one message (e.g., RRC message) comprising parameters of a cell and one or more BWPs associated with the cell. The RRC message may comprise at least one of: RRC connection reconfiguration message (e.g., RRCReconfiguration), RRC connection reestablishment message (e.g., RRCRestablishment), and/or RRC connection setup message (e.g., RRCSetup). Among the one or more BWPs, at least one BWP may be configured as the first active BWP (e.g., BWP 1), one BWP as the default BWP (e.g., BWP 0). The wireless device 2320 may receive (e.g., detect) a command at step 2304 (e.g., RRC message, MAC CE or DCI message) to activate the cell at an nth slot. The wireless device 2320 may not receive (e.g., detect) a command activating a cell, for example, a PCell. The wireless device 2320 may activate the PCell at step 2312, for example, after the wireless device 2320 receives/detects RRC message comprising configuration parameters of the PCell. The wireless device 2320 may start monitoring a PDCCH transmission on BWP 1 based on (e.g., after or in response to) activating the PCell at step 2312.

The wireless device 2320 may start (or restart) at step 2314, a BWP inactivity timer (e.g., bwp-InactivityTimer) at an mth slot based on (e.g., after or in response to) receiving a DCI message 2306 indicating DL assignment on BWP 1. The wireless device 2320 may switch back at step 2316 to the default BWP (e.g., BWP 0) as an active BWP, for example, if the BWP inactivity timer expires at step 2308, at sth slot. At step 2310, the wireless device 2320 may deactivate the cell and/or stop the BWP inactivity timer, for example, if a secondary cell deactivation timer (e.g., sCellDeactivationTimer) expires at step 2310 (e.g., if the cell is a SCell). The wireless device 2320 may not deactivate the cell and may not apply or use a secondary cell deactivation timer (e.g., sCellDeactivationTimer) on the PCell, for example, based on the cell being a PCell.

A wireless device (e.g., a MAC entity of the wireless device) may apply or use various operations on an active BWP for an activated serving cell configured with a BWP.

The various operations may comprise at least one of: sending (e.g., transmitting) on UL-SCH, sending (e.g., transmitting) on RACH, monitoring a PDCCH transmission, sending (e.g., transmitting) PUCCH, receiving DL-SCH, and/or (re-) initializing any suspended configured uplink grants of configured grant Type 1 according to a stored configuration, if any.

A wireless device (e.g., a MAC entity of the wireless device) may not perform certain operations, for example, on an inactive BWP for an activated serving cell (e.g., each activated serving cell) configured with a BWP. The certain operations may include at least one of sending (e.g., transmit) on UL-SCH, sending (e.g., transmit) on RACH, monitoring a PDCCH transmission, sending (e.g., transmit) PUCCH, sending (e.g., transmit) SRS, or receiving DL-SCH. The wireless device (e.g., the MAC entity of the wireless device) may clear any configured downlink assignment and configured uplink grant of configured grant Type 2, and/or suspend any configured uplink grant of configured Type 1, for example, on the inactive BWP for the activated serving cell (e.g., each activated serving cell) configured with the BWP.

A wireless device may perform a BWP switching of a serving cell to a BWP indicated by a PDCCH transmission, for example, if a wireless device (e.g., a MAC entity of the wireless device) receives/detects the PDCCH transmission for the BWP switching and a random access procedure associated with the serving cell is not ongoing. A bandwidth part indicator field value may indicate the active DL BWP, from the configured DL BWP set, for DL receptions, for example, if the bandwidth part indicator field is configured in DCI format 1_1. A bandwidth part indicator field value may indicate the active UL BWP, from the configured UL BWP set, for UL transmissions, for example, if the bandwidth part indicator field is configured in DCI format 0_1.

A wireless device may be provided by a higher layer parameter such as a default DL BWP (e.g., Default-DL-BWP) among the configured DL BWPs, for example, for a primary cell. A default DL BWP is the initial active DL BWP, for example, if a wireless device is not provided with the default DL BWP by the higher layer parameter (e.g., Default-DL-BWP). A wireless device may be provided with a higher layer parameter such as a value of a timer for the primary cell (e.g., bwp-InactivityTimer)The wireless device may increment the timer, if running, every interval of 1 millisecond for frequency range 1 or every 0.5 milliseconds for frequency range 2, for example, if the wireless device may not detect a DCI format 1_1 for paired spectrum operation or if the wireless device may not detect a DCI format 1_1 or DCI format 0_1 for unpaired spectrum operation during the interval.

Procedures of a wireless device on the secondary cell may be same as on the primary cell using a timer value for a secondary cell and the default DL BWP for the secondary cell, for example, if the wireless device is configured for the secondary cell with a higher layer parameter (e.g., Default-DL-BWP) indicating a default DL BWP among the configured DL BWPs and the wireless device is configured with a higher layer parameter (e.g., bwp-InactivityTimer) indicating the timer value. A wireless device may use an indicated DL BWP and an indicated UL BWP on a secondary cell respectively as a first active DL BWP and a first active UL BWP on the secondary cell or carrier, for example, if the wireless device is configured by a higher layer parameter (e.g., Active-BWP-DL-SCell) associated with the first active DL BWP and by a higher layer parameter (e.g., Active-BWP-UL-SCell) associated with the first active UL BWP on the secondary cell or carrier.

A set of PDCCH candidates for a wireless device to monitor may be referred to as PDCCH search space sets. A search space set may comprise a CSS set or a USS set. A wireless device may monitor PDCCH transmission candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, for the primary cell, C-RNTI, MCS-C-RNTI, or CS-RNTI(s), and a USS set configured by SearchSpace in PDCCH-Config with searchSpaceType=ueSpecific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

A wireless device may determine a PDCCH transmission monitoring occasion on an active DL BWP based on one or more PDCCH transmission configuration parameters comprising at least one of: a PDCCH transmission monitoring periodicity, a PDCCH transmission monitoring offset, or a PDCCH transmission monitoring pattern within a slot. For a search space set (SS s), the wireless device may determine that a PDCCH transmission monitoring occasion(s) exists in a slot with number/quantity $n_{s,f}^{\mu}$ in a frame with number/quantity $n_f$ if $(n_f \cdot N_{slot}^{frame,\mu} + n_{s,f}^{\mu} - o_s) \bmod k_s = 0$. $N_{slot}^{frame,\mu}$ is a number/quantity of slots in a frame if numerology μ is configured. $o_s$ is a slot offset indicated in the PDCCH transmission configuration parameters. $k_s$ is a PDCCH transmission monitoring periodicity indicated in the PDCCH transmission configuration parameters. The wireless device may monitor PDCCH transmission candidates for the search space set for $T_s$ consecutive slots, starting from slot $n_{s,f}^{\mu}$, and may not monitor PDCCH transmission candidates for search space set s for the next $k_s - T_s$ consecutive slots. An USS at CCE aggregation level L∈{1, 2, 4, 8, 16} may be defined by a set of PDCCH transmission candidates for CCE aggregation level L.

A wireless device may decide, for a search space set s associated with CORESET p, CCE indexes for aggregation level L corresponding to PDCCH transmission candidate $m_{s,n_{CI}}$ of the search space set in slot $n_{s,f}^{\mu}$ for an active DL BWP of a serving cell corresponding to carrier indicator field value $n_{CI}$ as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p} / L \rfloor \right\} + i,$$

where, $Y_{p,n_{s,f}}{}^{\mu}=0$ for any CSS; $Y_{p,n_{s,f}}{}^{\mu}=(A_p \cdot Y_{p,n_{s,f}}{}^{\mu}{}_{-1}) \bmod D$ for a USS, $Y_{p,-1}=n_{RNTI}\neq 0$, $A_p=39827$ for p mod 3=0, $A_p=39829$ for p mod 3=1, $A_p=39839$ for p mod 3=2, and D=65537; i=0, . . . , L−1; $N_{CCE,p}$ is the number/quantity of CCEs, numbered/quantified from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH transmission is monitored; otherwise, including for any CSS, $n_{CI}=0$; $m_{s,n_{CI}}=0 \ldots, M_{s,n_{CI}}{}^{(L)}-1$, where $M_{s,n_{CI}}{}^{(L)}$ is the number/quantity of PDCCH transmission candidates the wireless device is configured to monitor for aggregation level L of a search space set s for a serving cell corresponding to $n_{CI}$; for any CSS, $M_{s,max}{}^{(L)}=M_{s,0}{}^{(L)}$; for a USS, $M_{s,max}{}^{(L)}$ is the maximum of $M_{s,n_{CI}}{}^{(L)}$ over configured $n_{CI}$ values for a CCE aggregation level L of search space set s; and the RNTI value used for $n_{RNTI}$ is the C-RNTI.

A wireless device may monitor a set of PDCCH transmission candidates according to configuration parameters of a search space set comprising a plurality of search spaces (SSs). The wireless device may monitor a set of PDCCH transmission candidates in one or more CORESETs for detecting one or more DCI messages. Monitoring may comprise decoding one or more PDCCH transmission candidates of the set of the PDCCH transmission candidates according to the monitored DCI formats. Monitoring may comprise decoding a DCI content of one or more PDCCH transmission candidates with possible (or configured) PDCCH transmission locations, possible (or configured) PDCCH transmission formats (e.g., number/quantity of CCEs, number/quantity of PDCCH transmission candidates in common SSs, and/or number/quantity of PDCCH transmission candidates in the UE-specific SSs) and possible (or configured) DCI formats. The decoding may be referred to as blind decoding. The possible DCI formats may be based on examples of FIG. 24.

FIG. 24 shows examples of various DCI formats. The various DCI formats may be used, for example, by a base station to send (e.g., transmit) control information (e.g., to a wireless device and/or to be used by the wireless device) for PDCCH transmission monitoring. Different DCI formats may comprise different DCI fields and/or have different DCI payload sizes. Different DCI formats may have different signaling purposes. DCI format 0_0 may be used to schedule PUSCH transmission in one cell. DCI format 0_1 may be used to schedule one or multiple PUSCH transmissions in one cell or indicate CG-DFI (configured grant-Downlink Feedback Information) for configured grant PUSCH transmission, etc.

A wireless device may be configured with configuration parameters of a buffer status report (BSR). The configuration parameters may comprise at least one of: a periodic BSR timer (e.g., periodicBSR-Timer), a BSR retransmission timer (e.g., retxBSR-Timer), an SR delay timer application indicator (e.g., logicalChannelSR-DelayTimerApplied), an SR delay triggering timer (e.g., logicalChannelSR-DelayTimer), an SR mask parameter (e.g., logicalChannelSR-Mask), or a logical channel group (LCG) group indication (e.g., logicalChannelGroup), etc. A wireless device may trigger a first BSR based on (e.g., after or in response to) the wireless device (e.g., a MAC entity of the wireless device) having new UL data available for a logical channel (LCH) which belongs to an LCG, for example, either if the new UL data belongs to a LCH with higher priority than the priority of any LCH containing available UL data which belong to any LCG, or if none of the LCHs which belong to an LCG contains any available UL data. The first BSR may be referred to as a regular BSR (or a first type of BSR) in this specification.

A wireless device may trigger a second BSR based on (e.g., after or in response to) UL resources being allocated and number/quantity of padding bits being equal to or larger than the size of a BSR MAC CE plus the BSR MAC CE's subheader. The second BSR may be referred to as a padding BSR (or a second type of BSR) in this specification. A wireless device may trigger a third BSR based on (e.g., after or in response to) a BSR retransmission timer (e.g., retxBSR-Timer) expiring, and at least one of the LCHs which belong to an LCG containing UL data. The third BSR may be the same type of BSR as the first BSR. The third BSR may be referred to as a regular BSR in this specification. A wireless device may trigger a fourth BSR based on (e.g., after or in response to) a periodic BSR timer (e.g., periodicBSR-Timer) expiring. The fourth BSR may be referred to as a periodic BSR (or a third type of BSR) in this specification.

A wireless device may start or restart the SR delay triggering timer (e.g., logicalChannelSR-DelayTimer) based on (e.g., after or in response to) a BSR (e.g., a regular BSR) being triggered for a first LCH. The first LCH may be associated with the SR delay timer application indicator (e.g., logicalChannelSR-DelayTimerApplied) being set to value true. The wireless device may stop the SR delay triggering timer (if the SR delay triggering timer is running) based on (e.g., after or in response to) the BSR being triggered for a second LCH for which the SR delay timer application indicator (e.g., a logicalChannelSR-DelayTimerApplied) is not configured or is set to value false if configured. A wireless device may report long BSR for LCGs (e.g., all LCGs) which have data available for transmission based on (e.g., after or in response) to more than one LCG having data available for transmission, for example, if the MAC PDU containing a BSR (e.g., a regular BSR or a periodic BSR) is to be built, otherwise the wireless device may report short BSR.

A wireless device may report short Truncated BSR of the LCG with the highest priority logical channel with data available for transmission, for example, if: the number/quantity of padding bits is equal to or larger than the size of the short BSR plus the short BSR's subheader but smaller than the size of the long BSR plus the long BSR's subheader, and more than one LCG has data available for transmission if a BSR (e.g., a padding BSR) is to be built and the number/quantity of padding bits is equal to the size of the short BSR plus the short BSR's subheader. A wireless device may report long Truncated BSR of the LCG(s) with the logical channels having data available for transmission following a decreasing order of the highest priority logical channel (with or without data available for transmission) in an LCG (e.g., each of the LCG(s)), and for equal priority, in increasing order of LCGID if: the number/quantity of padding bits is equal to or larger than the size of the short BSR plus the short BSR's subheader but smaller than the size of the long BSR plus the long BSR's subheader, and more than one LCG has data available for transmission if a BSR (e.g., a padding BSR) is to be built and the number/quantity of padding bits is greater than the size of the short BSR plus the short BSR's subheader.

A wireless device may report short BSR if: the number/quantity of padding bits is equal to or larger than the size of the short BSR plus the short BSR's subheader but smaller than the size of the long BSR plus the long BSR's subheader, and at most one LCG has data available for transmission if a BSR (e.g., a padding BSR) is to be built. A wireless device may report long BSR for LCGs (e.g., all LCGs) which have data available for transmission if the number/quantity of padding bits is equal to or larger than the size of the long BSR plus the long BSR's subheader for a BSR (e.g., a padding BSR). A wireless device (e.g., a MAC entity of the wireless device) may determine that an LCH that triggered a BSR is the highest priority LCH that has data available for transmission at the time the BSR is triggered, for example, if the BSR is triggered by a BSR retransmission timer (e.g., retxBSR-Timer) expiry.

A wireless device may instruct a multiplexing and assembly procedure to generate BSR MAC CE(s), (re-)start a periodic BSR timer (e.g., periodicB SR-Timer) except if generated BSRs are long or short Truncated BSRs and/or a BSR retransmission timer (e.g., retxBSR-Timer) is started or restarted based on (e.g., after or in response to): at least one BSR having been triggered and not been cancelled, and UL-SCH resources being available for a new transmission and the UL-SCH resources accommodating the BSR MAC CE plus the BSR MAC CE's subheader as a result of logical channel prioritization. A wireless device may trigger an SR based on (e.g., after or in response to): at least one BSR having been triggered and not been cancelled, a regular BSR of the at least one BSR having been triggered and the SR delay triggering timer (e.g., logicalChannelSR-DelayTimer) associated with a LCH for the regular BSR not being running, and no UL-SCH resource being available for a new transmission (or the MAC entity being configured with configured uplink grant(s) and the regular BSR being triggered for a LCH for which a SR mask parameter (e.g., logicalChannelSR-Mask) is set to false, or the UL-SCH resources available for a new transmission not meeting the LCP mapping restrictions configured for the LCH that triggered the BSR). A wireless device may determine that UL-SCH resources are available, for example, if the wireless device (e.g., a MAC entity of the wireless device) has an active configuration for either type (type 0 or type 1) of configured uplink grants, or if the wireless device (e.g., the MAC entity of the wireless device) has received (e.g., detected) a dynamic uplink grant, or if both of these conditions are met. UL-SCH resources being available, for example, as determined by the wireless device (e.g., the MAC entity of the wireless device) at a given point in time, may not imply that UL-SCH resources are available for use at that point in time.

A MAC PDU may comprise at most one BSR MAC CE, for example, even if multiple events have triggered a BSR. The regular BSR and the periodic BSR may have precedence over the padding BSR. A wireless device (e.g., a MAC entity of the wireless device) may restart a BSR retransmission timer (e.g., retxBSR-Timer) upon reception of a grant for transmission of new data on any UL-SCH. A wireless device may cancel triggered BSRs if the UL grant(s) can accommodate pending data available for transmission but is not sufficient to additionally accommodate the BSR MAC CE plus the BSR MAC CE's subheader.

A wireless device may cancel one or more BSRs (e.g., all BSRs) triggered prior to MAC PDU assembly, for example, if a MAC PDU is sent (e.g., transmitted) and this PDU includes a long or short BSR MAC CE which contains buffer status up to (and including) the last event that triggered a BSR prior to the MAC PDU assembly. A MAC PDU assembly may happen at any point in time between uplink grant reception and actual transmission of the corresponding MAC PDU. BSR and SR may be triggered after the assembly of a MAC PDU which may contain a BSR MAC CE, but before the transmission of this MAC PDU. BSR and SR may be triggered during MAC PDU assembly.

A base station may send (e.g., transmit) (e.g., to a wireless device) messages (e.g., RRC) comprising configuration parameters of a plurality of SR configurations. A first SR configuration in the plurality of SR configurations may correspond to one or more first LCHs of the plurality of LCHs. The wireless device may trigger a BSR based on (e.g., after or in response to) data becoming available for the LCH. The wireless device may determine that an SR configuration of an LCH that triggers a BSR is a corresponding SR configuration for a triggered SR. A wireless device may trigger an SR for requesting UL-SCH resource if the wireless device has new transmission (e.g., SR for BSR). A base station may send (e.g., transmit) (e.g., to a wireless device) at least one message comprising parameters indicating zero, and/or one or more SR configurations. AN SR configuration may comprise a set of PUCCH resources for SR on one or more BWPs, and/or one or more cells. At most one PUCCH resource for SR may be configured on a BWP. An SR (e.g., each SR) configuration may correspond to one or more logical channels. A logical channel (e.g., each logical channel) may be associated with zero or one SR configuration configured by the at least one message.

Configuration parameters of an SR configuration may comprise at least one of: an SR prohibit timer (e.g., sr_ProhibitTimer), a maximum number/quantity of SR transmission (e.g., sr_TransMax), a parameter indicating a periodicity and offset of SR transmission, and/or a PUCCH resource. The SR prohibit timer may be a duration in which the wireless device may be not allowed to send (e.g., transmit) the SR. The wireless device may stay active if an SR prohibit timer (e.g., sr_ProhibitTimer) is running and may monitor PDCCH transmission for detecting a DCI message indicating uplink scheduling grant(s). The maximum number/quantity of SR transmission may be a transmission number/quantity for which the wireless device may be allowed to send (e.g., transmit) the SR at most.

A wireless device may determine that (e.g., consider) an SR is pending until the SR is cancelled, for example, if the SR is triggered. Pending SR(s) may be cancelled, for example, if one or more UL grants accommodate pending data available for transmission. A wireless device may cancel one or more (e.g., all) pending SR(s) for BSR triggered before the MAC PDU assembly and/or stop a respective timer (e.g., sr-ProhibitTimer, and/or each respective sr-ProhibitTimer) based on (e.g., after or in response to) the MAC PDU being sent (e.g., transmitted). The MAC PDU may comprise at least a long or short BSR MAC CE which may contain buffer status up to (and including) the last event that triggered a BSR prior to the MAC PDU assembly. The wireless device may cancel one or more (e.g., all) pending SR(s) for BSR triggered according to the BSR procedure and stop a respective timer (e.g., sr-ProhibitTimer, and/or each respective sr-ProhibitTimer), for example, if the UL grant(s) can accommodate pending data (e.g., all pending data) available for transmission.

A base station may send (e.g., transmit to a wireless device) one or more RRC messages comprising configuration parameters of one or more PUCCH resources. A PUCCH resource may be identified/indicated by at least one of: frequency location (e.g., starting PRB) or a PUCCH format associated with initial cyclic shift of a base sequence and time domain location (e.g., starting symbol index). A wireless device may send (e.g., transmit) a PUCCH in a PUCCH resource for a corresponding SR configuration if the wireless device transmits a positive SR. For a positive SR transmission using PUCCH format 0, a wireless device may send (e.g., transmit) a PUCCH by setting the cyclic shift to a first value (e.g., 0). A wireless device may send (e.g., transmit) a PUCCH by setting a first bit, before BPSK modulated on a sequence, to a first value (e.g., 0), for example, for a positive SR transmission using PUCCH format 1. A wireless device may determine one or more PUCCH resources on an active BWP as valid PUCCH resources at a time of SR transmission occasion. A wireless device may send (e.g., transmit) a PUCCH in a PUCCH resource associated with an SR configuration if the wireless device transmits a positive SR. A wireless device may send (e.g., transmit) the PUCCH using PUCCH format 0, or PUCCH format 1, according to the PUCCH configuration.

An SR may be multiplexed with HARQ-ACK or CSI on a PUCCH format. A wireless device may decide a cyclic shift of the base sequence based on the initial cyclic shift and a first cyclic shift based on one or more values of one or more HARQ-ACK bits, for example, if a positive SR is multiplexed with HARQ-ACK. A wireless device may decide a cyclic shift of the base sequence based on the initial cyclic shift and a second cyclic shift based on one or more value of the one or more HARQ-ACK bits, for example, if a negative SR is multiplexed with HARQ-ACK. The first cyclic shift may be different from the second cyclic shift.

A wireless device may maintain an SR transmission counter (e.g., SR_COUNTER) associated with an SR configuration. an SRA wireless device may set the SR_COUNTER of the SR configuration to a first value (e.g., 0), for example, if an SR of an SR configuration is triggered, and there are no other SRs pending corresponding to the same SR configuration. The SR_COUNTER may be incremented, for example, if a transmission of SR is unsuccessful. The random access procedure may start based on (e.g., after or in response to) the counter reaching the first number/quantity. The wireless device may send (e.g., transmit) a random access preamble based on (e.g., after or in response to) starting the random access procedure. The wireless device may perform one or more of the following instructions, for example, if a transmission of SR is unsuccessful and/or if the random access procedure is started: the wireless device may notify RRC to release PUCCH for one or more serving cells (e.g., all serving cells); the wireless device may notify RRC to release SRS for one or more serving cells (e.g., all serving cells); the wireless device may clear any configured downlink assignments and uplink grants; and/or the wireless device may clear one or more PUSCH resources (e.g., any PUSCH resources) for semi-persistent CSI reporting.

A (communication) satellite may comprise a space-borne vehicle (e.g., satellite, balloons, air ships, high altitude platform stations, unmanned aircraft system, and the like). The satellite may communicate a payload (e.g., a bent pipe payload, and/or any other type of payload). The satellite may forward a received signal (e.g., from another satellite or a wireless device) back to the earth. The signal may be forwarded back with amplification and/or a shift between service link frequency (point or a bandwidth) and feeder link frequency. The signal may be forwarded back with an on-board processing. The satellite may comprise a regenerative payload telecommunication transmitter with the on-board processing used to demodulate and/or decode the received signal and/or regenerate the signal before sending the signal back to the earth.

Figure 25A:
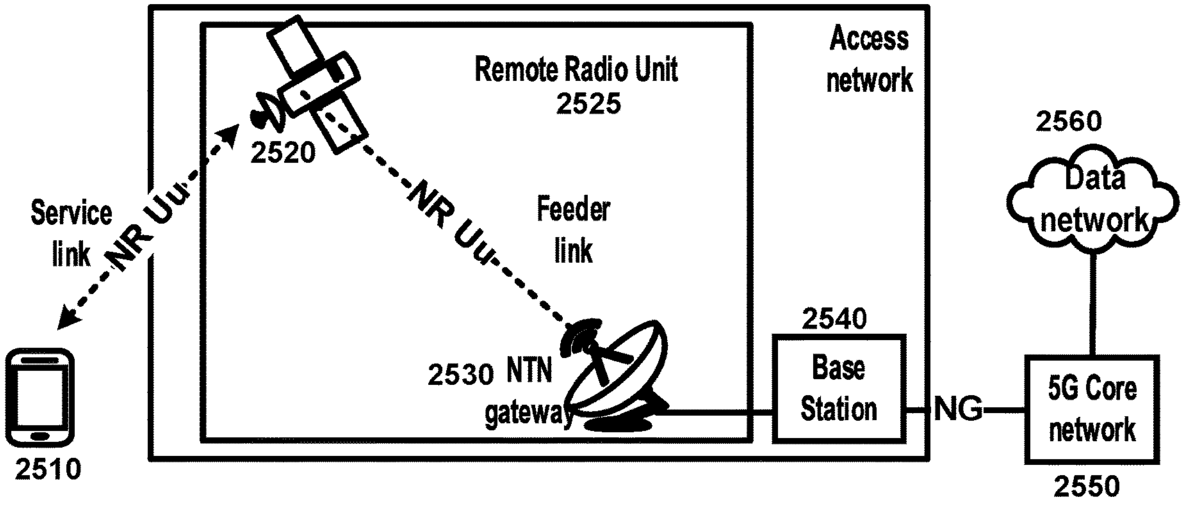
FIG. 25A and FIG. 25B show examples of communications in a satellite-based non-terrestrial network (NTN).

FIG. 25A shows an example of communications in a non-terrestrial network (NTN). The NTN may comprise a satellite-based NTN. An NTN architecture may correspond to a transparent satellite model. The NTN architecture may comprise one or more of: a wireless device 2510, a satellite 2520, an NTN gateway 2530, a base station 2540, a 5G core network 2550, and/or a data network 2560. The satellite 2520 may behave as a remote radio unit (RRU) 2525 communicating with the NTN gateway 2530. The satellite 2520 may implement frequency conversion and radio frequency amplification in the uplink and/or downlink directions. The NTN gateway 2530 may connect to (and/or communicate with) the base station 2540 on the ground. The wireless device 2510 may send (e.g., transmit) and receive via the satellite 2520. The satellite 2520 (e.g., an RRU 2525) may correspond to an analogue RF repeater that repeats the NR-Uu radio interface from a service link (e.g., between the satellite and the wireless device) to a feeder link (e.g., between the NTN gateway and the satellite), and vice-versa.

Figure 25B:
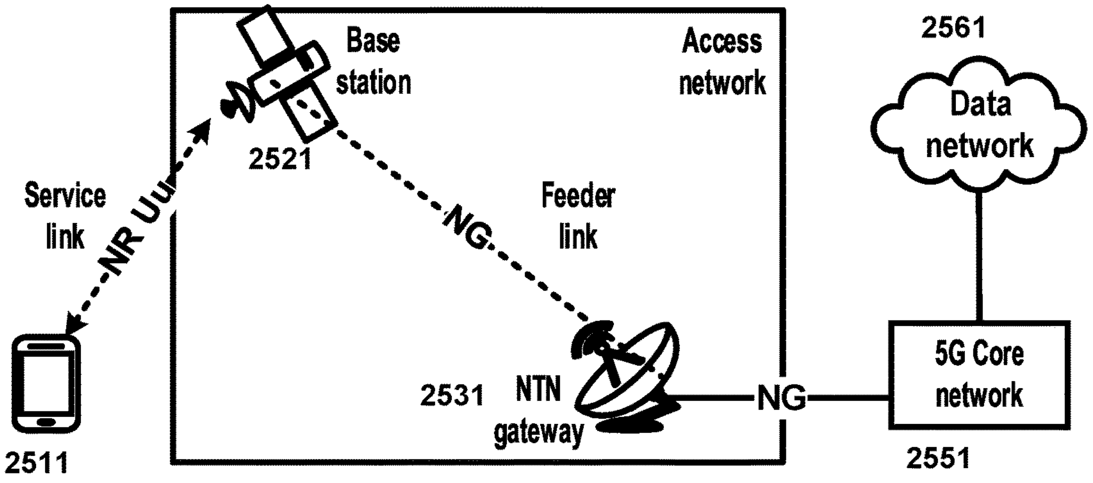

FIG. 25B shows an example of communications in an NTN. The NTN may comprise a satellite-based NTN. An NTN architecture may correspond to a regenerative satellite model. The NTN architecture may comprise one or more of: a wireless device 2511, a satellite 2521, an NTN gateway 2531, a 5G core network 2551, and/or the like. The satellite 2521 may regenerate signals received (e.g., detected) from earth (e.g., from the wireless device 2511 or from the NTN gateway 2531). The satellite 2521 may behave as a base station.

FIG. 26 shows examples of various NTN communications. A satellite may be placed into a low-earth orbit (LEO) at an altitude between 250 km to 1500 km, with orbital periods ranging from 90-130 minutes. A mean orbital velocity, which may maintain a stable LEO, may be 7.8 km/s and may be reduced with increased orbital altitude. A mean orbital velocity for circular orbit of 200 km may be 7.79 km/s. A mean orbital velocity for circular orbit 1500 km may be 7.12 km/s. A mean orbital velocity for circular orbit of any other distance may be at any other rate, for example, based on one or more variables (e.g., size, mass, location, power, capability, configuration, etc.). The position of the LEO satellite may change, for example, from the perspective of a given point on the surface of the earth.

A satellite may be placed into a medium-earth orbit (MEO) at an altitude between 5000 to 20000 km, with orbital periods ranging from 2 hours to 14 hours. A satellite may be placed into a geostationary satellite earth orbit (GEO) at 35,786 km altitude, and directly above the equator. The GEO may equate to an orbital velocity of 3.07 km/s and an orbital period of 1,436 minutes, which may equate to almost one sidereal day (23.934461223 hours). Any other altitude and/or location may be used, for example, based on one or more variables (e.g., size, mass, location, power, capability, configuration, etc.). The position of the GEO may not move, for example, from the perspective of a given point on the surface of the earth. A satellite network may be a network or network segment that uses a space-borne vehicle to embark a transmission equipment relay node or a base station. An NTN may be a network which uses a satellite as an access network, a backhaul interface network, or both, for example, if a terrestrial network is a network located on the surface of the earth. A (communication) satellite may generate one or more beams (e.g., several beams) over a given area.

A footprint of a beam of a satellite may be in an elliptical shape (e.g., which may be considered as a cell). The footprint of a beam may be referred to as a spotbeam. The footprint of a beam may move over the Earth's surface with the satellite movement. The footprint of a beam may be Earth fixed with some beam pointing mechanism used by the satellite to compensate for the satellite's motion. The size of a spotbeam may depend on the system design. The size of a spotbeam may range from tens of kilometers to a few thousand kilometers, or any other size.

A propagation delay (e.g., between a satellite and the ground or between multiple satellites) may be the amount of time it takes for the head of the signal to travel from a sender to a receiver or vice versa. For uplink, the sender may be a wireless device and the receiver may be a base station/access network. For downlink, the sender may be a base station/ access network and the receiver may be a wireless device. The propagation delay may vary depending on a distance between the sender and the receiver.

FIG. 27 shows examples of various propagation delays of different NTN communications. The propagation delays may correspond to NTNs of different altitudes. A propagation delay in the figure may be one-way latency. One-way latency may be an amount of time to propagate through a telecommunication system from a terminal to the receiver (e.g., base station, eNB, gNB, RRU of a base station). The round-trip propagation delay (RTD) may comprise service link delay (e.g., between the satellite and the wireless device) and feeder link delay (e.g., between the NTN gateway and the satellite), for example, for the transparent satellite model of GEO case. The RTD may be four times of 138.9 milliseconds (approximately 556 milliseconds), or any other time duration (e.g., based on distance and/or processing time).

An RTD of the GEO satellite may be more than a few seconds if processing time and congestion are weighed. An RTD of a terrestrial network (e.g., NR, E-UTRA, LTE) may be negligible. The RTD of a terrestrial network may be less than 1 millisecond or any other duration (e.g., based on distance and/or processing time). The RTD of a GEO satellite may be longer, such as hundreds of times longer or any other duration (e.g., based on distance and/or processing time), than the RTD of a terrestrial network.

A maximum RTD of a LEO satellite with transparent payload with altitude of 600 km may be 25.77 milliseconds, or any other duration (e.g., based on distance and/or processing time). The differential RTD may be 3.12 milliseconds, or any other duration (e.g., based on distance and/or processing time). The differential RTD within a beam of the satellite may be calculated based on the maximum diameter of the beam footprint at nadir. The differential RTD may imply the difference between communication latency that two wireless devices (e.g., one is located closer to the edge of the cell/beam and one is located closer to the cell/beam center) may experience for communicating with an NTN node. The maximum RTD may be 41.77 milliseconds, for example, for a LEO satellite with transparent payload with altitude of 1200 km. The differential RTD may be 3.18 milliseconds.

Figure 28A:
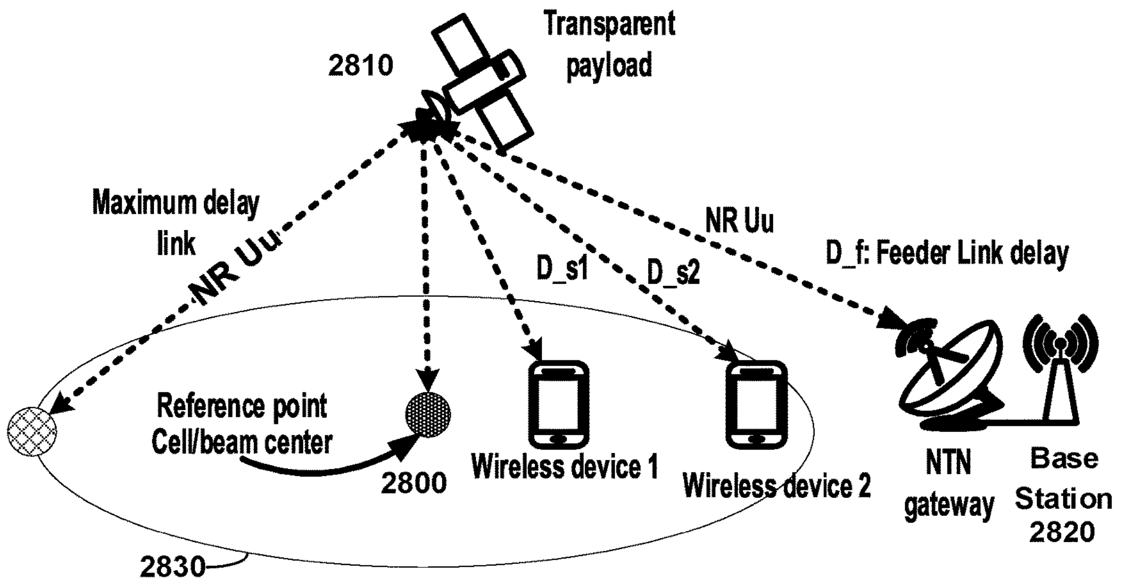
FIG. 28A and FIG. 28B show example communications in an NTN.
Figure 28B:
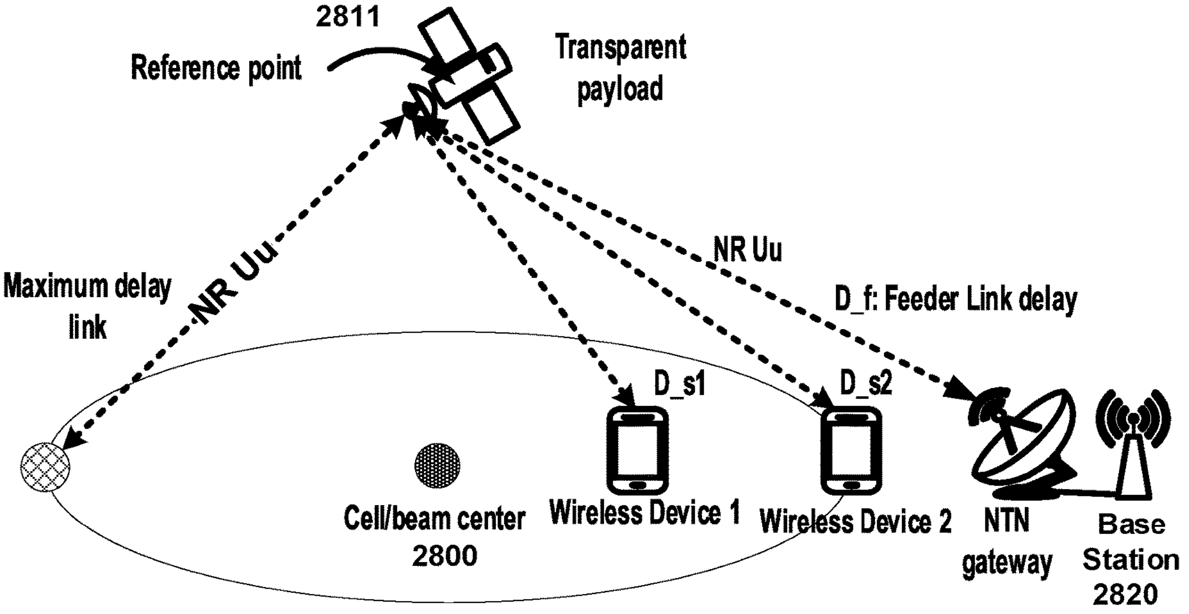

FIG. 28A and FIG. 28B show examples of communications in an NTN. A reference point (e.g., a cell/beam center 2800, a satellite 2810) may be associated (e.g., linked) with a wireless device via a link (e.g., service links D_s1 or D_s2) with a propagation delay of a cell/beam of a satellite network. A satellite network may comprise at least one of: a (transparent) satellite 2810, feeder link, ground base station 2820, a cell/beam, and/or service links (e.g., D_s1, D_s2) of two or more wireless devices (e.g., wireless device 1, wireless device 2).

In FIG. 28A and/or FIG. 28B, a first wireless device (e.g., wireless device 1) may be located closer to a reference point (e.g., the cell/beam center 2800, the satellite 2810). The wireless device 1 may experience smaller RTD compared to a second wireless device (e.g., wireless device 2) that is located closer to an edge 2830 of the cell/beam or further away from the reference point. A link (e.g., D_s2) associated with the second wireless device may experience a longer propagation delay in the cell/beam than a link (e.g., D_s1) associated with the first wireless device. A link between a wireless device and the cell/beam center 2800 may experience a minimum or a smaller propagation delay in the cell/beam. The cell/beam center 2800 may be referred to as a reference point. A reference point of a satellite network may be provided to a wireless devices for facilitating the estimation of the propagation delay in a service link. In FIG. 28A, the reference point (e.g., the cell/beam center 2800, the satellite 2810) may be on or closer to the ground and may have an altitude larger than those of the wireless devices in the cell/beam so that that the propagation delay to the reference point may be the smallest propagation delay in the cell/beam. In FIG. 28B, the reference point may be a satellite 2811.

The propagation delays between the base station 2820 and the reference point in the examples of FIG. 28A and FIG. 28B may be considered as common delays as the propagation delays may be experienced with the wireless devices in the cell/beam. The base station 2820 may provide a value of a common delay to wireless devices in the cell/beam allowing the wireless devices to estimate their corresponding RTD. The satellite network may provide resources/signaling for compensating for changes that may happen to the value of the common delay as a result of the satellite movement, feeder link switch, or a change in the location of the reference point.

A Timing Advance (e.g., in NTN 5G NR) may be based on the orthogonal frequency-division multiple access (OFDMA) as a multi-access scheme in the uplink. Transmissions from different wireless devices in a cell/beam may be time-aligned at the base station 2820 and/or the satellite 2811 to maintain uplink orthogonality. Time alignment may be achieved by using different timing advance (TA) values at different wireless devices to compensate for their different propagation delays or RTD.

Figure 29:
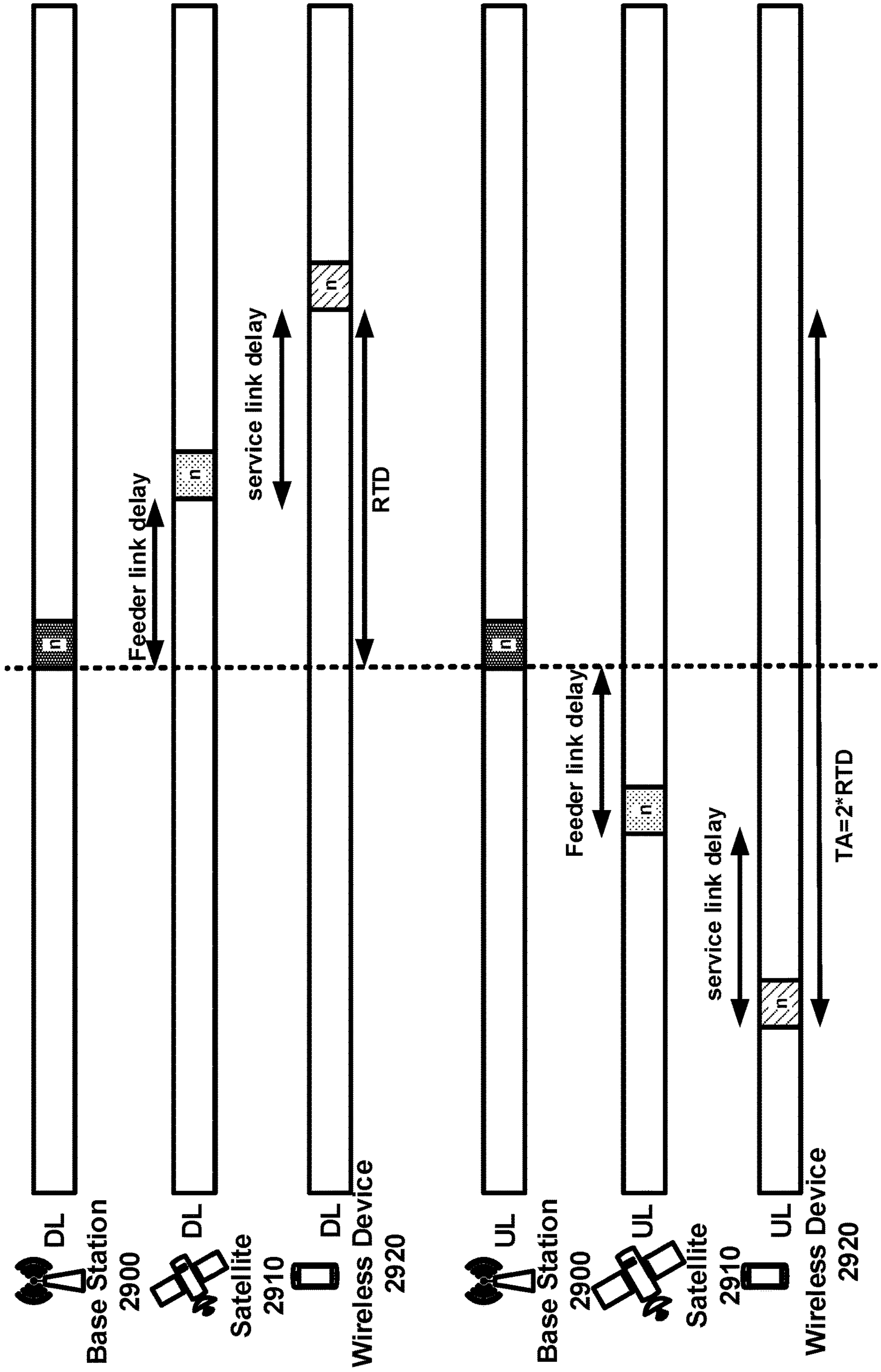
FIG. 29 shows an example of timing synchronization in an NTN.

FIG. 29 shows an example of timing synchronization in an NTN (e.g., TA determination for a satellite network). A base station 2900 may not compensate a feeder link delay. The wireless device 2920 may compensate for an RTD (e.g., a summation of feeder link delay and service link delay). UL and DL frame timing may be aligned at the base station 2900. The UL and DL frame timing may not be aligned at the satellite 2910. In FIG. 29, the wireless device 2920 may set TA value equal twice the RTD. The wireless device 2920 may measure the RTD before applying or using TA. The base station 2900 may provide a value of a common delay of the cell/beam to the wireless devices 2920 in the cell/ beam by using broadcast system information (e.g., SIB1).

A common delay may comprise a feeder link delay between the satellite 2910 and the base station 2900. The common delay may further comprise part of a (common) service link delay. The (common) service link delay may be common to the service links of the cell/beam. The (common) service link delay may be between the base station 2900 and a reference point of FIG. 28A at the cell/beam center 2800 with a given altitude closer to the surface of the earth. The wireless device 2920 may calculate the service link delay by estimating a propagation delay between the wireless device 2920 and the reference point (e.g., the cell/beam center 2800, the satellite 2810), for example, if the reference point is provided as part of the broadcast system information. A common delay may comprise a feeder link delay between the satellite 2910 and the base station 2900. The common delay may not comprise a part of a (common) service link delay, for example, if the satellite 2910 is the reference point, as the example of FIG. 28B. The wireless device 2920 may calculate the service link delay by estimating a propagation delay associated with the satellite 2910, for example, if the reference point is not configured or if the satellite 2910 is the reference point, as the example of FIG. 28B.

Figure 30:
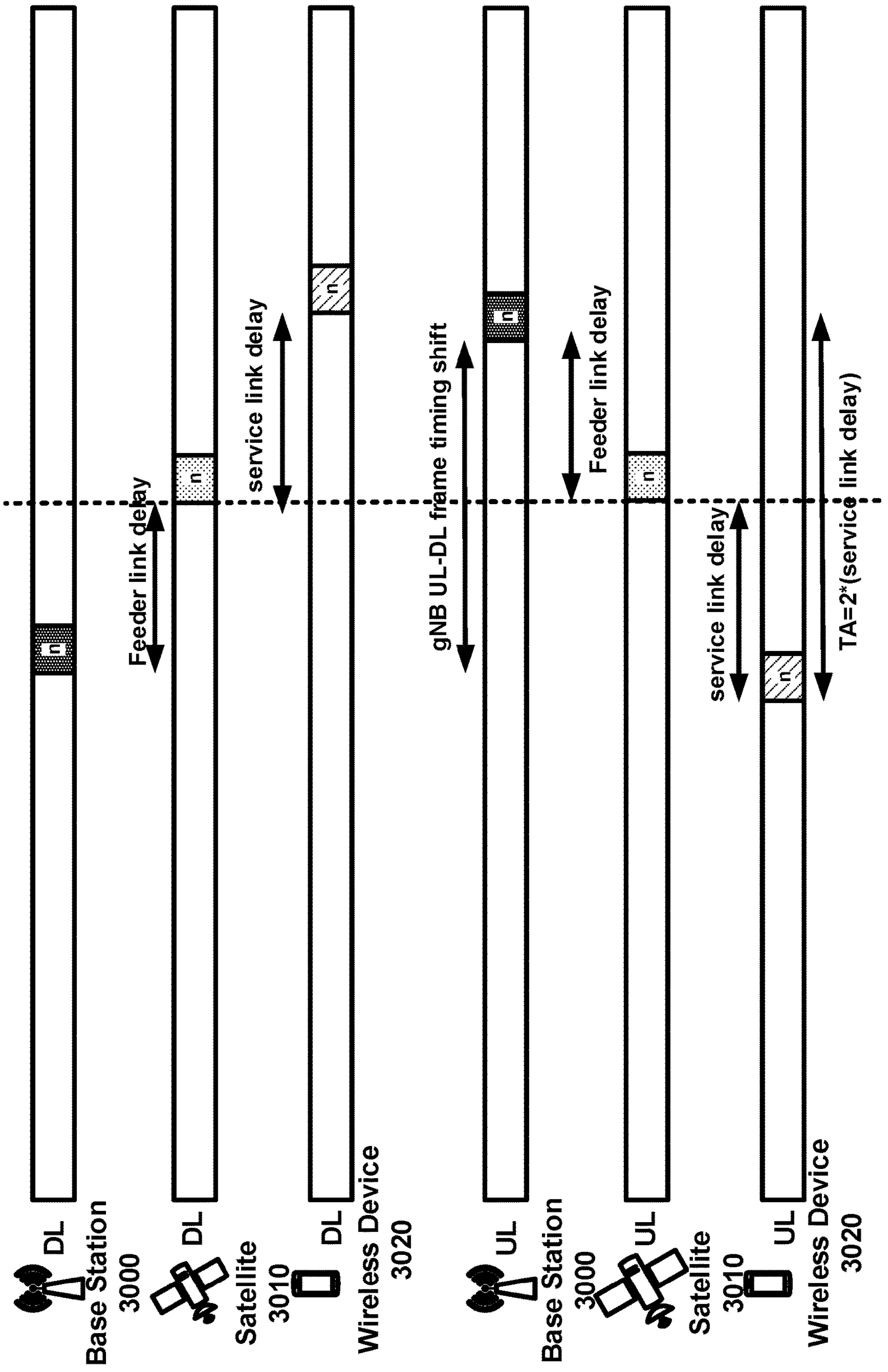
FIG. 30 shows an example of time synchronization in an NTN.

FIG. 30 shows an example of time synchronization in an NTN (e.g., TA determination for a satellite network). A base station 3000 may compensate a feeder link delay, for example, different from FIG. 29. The wireless device 3020 may compensate for the service link delay. In FIG. 30, the UL and DL frame timing may be aligned at the satellite 3010. The time alignment between the UL and DL channels at the base station 3000 may not hold as a result of an UL-DL frame timing alignment shift. The UL-DL frame timing alignment shift may be provided by the base station 3000.

In FIG. 30, the wireless device 3020 may set TA value. The TV value may be set to equal twice a service link delay, or any other quantity based on a service link delay. The wireless device 3020 may measure the service link delay before applying and/or using TA. The base station 3000 may provide a value of a common delay of the cell/beam to the wireless devices 3020 in the cell/beam by using broadcast system information (e.g., SIB1). A common delay may comprise a part of a (common) service link delay. The (common) service link delay may be common to the service links of the cell/beam. The (common) service link delay may be between the base station 3000 and a reference point at the cell/beam center 2800 with a given, as the example of FIG. 28A. The wireless device 3020 may calculate the service link delay by estimating a propagation delay between the wireless device 3020 and the reference point (e.g., the cell/beam center 2800, the satellite 2810), for example, if the reference point is provided as part of the broadcast system information. A common delay may comprise a feeder link delay between the satellite 3010 and the base station 3000. The common delay may not comprise a part of a (common) service link delay, for example, if the satellite 3010 is the reference point, as the example of FIG. 28B. The wireless device 3020 may calculate the service link delay by estimating a propagation delay associated with the satellite 3010, for example, if the reference point is not configured or if the satellite 3010 is the reference point, as the example of FIG. 28B.

A wireless device may estimate a propagation delay of a service link with an aid of a reference point, if provided. The wireless device may be provided by the orbital movement of the satellites (e.g., ephemeris of the satellites) or other information. The ephemeris of the satellite may provide the wireless device with the movement pattern of the satellite allowing the wireless device to update the TA during a time period. The ephemeris may be periodically broadcasted by the satellite along with an indication indicating the rate by which the TA calculations carried out by the wireless device using the ephemeris may be updated for accounting for the movement of the satellite. The ephemeris may not accurately provide the location of the satellite if the periodicity in which the ephemeris is broadcasted is relatively long. The ephemeris may not accurately provide the location of the satellite if the movement of the satellite gradually drifts from the predicted orbital movement at the wireless device using the ephemeris. A wireless device may frequently update the base station with associated RTD by using MAC CE commands, for example, if such mechanisms are provisioned (e.g., if an update is required). Signaling overhead to update the base station regarding the value of RTD may become significant, for example, if the wireless device moves (e.g., a passenger in a high-speed train or a commercial airplane).

Figure 31:
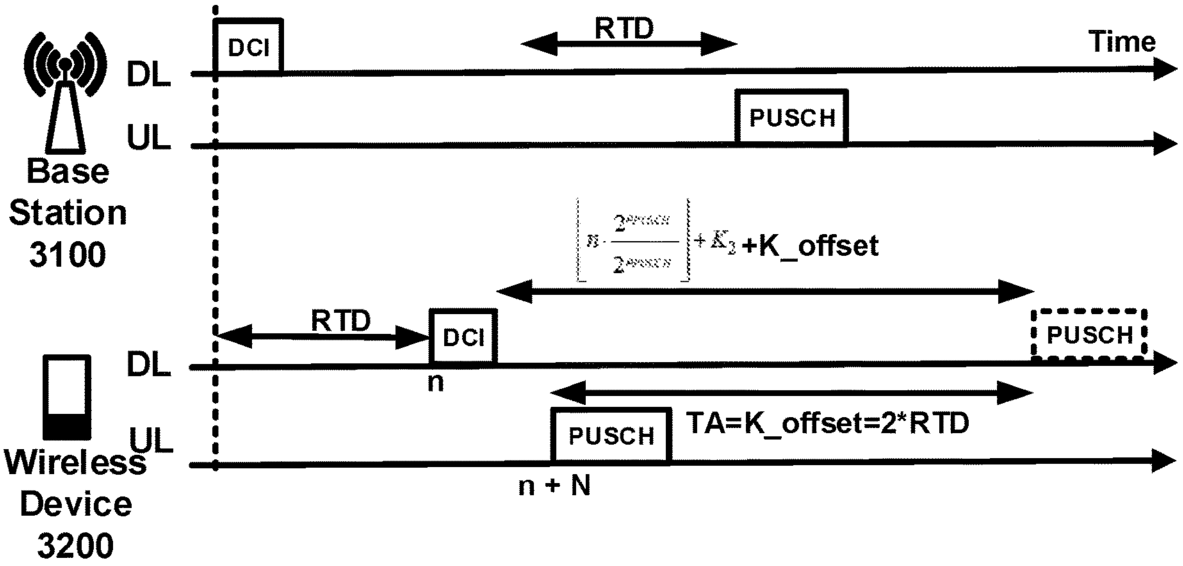
FIG. 31 shows an example of time advance determination for transmission in an NTN.

FIG. 31 shows an example of time advance determination for transmission in an NTN (e.g., timing alignment for a satellite network). A wireless device 3200 may receive (e.g., detect) a DCI message, at time slot n, and scheduling a PUSCH transmission with a timing indication. The wireless device 3200 may receive (e.g., detect) one or more time offsets for the scheduling timing (denoted by K_offset in FIG. 31). A first time offset (e.g., K_offset) of the one or more time offsets may be used to compensate for the RTD between the base station 3100 and the wireless 3200 device. The first time offset may be referred to as a wireless device-specific time offset (e.g., K_offset_UE).

A second time offset (K_offset) of the one or more time offsets may be a cell/beam-specific offset (e.g., K_offset_beam). The cell/beam-specific offset may be used for compensating for a maximum RTD of the cell beam. A value of K_offset_beam may be provided via the broadcast system information. The value of K_offset_beam may not receive feedback from the wireless device 3200 regarding their corresponding RTD. A value of K_offset_beam may be larger than the value of K_offset_UE.

The difference between K_offset_beam and K_offset_UE may be in order or differential delay of the cell/beam (e.g., around 3.41 milliseconds for a transparent LEO satellite) for example, if the wireless device 3200 is located closer to the cell/beam center 2800 (e.g., wireless device 1 in FIG. 28A). The value of K_offset_beam may be closer to the value of K_offset_UE. The difference between K_offset_beam and K_offset_UE may be relatively smaller than differential delay of the cell/beam (e.g., around 3.41 milliseconds for a transparent LEO satellite), for example, if the wireless device 3200 is located closer to the cell edge 2830 (e.g., wireless device 2 in FIG. 28A).

The wireless device 3200 may determine a PUSCH scheduling timing based on a PDCCH-to-PUSCH timing offset and one or more time offsets (e.g., K_offset_beam and/or K_offset_UE). The PDCCH-to-PUSCH timing offset may be $$\left\lfloor n \cdot \frac{2^{\mu_{PUSCH}}}{2^{\mu_{PDCCH}}} \right\rfloor + K_2,$$

where n is the slot with the scheduling DCI message, and $K_2$ is indicated as a number/quantity of slots (based on the numerology of the PUSCH transmission) in a time domain resource allocation (TDRA) filed of a DCI message and, $\mu_{PUSCH}$ and $\mu_{PDCCH}$ are the subcarrier spacing configurations for PUSCH transmission and PDCCH transmission, respectively.

The base station 3100 may determine a value of K_offset_UE based on an estimated RTD of a link between the base station 3100 and the wireless device 3200. The wireless device 3200 may determine a TA value for the PUSCH transmission, based on at least one of: K_offset_UE or K_offset_beam. The wireless device 3200 may send (e.g., transmit), for example, based on the determined TA value and the PDCCH-to-PUSCH timing offset, the PUSCH transmission at slot n+N.

Figure 32:
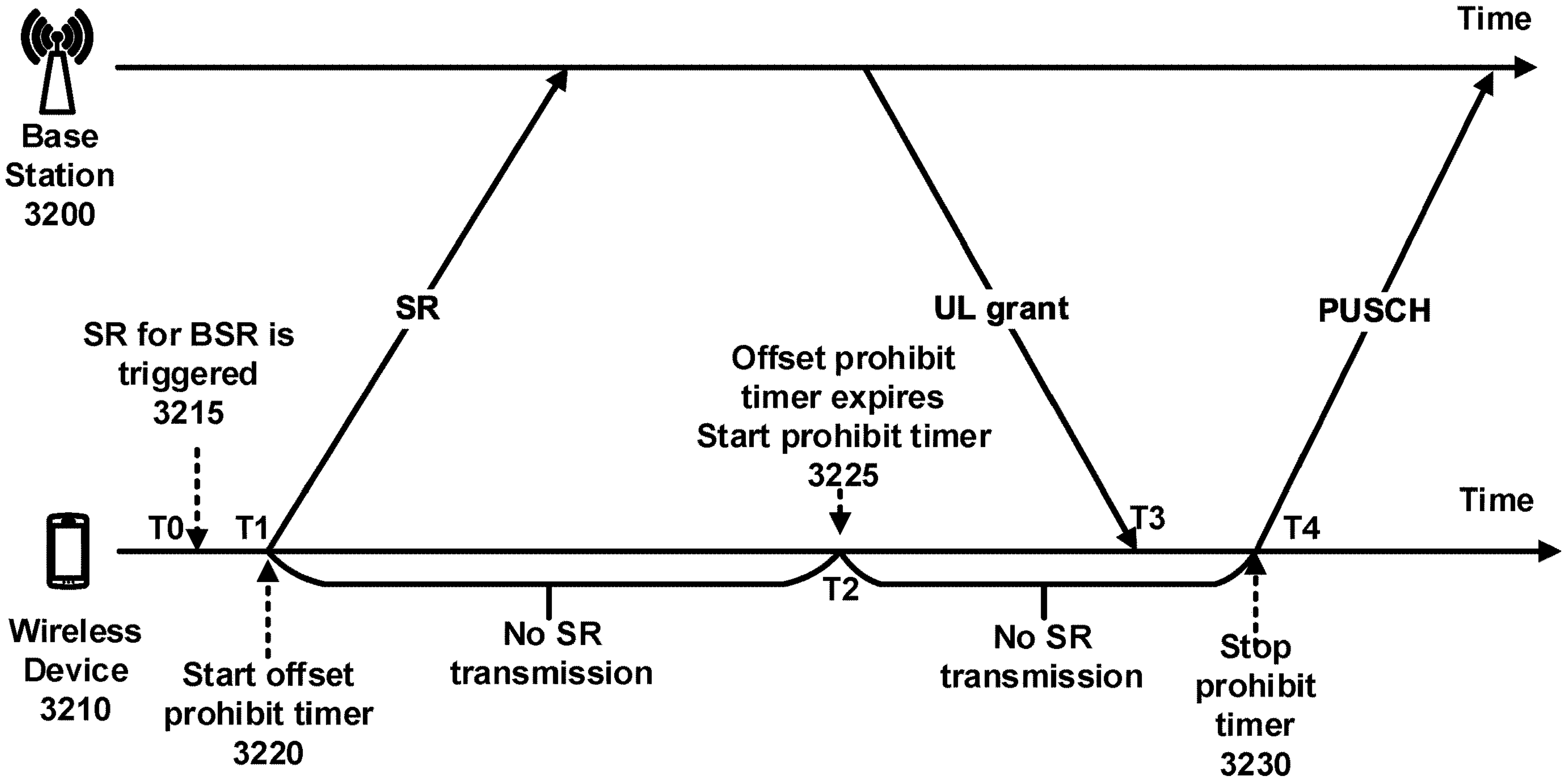
FIG. 32 shows an example of communications in an NTN.

FIG. 32 shows an example of communications in an NTN (e.g., SR based BSR procedure). At step 3215, a wireless device 3210 may trigger an SR due to arrival of data (e.g., BSR trigger) to communicate with an NTN node. The wireless device 3210 may trigger a BSR based on examples as described herein. The wireless device 3210 may send, for example, based on (e.g., after or in response to) the triggered SR, the SR on a PUCCH associated with the SR. The wireless device 3210 may determine, for example, if a DRX cycle is configured, that the active time for serving cells in a DRX group may comprise a time in which the SR is sent on PUCCH and is pending.

In FIG. 32, the wireless device 3210 may not receive (e.g., detect), for example, as a result of long RTD in a satellite network, an UL grant as a response to the transmission of the SR (e.g., within a time period if an SR prohibit timer, for example, sr_ProhibitTimer, is running) The wireless device 3210 may not expect receiving the UL grant corresponding to the SR transmission, for example, if a time window with the length of at least 2*RTD is started from the transmission of the SR.

At step 3220, the wireless device 3210 may delay a start of sr_ProhibitTimer by an offset, for example, for accommodating the long RTD in the satellite network and in a DRX operation. The wireless device 3210 may delay a start of sr_ProhibitTimer when the wireless device 3210 communicates with an NTN node. The delaying the start of the timer may reduce its active time for the serving cell, for example, if a DRX cycle is configured. The delaying the start of the timer may reduce power consumption of the wireless device 3210, for example, by reducing PDCCH transmission monitoring.

At step 3220, the wireless device 3210 may start an offset prohibit timer (or an SR delay start timer, or an SR prohibit delay start timer, etc.), for example, if the SR is sent (e.g., transmitted) (e.g., time T1 in FIG. 32). The wireless device 3210 may determine a timer value of the offset prohibit timer, for example, based on at least one of a cell/beam-specific offset for PDSCH/PUSCH scheduling timing (e.g., K_offset_beam) or a wireless device-specific offset for PDSCH/PUSCH scheduling timing (e.g., K_offset_UE) if these offset parameters (K_offset_beam, K_offset_UE) are set, by the base station 3200, to a value equal to 2*RTD.

The wireless device 3210 may not be allowed to send (e.g., transmit) the SR for the time window from the transmission of the SR and before an expiry of the offset prohibit timer at step 3225. The wireless device 3210 may start an SR prohibit timer (e.g., sr_ProhibitTimer) upon the expiry of the offset prohibit timer as at the time of T2 if the SR is pending. The wireless device 3210 may not allow to send (e.g., transmit) SR if the SR prohibit timer (e.g., sr_ProhibitTimer) is running.

The wireless device 3210 may receive (e.g., detect) an UL grant (e.g., time T3 in FIG. 32). The UL grant may accommodate the pending data. At step 3230, the wireless device 3210 may stop the SR prohibit timer (e.g., sr_ProhibitTimer) as a result of the transmission of a PUSCH containing the pending data at time T4 in FIG. 32. The wireless device 3210 may cancel the SR at time T4. The wireless device 3210 may have available UL-SCH resources if the offset prohibit timer is running. The availability of the UL-SCH resources may be as a result of either of Type 1 or Type 2 configured grants or a dynamic grant. The wireless device 3210 may stop the offset prohibit timer based on (e.g., after or in response to) the transmission of a PUSCH containing the pending data. The wireless device 3210 may cancel the SR.

In an NTN (e.g., FIG. 25A and/or FIG. 25B), the base station 2540 may send (e.g., transmit), to the wireless device 2510, configuration parameters indicating a relatively larger-scale timing offset for PDSCH/PUSCH scheduling based on a relatively larger propagation delay (e.g., FIG. 26 and/or FIG. 27) between the satellite 2520 and the base station 2540/the wireless device 2510, between multiple satellites. The wireless device 2510 may conduct an RA (e.g., 2-step or 4-step) procedure for a triggered BSR if new uplink data is available for uplink transmission. Using RA procedure, particularly a 2-step RA procedure, for the BSR, instead of using SR for the BSR in a terrestrial network, may reduce latency considering a relatively longer propagation delay (e.g., in comparison with a propagation delay in the terrestrial network) in the NTN system.

A wireless device may trigger a BSR based on (e.g., after or in response to) uplink data being available for transmission. The wireless device may trigger an SR based on (e.g., after or in response to) no uplink radio resource being available for transmission of the uplink data. The wireless device may delay triggering the SR based on (e.g., after or in response to) the SR delay triggering timer (e.g., logicalChannelSR-DelayTimer) being running for a logical channel triggering the BSR, for example, based on a low QoS requirement for transmission of the uplink data of the logic channel A base station may send (e.g., transmit) to the wireless device configuration parameters of the logic channel. The configuration parameter may indicate a timer value for the SR delay triggering timer (e.g., logicalChannelSR-DelayTimer) associated with the logic channel. The wireless device may start the SR delay triggering timer (e.g., logicalChannelSR-DelayTimer) based on (e.g., after or in response to) triggering the BSR. The wireless device may not trigger the SR, for example, if the SR delay triggering timer (e.g., logicalChannelSR-DelayTimer) is running. The wireless device may receive (e.g., detect) uplink grant (e.g., configured grant, dynamic uplink grant), for example, if the timer is running. The wireless device may send (e.g., transmit) the uplink data via the uplink grant, before the wireless device triggers the SR associated with the BSR. The wireless device may cancel the BSR, for example, after sending (e.g., transmitting) the uplink data.

A wireless device may wait to receive (e.g., detect), from a base station, an uplink grant corresponding to a transmission of an SR, for example, if the BSR is based on SR (e.g., in a terrestrial network), after the wireless device transmits the SR to the base station. The wireless device, based on (e.g., after or in response to) receiving the uplink grant, may send (e.g., transmit) the uplink data (or a BSR MAC CE) to the base station. A wireless device may conduct a 2-step RA procedure for a triggered BSR based on (e.g., after or in response to) uplink data being available for transmission, for example, in an NTN system. The wireless device may send (e.g., transmit) uplink data (or a BSR MAC CE) via a PUSCH resource associated with the 2-step RA procedure. Compared with SR based BSR, using 2-step RA based BSR may reduce data transmission latency.

A wireless device may trigger a BSR based on (e.g., after or in response) to uplink data being available for transmission. The wireless device may trigger an RA procedure (e.g., 2-step RA type) based on (e.g., after or in response to) triggering the BSR. The wireless device may have difficulty in determining when to trigger the RA procedure (e.g., immediately or with a delay). As described herein, an RA procedure for a BSR may be improved in an NTN to reduce power consumption of a wireless device and/or reduce uplink interferences to other wireless devices.

A wireless device may delay triggering a 2-step RA procedure for a triggered BSR. The BSR may be triggered based on (e.g., after or in response to) uplink data being available for transmission. By delaying triggering of the 2-step RA procedure for the triggered BSR, the wireless device may reduce unnecessary triggering of the 2-step RA procedure. Such unnecessary triggering may be reduced, for example, if a logical channel triggering the BSR has a lower QoS requirement (e.g., more latency tolerant transmission, smaller data volume, etc.) and/or if a communication between a wireless device and a base station is via an NTN with a longer propagation delay. After triggering the BSR and before starting/triggering the RA procedure, the wireless device may receive (e.g., detect) an uplink grant which may accommodate a transmission of the uplink data or a transmission of a BSR MAC CE), for example, by delaying triggering the RA procedure. Delayed triggering of the RA procedure and/or use of the received uplink grant may avoid additional communication with the base station (e.g., communication which may be undesirable considering the relatively longer propagation delay of the NTN). The wireless device may avoid triggering the RA procedure—which may reduce unnecessary processing and/or save power of the wireless device, for example, based on (e.g., after or in response to) sending (e.g., transmitting) uplink data via the uplink grant. Reduction of triggering of the RA procedure (e.g., by delaying triggering of the RA procedure and/or receiving an uplink grant during the delay) may provide advantages such as reduced power consumption of the wireless device and/or reduced uplink interferences to other wireless devices.

A wireless device may trigger a 2-step RA procedure based on (e.g., after or in response to) triggering a BSR. The BSR may be triggered based on (e.g., after or in response to) uplink data being available for transmission. By triggering (e g, immediately triggering) the 2-step RA procedure for the triggered BSR, the wireless device may advantageously reduce data transmission latency, for example, if a logical channel triggering the BSR has a higher QoS requirement (e.g., shorter-latency transmission, larger data volume, etc.), and/or if a communication between a wireless device and a base station is via an NTN with a longer propagation delay. Data transmission latency may be reduced by triggering the 2-step RA procedure after (e.g., immediately after or within a duration after) triggering the BSR.

Figure 33:
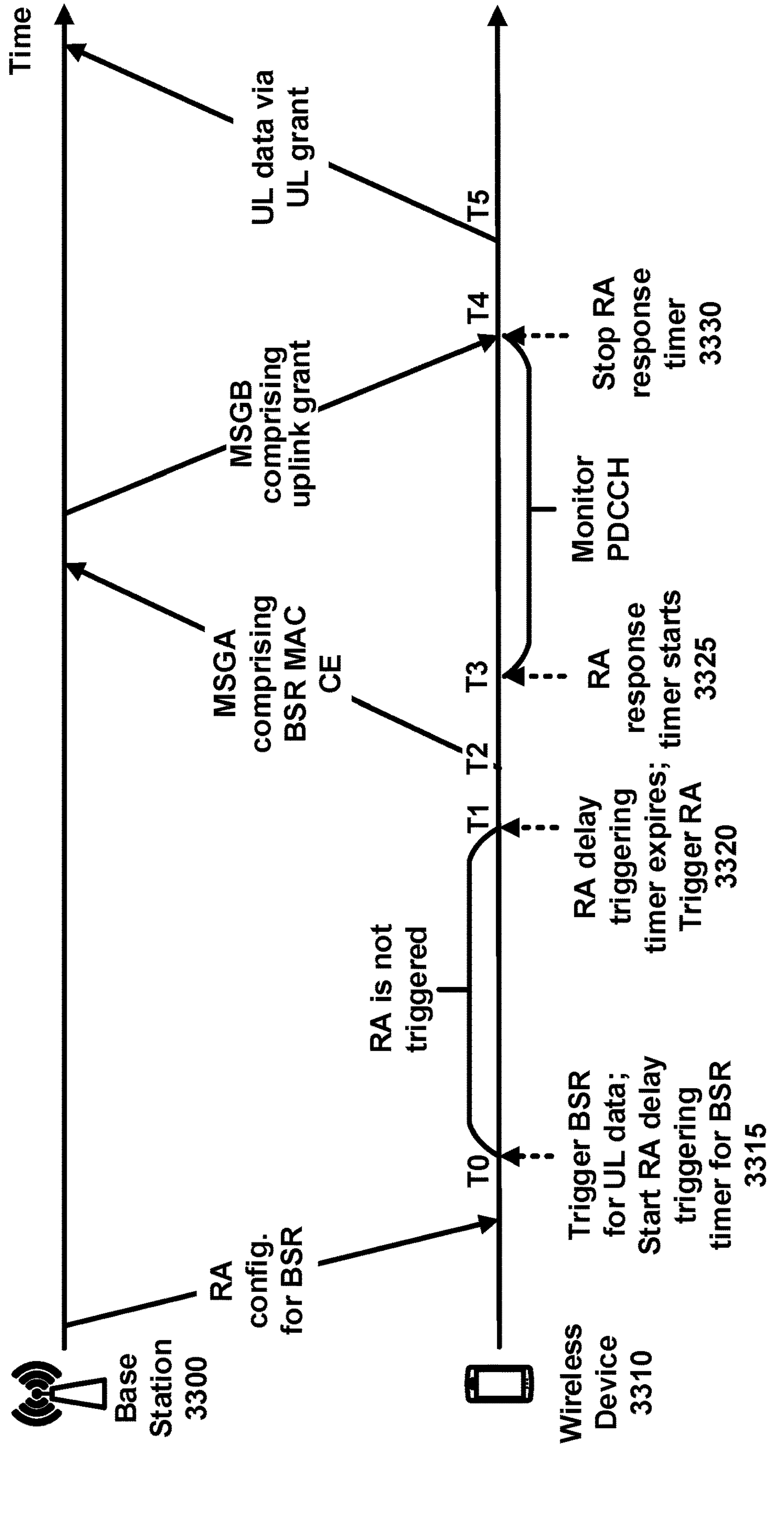
FIG. 33 shows an example random access-based buffer status reporting procedure.

FIG. 33 shows an example random access-based buffer status reporting procedure. A wireless device 3310 may receive (e.g., detect) one or more messages, for example, from a base station 3300 of an NTN system. The wireless device 3310 may receive (e.g., detect) one or more RRC messages comprising configuration parameters of a BSR (e.g., based on examples as described herein with respect to FIG. 25A and/or FIG. 25B). The configuration parameters may indicate that the wireless device 3310 may conduct an RA procedure with a 2-step RA (e.g., based on examples as described herein with respect to FIG. 13C) for the BSR associated with a logical channel. The configuration parameters may comprise first configuration parameters of one or more RACH resources (occasions) of a 2-step RA for the BSR. The configuration parameters may indicate one or more preambles and/or one or more SSBs associated with the BSR. The configuration parameters may comprise second configuration parameters of one or more PUSCH resources of the 2-step RA associated with the BSR.

The configuration parameters may indicate that the wireless device may conduct an SR for the BSR associated with the logic channel. The configuration parameters may comprise third configuration parameters of the SR associated with the BSR. The wireless device 3310 may determine, based on (e.g., after or in response to) both SR and RACH being configured for the BSR, whether to conduct an RA based BSR or conduct an SR based BSR based on at least one of: a propagation delay parameter (e.g., indicating a timing offset for scheduling) configured by the base station 3300, whether an SR transmission occasion (e.g., a PUCCH resource) is earlier than a 2-step RACH transmission occasion, a delay requirement of the logical channel, or the like.

The configuration parameters may indicate that the wireless device 3310 may not conduct an SR for the BSR associated with the logic channel. The third configuration parameters of the SR may be absent in the configuration parameters. The configuration parameters may comprise a timer value of an RA delay triggering timer associated with a logic channel. The wireless device 3310 may determine when to trigger an RA based on the RA delay triggering timer associated with the logic channel, after a BSR associated with the logic channel is triggered based on (e.g., after or in response to) uplink data of the logic channel being available.

The RA delay triggering timer may be separately or independently configured from the SR delay triggering timer (e.g., logicalChannelSR-DelayTimer) associated with the logic channel. Configuring a new timer for delaying triggering an RA for a BSR may allow a flexible control (e.g., by the base station 3300) over when to trigger the RA, for example, because the RA procedure may take shorter time than SR if the RA procedure is a 2-step RA type. The wireless device 3310 may reuse the SR delay triggering timer for delaying triggering the RA for the BSR, for example, if no new timer is introduced for delaying the RA procedure associated with the BSR. The RA procedure for the BSR may share the same SR delay triggering timer (e.g., logicalChannelSR-DelayTimer) configured for the SR procedure associated with the BSR. Reusing the same timer may reduce signaling overhead and implementation complexity of the wireless device 3310.

In FIG. 33, at step 3315, the wireless device 3310 may trigger, at a first slot (e.g., T0), the BSR based on (e.g., after or in response to) uplink data associated with a logical channel being available for uplink transmission. The wireless device 3310 may start the RA delay triggering timer based on the timer value configured by the base station 3300, for example, based on (e.g., after or in response to) triggering the BSR. The wireless device 3310 may not trigger the RA procedure during a time window in which the RA delay trigging timer is running. The wireless device 3310 may receive (e.g., detect) uplink grants during the time window if the RA delay triggering timer is running. The wireless device 3310 may send (e.g., transmit) the uplink data (and/or a BSR MAC CE indicating a volume of the uplink data) via the uplink grants. The wireless device 3310 may stop the RA delay triggering timer, for example, after sending (e.g., transmitting) the uplink data. Stopping the RA delay triggering timer may avoid or reduce unnecessary triggering the RA after the wireless device 3310 transmits the uplink data.

In FIG. 33, at step 3320, the RA delay triggering timer may expire at a second slot (e.g., T1). The wireless device 3310 may trigger the RA procedure, for example, after an expiry of the RA delay triggering timer at step 3320. The wireless device 3310 may send (e.g., transmit) a message A (e.g., MSGA, comprising a preamble and a MAC PDU), for example, based on (e.g., after or in response to) triggering the RA procedure. The wireless device 3310 may send (e.g., transmit) the preamble via one or more RACH resources and send (e.g., transmit) the MAC PDU via one or more PUSCH resources, configured for the 2-step RA procedure. The wireless device 3310 may send (e.g., transmit) the message A at a third slot (e.g., T2).

The wireless device 3310 may delay starting an RA response window after the wireless device 3310 transmits the message A. Delay starting the RA response window may accommodate the relatively longer propagation delay in the NTN. The duration after sending (e.g., transmitting) the message A and before the wireless device 3310 may start the RA response window may be indicated by the base station 3300 based on the propagation delay. At step 3325, the wireless device 3310 may start the RA response window (e.g., starting an RA response timer) at a fourth slot (e.g., T3). The wireless device 3310 may monitor PDCCH transmission for receiving a response corresponding to the message A, for example, if the RA response window is running.

The wireless device 3310 may receive (e.g., detect) an uplink grant (e.g., comprised in an RAR message of a MSGB) as the response to the message A during monitoring the PDCCH transmission if the RA response window is running. The wireless device 3310 may receive (e.g., detect) the uplink grant at a fifth slot (e.g., T4). At step 3330, the wireless device 3310 may stop the RA response window (e.g., stopping the RA response timer) based on (e.g., after or in response to) receiving the uplink grant as the response to the message A. The wireless device 3310 may send (e.g., transmit) the uplink data via the uplink grant, for example, at a sixth slot (e.g., T5).

In FIG. 33, the wireless device 3310 may delay triggering a 2-step RA procedure for a triggered BSR based on (e.g., after or in response to) uplink data being available for transmission. The wireless device 3310, by delaying triggering the 2-step RA procedure for the triggered BSR, may reduce possibility of unnecessarily triggering the 2-step RA procedure, for example, if a logical channel triggering the BSR has a lower QoS requirement (e.g., more latency tolerant transmission, smaller data volume, etc.) and a communication between the wireless device 3310 and the base station 3300 is via an NTN system with a relatively longer propagation delay. The delayed triggering of the 2-step RA procedure may reduce power consumption of the wireless device 3310 and/or reduce uplink interferences to other wireless devices.

The wireless device 3310 may trigger a 2-step RA procedure (e g, immediately, or without delay) based on (e.g., after or in response to) triggering a BSR, for example, if the RA delay triggering timer is not configured for the logical channel associated with the BSR. The wireless device 3310, by (e g, immediately) triggering the 2-step RA procedure for the triggered BSR, may reduce data transmission latency, for example, if a logical channel triggering the BSR has a higher QoS requirement (e.g., shorter-latency transmission, larger data volume, etc.) and a communication between the wireless device 3310 and the base station 3300 is via the NTN system with a relatively longer propagation delay. Data transmission latency may be reduced by triggering the 2-step RA procedure right after triggering the BSR.

The wireless device 3310 may trigger a BSR based on (e.g., after or in response to) uplink data being available for transmission. The wireless device 3310 may cancel the BSR based on (e.g., after or in response to) sending (e.g., transmitting) a BSR MAC CE (and/or the uplink data if the size of the uplink grant may accommodate the uplink data) via an uplink grant. The wireless device 3310 may trigger an RA procedure (e.g., 2-step RA type) based on (e.g., after or in response to) triggering the BSR, for example, in the NTN system. The wireless device 3310 may send (e.g., transmit) a MSGA comprising a BSR MAC CE (and/or the uplink data). The wireless device 3310 may cancel the BSR based on (e.g., after or in response to) the BSR MAC CE (and/or the uplink data) being sent (e.g., transmitted) in the MSGA. BSR MAC CE (and/or uplink data) transmission, via a MSGA, in an RA procedure, may not be as reliable as BSR MAC CE (and/or uplink data) transmission, via an uplink grant, which may be configured or dynamically indicated to the wireless device dedicatedly. The BSR may be canceled (e.g., prematurely canceled), for example, if an RA-based BSR is ongoing and BSR MAC CE/uplink data is sent (e.g., transmitted) in a MSGA. The wireless device 3310 may re-trigger the BSR, for example, due to the canceled (e.g., prematurely cancelled) BSR or the uplink data not being successfully delivered to (and/or received/detected by) the base station 3300 (e.g., if the MSGA is not successfully received (e.g., detected) by the base station 3300 and the MSGA is resent (e.g., retransmitted)). Such retriggering of the BSR may cause increasing power consumption of the wireless device 3310 and/or increasing uplink interferences to other wireless devices. As described herein, an RA procedure (e.g., for a BSR in an NTN system) may be improved for reduced power consumption of the wireless device 3310 and/or reduced uplink interferences to other wireless devices.

The wireless device 3310 may keep pending a triggered BSR based on (e.g., after or in response to) sending (e.g., transmitting) a MSGA comprising a BSR MAC CE and/or uplink data in a 2-step RA procedure. The wireless device 3310 may cancel the triggered BSR based on (e.g., after or in response to) receiving a response (e.g., a MSGB comprising uplink grant) to the MSGA. Retriggering of the BSR may be avoided or reduced. Avoiding and/or reducing retriggering of the BSR (e.g., keeping the triggered BSR pending until receiving the response) may provide advantages such as reduced power consumption of the wireless device 3310 and/or reduced uplink interferences to other wireless devices (e.g., communicating with a base station in an NTN).

Figure 34:
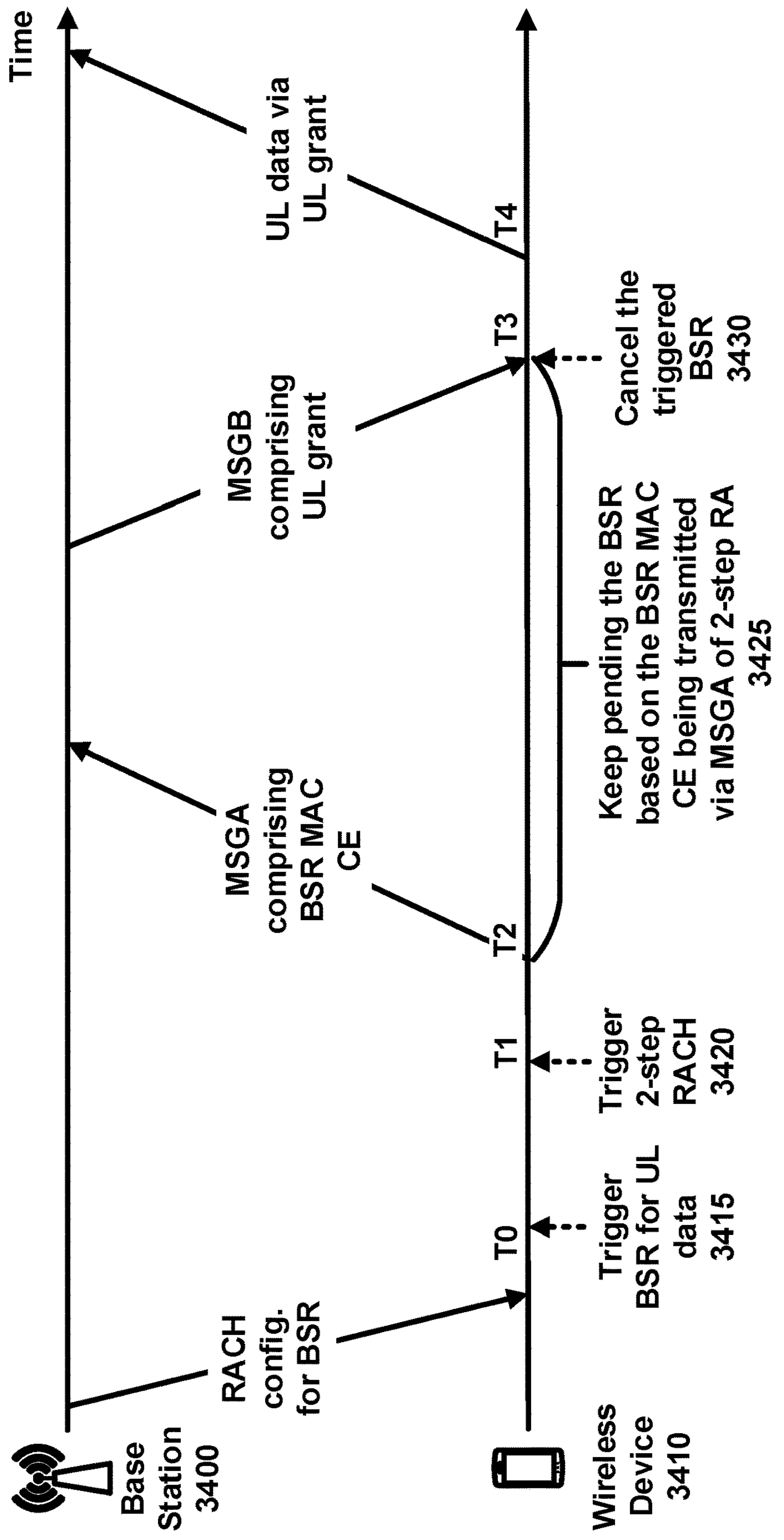
FIG. 34 shows an example random access-based buffer status reporting procedure.

FIG. 34 shows an example random access-based buffer status reporting procedure. A wireless device 3410 may receive (e.g., detect) one or more messages, for example, from a base station 3400 of an NTN system. The wireless device 3410 may receive one or more RRC messages comprising configuration parameters of a BSR (e.g., based on examples as described herein with respect to FIG. 25A and/or FIG. 25B). The configuration parameters may be implemented based on examples as described herein with respect to FIG. 33.

In FIG. 34, at step 3415, the wireless device 3410 may trigger, at a first slot (e.g., T0), the BSR based on (e.g., after or in response to) uplink data associated with a logical channel being available for uplink transmission. At step 3420, the wireless device 3410 may trigger an RA procedure (e.g., 2-step RACH), at a second slot (e.g., T1). The wireless device 3410 may delay triggering the RA procedure based on examples as described herein with respect to FIG. 33. The wireless device 3410 may trigger the RA procedure, at the first slot (e.g., T0), if the wireless device 3410 does not apply or use a delay for triggering the RA procedure. The wireless device 3410 may send (e.g., transmit), for example, based on (e.g., after or in response to) triggering the RA procedure, a message A (e.g., MSGA, comprising a preamble and a MAC PDU) at a third slot (e.g., T2). The wireless device 3410 may send (e.g., transmit) the preamble via one or more RACH resources and send (e.g., transmit) the MAC PDU via one or more PUSCH resources, configured for the 2-step RA procedure. The MAC PDU may comprise the uplink data and/or a BSR MAC CE indicating a volume of the uplink data.

At 3425, the wireless device 3410 may keep pending the triggered BSR (e.g., may not cancel the triggered BSR)

based on (e.g., after or in response to) the message A comprising the uplink data and a BSR MAC CE (e.g., indicating a volume of the uplink data). The wireless device 3410 may keep pending the triggered BSR, for example, until the earliest of receiving a response (e.g., a MSGB) and an expiration of an RAR timer. Instead of canceling the triggered BSR based on (e.g., after or in response to) the uplink data and/or after the BSR MAC CE being sent (e.g., transmitted) in an uplink grant, keeping the triggered BSR pending may allow the wireless device 3410 to avoid or reduce repeatedly triggering the BSR. Keeping the triggered BSR pending may avoid and/or reduce repeatedly triggering the BSR, for example, if the message A transmission in the RA procedure is unreliable as a transmission of an uplink grant (e.g., obtained after the RA procedure), and/or if the message A may be repeatedly resent (e.g., retransmitted) based on an example two-step random access procedure as described herein with FIG. 13C.

The wireless device 3410 may monitor PDCCH transmission for receiving a response corresponding to the message A. The wireless device 3410 may monitor the PDCCH transmission based on examples as described herein with respect to FIG. 33. The wireless device 3410 may receive (e.g., detect) an uplink grant (e.g., comprised in an RAR message of a MSGB) as the response to the message A during monitoring the PDCCH transmission. The wireless device 3410 may receive (e.g., detect) the uplink grant at a fourth slot (e.g., T3). At step 3430, the wireless device 3410 may cancel the trigged (pending) BSR based on (e.g., after or in response to) receiving the uplink grant at T3. Cancelling the BSR, based on (e.g., after or in response to) receiving an uplink grant in a MSGB corresponding to a MSGA comprising a BSR MAC CE and/or uplink data, may reduce or avoid repeatedly triggering BSR, therefore reducing power consumption of the wireless device 3410. The wireless device 3410 may send (e.g., transmit) the uplink data via the uplink grant, for example, at a sixth slot (e.g., T5).

In FIG. 34, at step 3425, the wireless device 3410 may keep a triggered BSR pending based on (e.g., after or in response to) sending (e.g., transmitting) a MSGA comprising a BSR MAC CE and/or uplink data, for example, at least until the earliest of receiving a response (e.g., a MSGB) and an expiration of an RAR timer (or window). At step 3430, the wireless device 3410 may cancel the triggered BSR based on (e.g., after or in response to) receiving a response (e.g., a MSGB comprising uplink grant) to the MSGA. Keeping the triggered BSR pending (e.g., until the earliest of receiving the response and an expiration of an RAR window) may reduce power consumption of the wireless device 3410 and/or reduce uplink interferences to other wireless devices (e.g., for communicating with the base station 3400 in an NTN system). The RAR window may be set to a relatively longer duration in the NTN system than that of the terrestrial network.

The wireless device 3410 may trigger a BSR based on (e.g., after or in response to) uplink data being available for transmission. The wireless device 3410 may trigger a 4-step RA procedure associated with the BSR, for example, if no SR is configured for the BSR and configuration parameters of the BSR comprise first configuration parameters of the 4-step RA procedure. The wireless device 3410 may trigger a 4-step RA procedure based on (e.g., after or in response to) triggering the BSR, for example, in the NTN. The wireless device 3410 may send (e.g., transmit) a preamble for the 4-step RA procedure. The wireless device 3410 may monitor PDCCH transmission for receiving a response (e.g., an RAR message) corresponding to the transmission of the preamble. The wireless device 3410 may receive (e.g., detect) first uplink grant, before the wireless device 3410 receives (e.g., detects) the RAR message, for example, due to a relatively longer propagation delay of the NTN. The first uplink grant may be different from second uplink grant indicated by the RAR message. The first uplink grant may be available earlier than the second uplink grant indicated by the RAR message. The wireless device 3410 may continue the RA procedure (e.g., comprising monitoring PDCCH transmission and/or resending (e.g., retransmitting) the preamble if no response is received (e.g., detected) after the wireless device 3410 transmits the uplink data and/or the BSR MAC CE via the first uplink grant. Such continued RA procedure or resending the preamble may increase power consumption of the wireless device 3410. As described herein, an RA procedure for a BSR may be improved in an NTN to reduce power consumption of the wireless device 3410 and/or reduce uplink interferences to other wireless devices.

The wireless device 3410 may cancel/stop ongoing RA procedure, associated with a BSR triggered by uplink data being available, based on (e.g., after or in response to) sending (e.g., transmitting) the uplink data and/or a BSR MAC CE via a first uplink grant different from a second uplink grant indicated by an RAR message. The RA procedure may be configured with dedicated RACH resources associated with the BSR by the base station 3400. Such canceling/stopping the ongoing RA procedure after the sending may reduce power consumption of the wireless device 3410.

Figure 35:
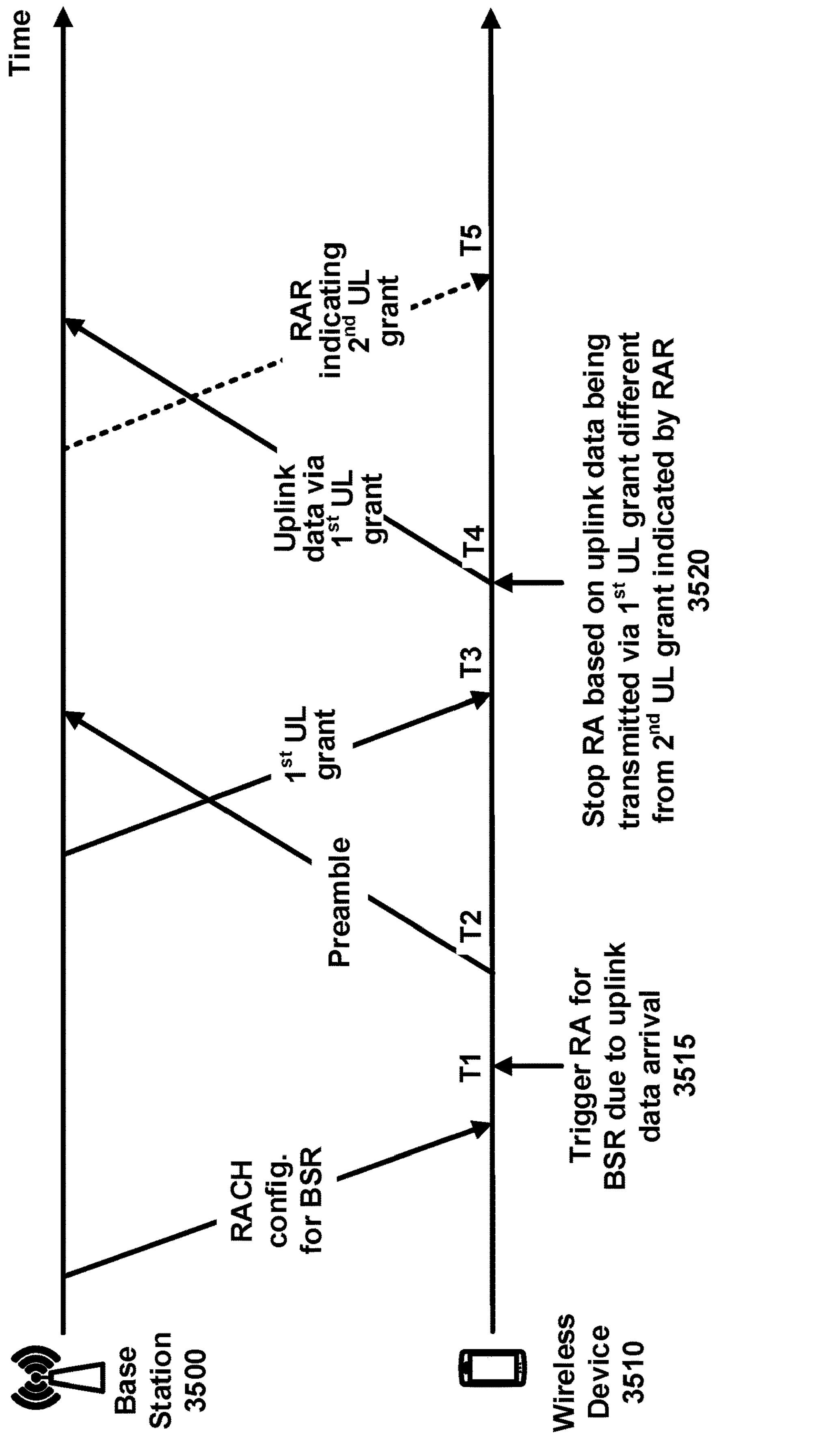
FIG. 35 shows an example random access-based buffer status reporting procedure.

FIG. 35 shows an example random access-based buffer status reporting procedure. A wireless device 3510 may receive (e.g., detect) one or more messages, for example, from a base station 3500 of an NTN system. The wireless device 3510 may receive one or more RRC messages comprising configuration parameters of a BSR (e.g., based on examples as described herein with respect to FIG. 25A and/or FIG. 25B). The configuration parameters may be implemented based on examples as described herein with respect to FIG. 33.

The wireless device 3510 may trigger a BSR based on (e.g., after or in response to) uplink data associated with a logical channel being available for uplink transmission. In FIG. 35, at step 3515, the wireless device 3510 may trigger an RA (e.g., a 4-step) procedure, for example, at a first slot (e.g., T1). The wireless device 3510 may delay triggering the RA procedure based on examples as described herein with respect to FIG. 33. The wireless device 3510 may send (e.g., transmit), for example, based on (e.g., after or in response to) triggering the RA procedure, a preamble at a second slot (e.g., T2). The wireless device 3510 may monitor PDCCH transmission for receiving an RAR message after the wireless device 3510 transmits the preamble.

The wireless device 3510 may receive (e.g., detect) a first uplink grant at a third slot (e.g., T3), after the wireless device 3510 transmits the preamble and before the wireless device 3510 receives (e.g., detects) the RAR message, for example, due to a relatively longer propagation delay in the NTN system. The first uplink grant may not correspond to the transmission of the preamble. The second uplink grant, corresponding to the transmission of the preamble, may be comprised in an RAR message which may be received (e.g., detected) at a fifth slot (e.g., T5).

The wireless device 3510 may send (e.g., transmit) a MAC PDU via the first uplink grant, for example, based on (e.g., after or in response to) receiving the first uplink grant before the wireless devices 3510 receives (e.g., detects) the RAR message. The MAC PDU may comprise the uplink data and/or a BSR MAC CE indicating a volume of the uplink data. The wireless device 3510 may cancel/stop the RA procedure for the BSR, for example, based on (e.g., after or in response to) sending (e.g., transmitting) the MAC PDU via the first uplink grant. Cancelling (or stopping) the RA procedure may comprise stopping monitoring PDCCH transmission for receiving the RAR message, stop (re-) transmission of the preamble, and/or the like.

In FIG. 35, at step 3520, the wireless device 3510 may cancel/stop ongoing RA procedure, associated with a BSR triggered by uplink data being available, for example, based on (e.g., after or in response to) sending (e.g., transmitting) the uplink data and/or a BSR MAC CE at a fourth slot (e.g., T4) via a first uplink grant that may be different from a second uplink grant indicated by an RAR message (e.g., associated with the preamble sent at T2). The RA procedure may be configured associated with the BSR by the base station 3500. Such canceling/stopping the ongoing RA procedure after the sending may reduce power consumption of the wireless device 3510.

The wireless device 3510 may generate new data (e.g., from uplink layers, application layers). The wireless device 3510 may generate new data, for example, after the wireless device 3510 transmits a BSR MAC CE in a 2-step RA procedure triggered by a BSR. The wireless device 3510 may generate new data after transmitting a BSR MAC CE, for example, if the wireless device 3510 is waiting for a response, for example, due to a relatively longer propagation delay in an NTN system (e.g., compared to a delay in a terrestrial system and/or other system). The wireless device 3510 may switch (and/or fallback) to a 4-step RA type for continuing the RA procedure for the BSR. The wireless device 3510 may not regenerate a MAC PDU for the new data arriving after the wireless device 3510 transmits the BSR MAC CE. The wireless device 3510 may copy the MAC PDU, previously generated in the 2-step RA, into a message 3 buffer of the 4-step RA, for a new transmission. The wireless device 3510 may trigger parallel BSRs during the RA procedure in the NTN system, for example, if a small timer value of a BSR retransmission timer (e.g., retxBSR-Timer) is configured. Triggering parallel BSRs during the RA procedure may trigger multiple RA procedures. The triggering of parallel processes may increase power consumption of the wireless device 3510 and/or increase uplink interferences to other wireless devices. As described herein, an RA procedure (e.g., associated with a BSR in an NTN) may be improved for reduced power consumption of the wireless device 3510 and/or reduced uplink interferences to other wireless devices.

The wireless device 3510 may trigger an RA procedure on one or more RACH resources dedicatedly configured for a BSR. The wireless device 3510 may send (e.g., transmit) a MSGA comprising a MAC PDU. The MAC PDU may comprise a BSR MAC CE indicating a volume of uplink data available for uplink transmission. The wireless device 3510 may determine that new data are available after the wireless device 3510 transmits the MSGA. The wireless device 3510 may determine whether to generate a new MAC PDU (e.g., second MAC PDU) comprising a new BSR MAC CE (e.g., second BSR MAC CE), for example, based on one or more criteria comprising at least one of: a BSR validation timer, a BSR size threshold, a size of the uplink grant, and/or a wireless device capability, etc. Triggering of parallel processes may be avoided and/or reduced, for example, based on selective determination of whether to generate a new MAC PDU. By avoiding and/or reducing triggering of parallel processes, advantages may be achieved such as reduced power consumption of the wireless device 3510 and/or reduced transmission latency of uplink data delivery.

Figure 36:
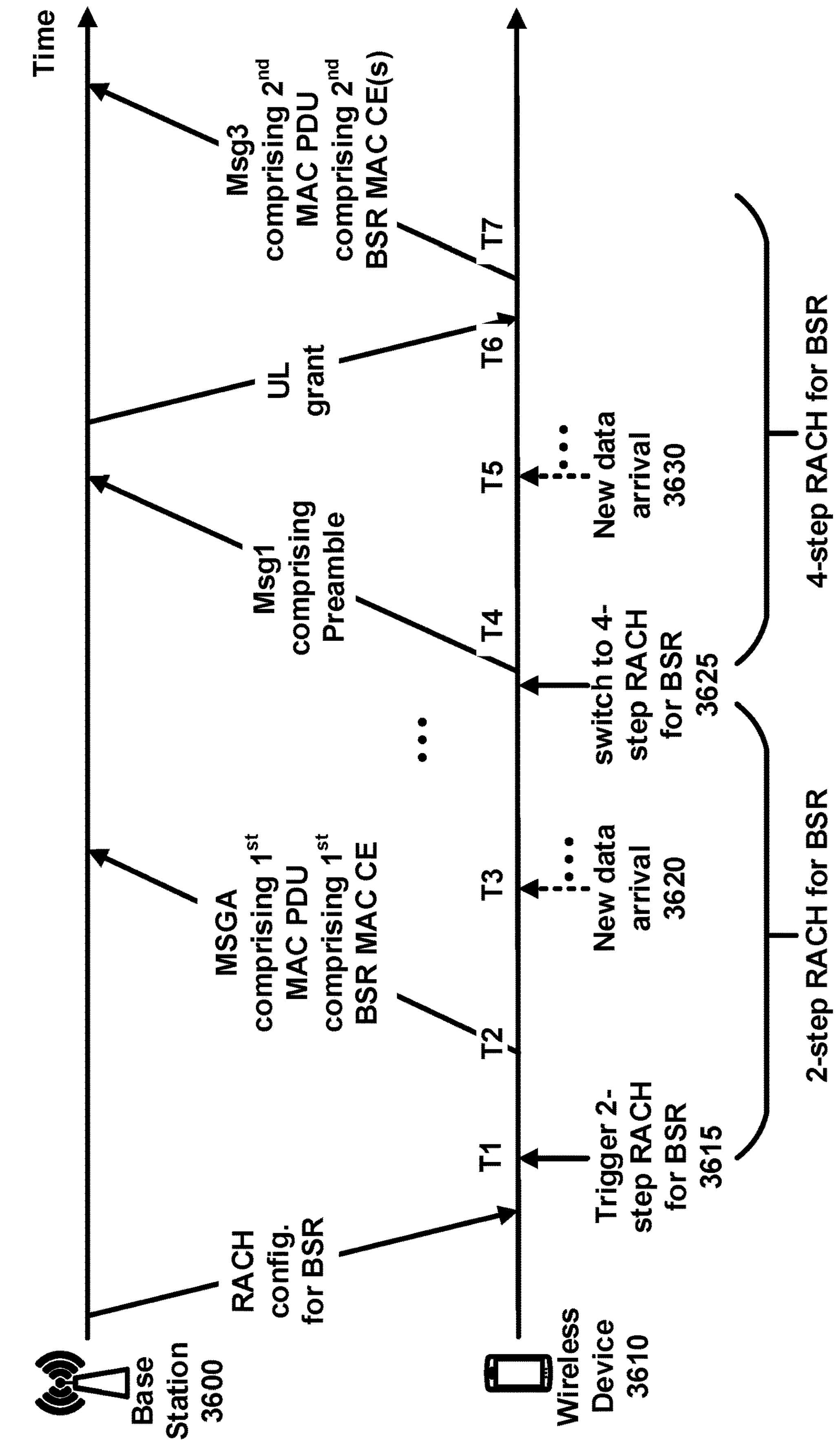
FIG. 36 shows an example random access-based buffer status reporting procedure in an NTN.

FIG. 36 shows an example random access-based buffer status reporting procedure in an NTN. A wireless device 3610 may receive (e.g., detect) one or more messages, for example, from a base station 3600 of an NTN system. The wireless device 3610 may receive one or more RRC messages, for example, comprising configuration parameters of a BSR (e.g., based on examples as described herein with respect to FIG. 25A and/or FIG. 25B). The configuration parameters may be implemented based on examples as described herein with respect to FIG. 33. The wireless device 3610 may trigger a BSR based on (e.g., after or in response to) uplink data associated with a logical channel being available for uplink transmission.

In FIG. 36, at step 3615, the wireless device 3610 may trigger, at a first slot (e.g., T1), based on (e.g., after or in response to) triggering the BSR, an RA procedure with a 2-step RA type (e.g., based on examples as described herein with respect to FIG. 13C). The wireless device 3610 may delay triggering the RA procedure based on examples as described herein with respect to FIG. 33. The wireless device 3610 may send (e.g., transmit) (e.g., based on, for example, after or in response to triggering the RA procedure) a message A (e.g., MSGA, comprising a preamble and first MAC PDU). The first MAC PDU may comprise first BSR MAC CE indicating a volume of the uplink data. The wireless device 3610 may send (e.g., transmit) the preamble via one or more RACH resources and send (e.g., transmit) the first MAC PDU via one or more PUSCH resources, configured for the 2-step RA procedure. The wireless device 3610 may send (e.g., transmit) the message A at a second slot (e.g., T2). The wireless device 3610 may monitor PDCCH transmission for receiving a response (e.g., MSGB) corresponding to the message A. The wireless device 3610 may perform the 2-step RA procedure based on examples as described herein with respect to FIG. 13C. At step 3620, the wireless device 3610 may determine (e.g., during the ongoing 2-step RA procedure) that new uplink data are available (or arrived), for example, at a third slot (e.g., T3), for example, after the wireless device 3610 transmits the message A at the second slot (e.g., T2) and before the wireless device 3610 transmits uplink data via an uplink grant at a sixth slot (e.g., at T6).

The wireless device 3610 may switch from the 2-step RA type to a 4-step RA type to continue the RA procedure for the triggered BSR. The wireless device 3610 may switch from the 2-step RA type to the 4-step RA type based on (e.g., after or in response to) no response being received (e.g., detected) after sending (e.g., transmitting) the message A with a number/quantity of retransmissions, the number/quantity being greater than a threshold. The wireless device 3610 may perform a 4-step RA procedure based on examples as described herein with respect to FIG. 13A.

At step 3625, the wireless device 3610, based on (e.g., after or in response to) switching to the 4-step RA type, may send (e.g., transmit) a message 1 including a preamble, for example, at a fourth slot (e.g., T4). The wireless device 3610 may monitor PDCCH transmission after the wireless device 3610 transmits the preamble. At step 3630, the wireless device 3610 may determine (e.g., during the ongoing 4-step RA procedure) that new uplink data are available (or arrived), for example, at a fifth slot (e.g., T5), for example, after the wireless device 3610 transmits the preamble at T4 and before the wireless device 3610 transmits a message 3 at a seventh slot (e.g., T7). The wireless device 3610 may receive (e.g., detect) an uplink grant in an RAR message during monitoring the PDCCH transmission, for example, at a sixth slot (e.g., T6).

The wireless device 3610 may determine, whether to generate a new MAC PDU (e.g., second MAC PDU) comprising a new BSR MAC CE (e.g., second BSR MAC CE), based on one or more criteria comprising at least one of: a BSR validation timer, a BSR size threshold, a size of the uplink grant, and/or a wireless device capability, etc. The wireless device 3610 may determine whether to generate a new MAC PDU comprising a new BSR MAC CE based on one or more examples as described herein with respect to FIG. 37, FIG. 38A and/or FIG. 38B. The wireless device 3610 may generate the second MAC PDU comprising the second BSR MAC CE, based on the one or more criteria. The wireless device 3610 may send (e.g., transmit) the second MAC PDU, at a seventh slot (e.g., T7), via the uplink grant indicated in the RAR message.

Figure 37:
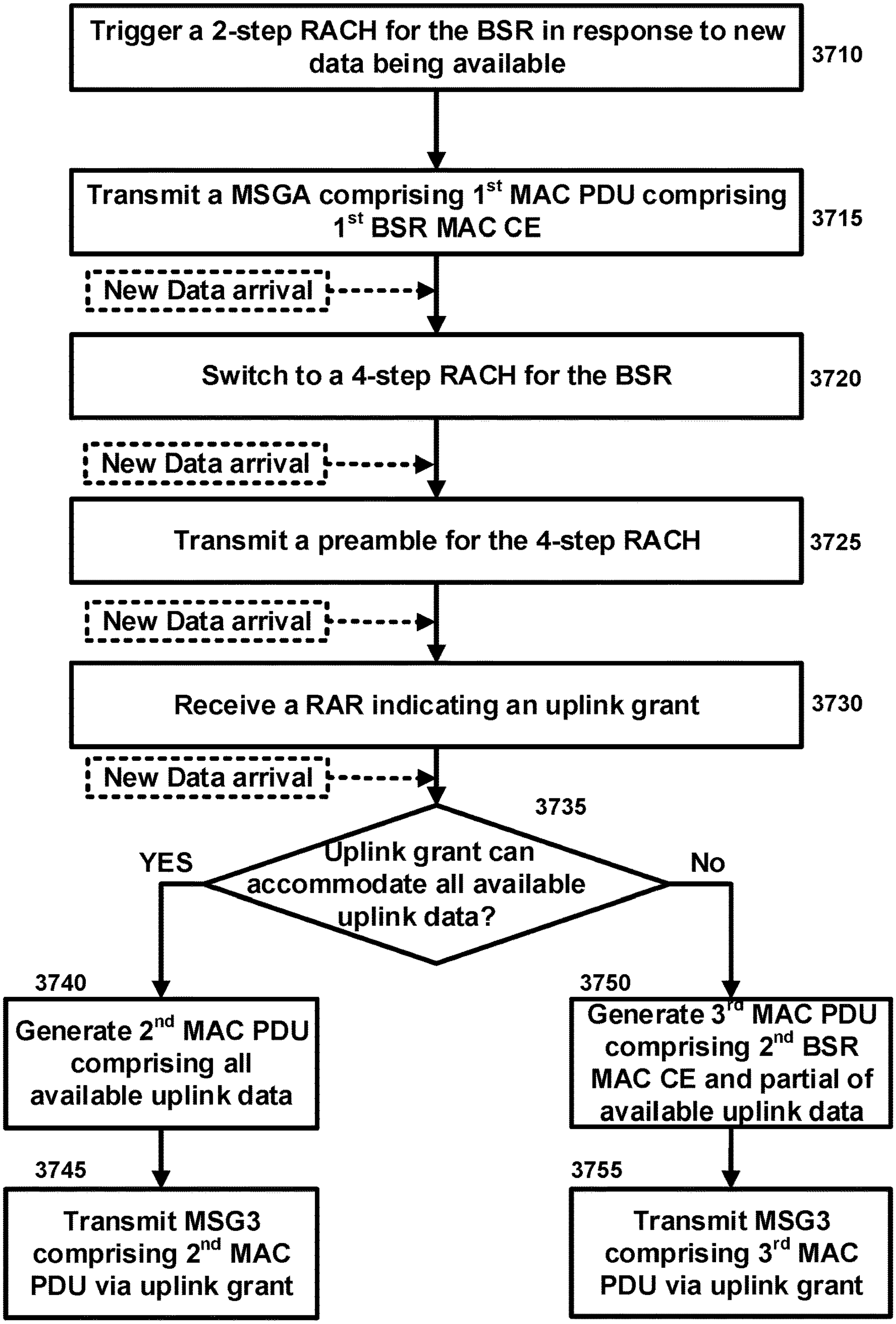
FIG. 37 shows an example method for performing a random access-based buffer status reporting procedure.

FIG. 37 shows an example method for performing a random access-based buffer status reporting procedure. At step 3710, a wireless device, based on (e.g., after or in response to) triggering a BSR, may trigger an RA procedure with a 2-step RA type (e.g., based on examples as described herein with respect to FIG. 13C). At step 3715, the wireless device may send (e.g., transmit) a message A (e.g., MSGA, comprising a preamble and first MAC PDU), for example, based on (e.g., after or in response to) triggering the RA procedure. The first MAC PDU may comprise first BSR MAC CE indicating a volume of the uplink data. The wireless device may monitor PDCCH transmission for receiving a response (e.g., MSGB) corresponding to the message A. The wireless device may perform the 2-step RA procedure based on examples as described herein with respect to FIG. 13C.

At step 3720, the wireless device may switch from the 2-step RA type to a 4-step RA type to continue the RA procedure for the triggered BSR. The wireless device may switch from the 2-step RA type to the 4-step RA type based on (e.g., after or in response to) no response being received (e.g., detected) after a number/quantity of retransmissions of the message A. The wireless device may perform a 4-step RA procedure based on examples as described herein with respect to FIG. 13A. At step 3725, the wireless device, based on (e.g., after or in response to) switching to the 4-step RA type, may send (e.g., transmit) a preamble. The wireless device may monitor PDCCH transmission after the wireless device transmits the preamble. The wireless device may receive (e.g., detect) an uplink grant in an RAR message during monitoring the PDCCH transmission.

At step 3730, the wireless device may determine (e.g., during the whole RA procedure such as the 2-step RA type and the 4-step RA type) that new uplink data are available, for example, after the wireless device transmits the message A and before the wireless device transmits uplink data via an uplink grant. The wireless device may determine that new uplink data are available, for example, after the wireless device switches from the 2-step RA type to the 4-step RA type and before the wireless device transmits the preamble. The wireless device may determine that new uplink data are available, for example, after the wireless device transmits the preamble and before the wireless device receives/detects the RAR message comprising an uplink grant. The wireless device may determine that new uplink data are available, for example, after the wireless device receives/detects the RAR message comprising the uplink grant and before the wireless device transmits uplink signal via the uplink grant, etc.

At step 3735, the wireless device may determine whether the uplink grant can accommodate available data (e.g., all available data, for example, comprising the initial uplink data triggering the BSR and the new uplink data arriving later). At step 3740, the wireless device may generate the second MAC PDU comprising the initial uplink data and the new uplink data, for example, if the uplink grant accommodates all available data. At step 3745, the wireless device may send (e.g., transmit) the second MAC PDU in a message 3 via the uplink grant.

At step 3735, the wireless device may determine that the uplink grant cannot accommodate available data (e.g., all available data, for example, comprising the initial uplink data triggering the BSR and the new uplink data arriving later). At step 3750, the wireless device may generate the third MAC PDU comprising a new BSR MAC CE indicating a total volume of the initial data and the new data, for example, if the uplink grant is not accommodating all available data. The third MAC PDU may comprise partial of the initial data and/or the new data based on a remaining size of the uplink grant after including the new BSR MAC CE into the third MAC PDU. At step 3755, the wireless device may send (e.g., transmit) the third MAC PDU in a message 3 via the uplink grant.

Figure 38A:
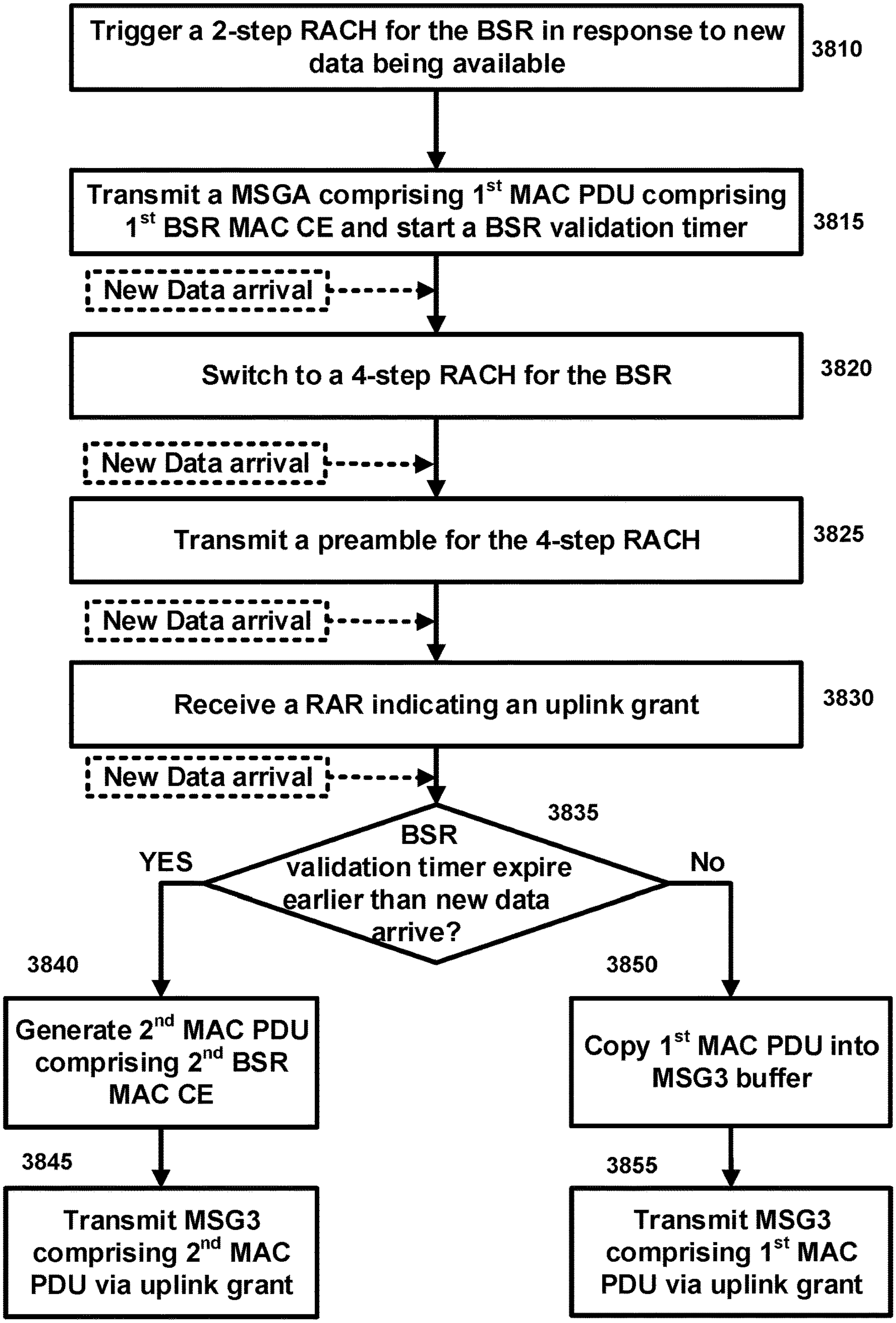
FIG. 38A shows an example method for performing a random access-based buffer status reporting procedure.

FIG. 38A shows an example method for performing a random access-based buffer status reporting procedure. At step 3810, a wireless device may trigger, based on (e.g., after or in response to) triggering the BSR, may trigger an RA procedure with a 2-step RA type (e.g., based on examples as described herein with respect to FIG. 13C). At step 3815, the wireless device may send (e.g., transmit) a message A (e.g., MSGA, comprising a preamble and first MAC PDU), for example, based on (e.g., after or in response to) triggering the RA procedure. The first MAC PDU may comprise first BSR MAC CE indicating a volume of the uplink data. The wireless device may start a BSR validation timer based on (e.g., after or in response to) sending (e.g., transmitting) the MSGA.

The BSR validation timer may be configured associated with the BSR and by the base station. The BSR validation timer may be separately and/or independently configured from a BSR retransmission timer (e.g., a retxBSR-Timer) in a system. The BSR validation timer may be same as the BSR retransmission timer in a system. In the system, the wireless device may start the BSR retransmission timer based on (e.g., after or in response to) triggering a BSR. The wireless device may not generate a new BSR MAC CE, for example, if the BSR retransmission timer is running. The wireless device may generate a new BSR MAC CE, upon expiry of the BSR retransmission timer, for new data arrived before expiry of the BSR retransmission timer. A propagation delay in an NTN system may be relatively longer than a terrestrial network (e.g., as shown in FIG. 27). The wireless device may frequently generate new BSR MAC CE(s) (if new data arrives), for example, if a time window of the BSR retransmission timer is smaller than a relatively longer propagation delay of the NTN system. The frequent generation of new BSR MAC CE(s) may increase power consumption of the wireless device and increase implementation cost of the wireless device.

A wireless device may start a BSR retransmission timer (or a BSR validation timer) by a starting delay offset after the wireless device transmits a MSGA. The starting delay offset may accommodate a relatively longer propagation delay in the NTN. The starting delay offset may be configured by the base station. The wireless device may determine a length of the starting delay offset (or a timer value) based on (e.g., after or in response to) at least one of: a cell/beam-specific offset for scheduling timing (e.g., K_offset_beam) or a wireless device-specific offset for scheduling timing (e.g., K_offset_UE) if a parameter for scheduling timing is set by the base station. The wireless device may determine a length of the starting delay offset (or a timer value) as 2*RTD, where the RTD may be determined based on (e.g., after or in response to) indication from the base station.

Starting the BSR retransmission timer (or a BSR validation timer) by a starting delay offset, after the wireless device transmits a MSGA, instead of starting the BSR retransmission timer based on (e.g., after or in response to) immediately after triggering the BSR, may allow the wireless device to reduce or avoid frequent triggering of a BSR, for example, if a MSGA transmission occasion is not available immediately after the BSR is triggered. The wireless device may determine a MSAG transmission occasion based on (e.g., after or in response to) RSRP measurements of a reference signal (e.g., SSB/CSI-RS), based on examples as described herein with respect to FIG. 13C.

The wireless device, based on (e.g., after or in response to) sending (e.g., transmitting) the MSGA, may start a first time window determined based on (e.g., after or in response to) the starting delay offset. The wireless device may start the BSR retransmission timer, for example, after the first time window expires. Starting the BSR retransmission timer, after the first time window expires based on (e.g., after or in response to) the starting delay offset, may reduce frequently generating new BSR MAC CE if new data arrives after the wireless device has already triggered a BSR in an NTN system. The wireless device may monitor PDCCH transmission for receiving a response (e.g., MSGB) corresponding to the message A. The wireless device may perform the 2-step RA procedure based on examples as described herein with respect to FIG. 13C.

At step 3820, the wireless device may switch from the 2-step RA type to a 4-step RA type to continue the RA procedure for the triggered BSR. The wireless device may switch from the 2-step RA type to the 4-step RA type based on (e.g., after or in response to) no response being received (e.g., detected) after a number/quantity of transmissions of the message A. The wireless device may perform a 4-step RA procedure based on examples as described herein with respect to FIG. 13A. At step 3825, the wireless device, based on (e.g., after or in response to) switching to the 4-step RA type, may send (e.g., transmit) a preamble. The wireless device may monitor PDCCH transmission after the wireless device transmits the preamble. The wireless device may receive (e.g., detect) an uplink grant in an RAR message during monitoring the PDCCH transmission.

At step 3830, the wireless device may determine (e.g., during the whole RA procedure such as the 2-step RA type and the 4-step RA type) that new uplink data are available, for example, after the wireless device transmits the message A and before the wireless device transmits uplink data via an uplink grant. The wireless device may determine that new uplink data are available, for example, after the wireless device switches from the 2-step RA type to the 4-step RA type and before the wireless device transmits the preamble. The wireless device may determine that new uplink data are available, for example, after the wireless device transmits the preamble and before the wireless device receives/detects the RAR message comprising an uplink grant. The wireless device may determine that new uplink data are available, for example, after the wireless device receives/detects the RAR message comprising the uplink grant and before the wireless device transmits uplink signal via the uplink grant.

At step 3835, the wireless device may determine whether the BSR validation timer expires earlier than the arrival of new data. At step 3840, the wireless device may generate the second MAC PDU comprising the initial uplink data and new uplink data arriving earlier than the expiry of the BSR validation timer, for example, if the BSR validation timer expires earlier than the arrival of the new data. At step 3840, the wireless device may generate the second MAC PDU comprising a second BSR MAC CE indicating: a total volume/quantity of the initial uplink data, and/or the new uplink data arriving earlier than the expiry of the BSR validation timer. The wireless device may replace the message 3 buffer with the second MAC PDU. At step 3845, the wireless device may send (e.g., transmit) the second MAC PDU in a message 3 via the uplink grant. At step 3850, the wireless device may copy the first MAC PDU into a message 3 buffer, for example, if the new data arrives before the BSR validation timer expires. At step 3855, the wireless device may send (e.g., transmit) the first MAC PDU in a message 3 via the uplink grant.

Figure 38B:
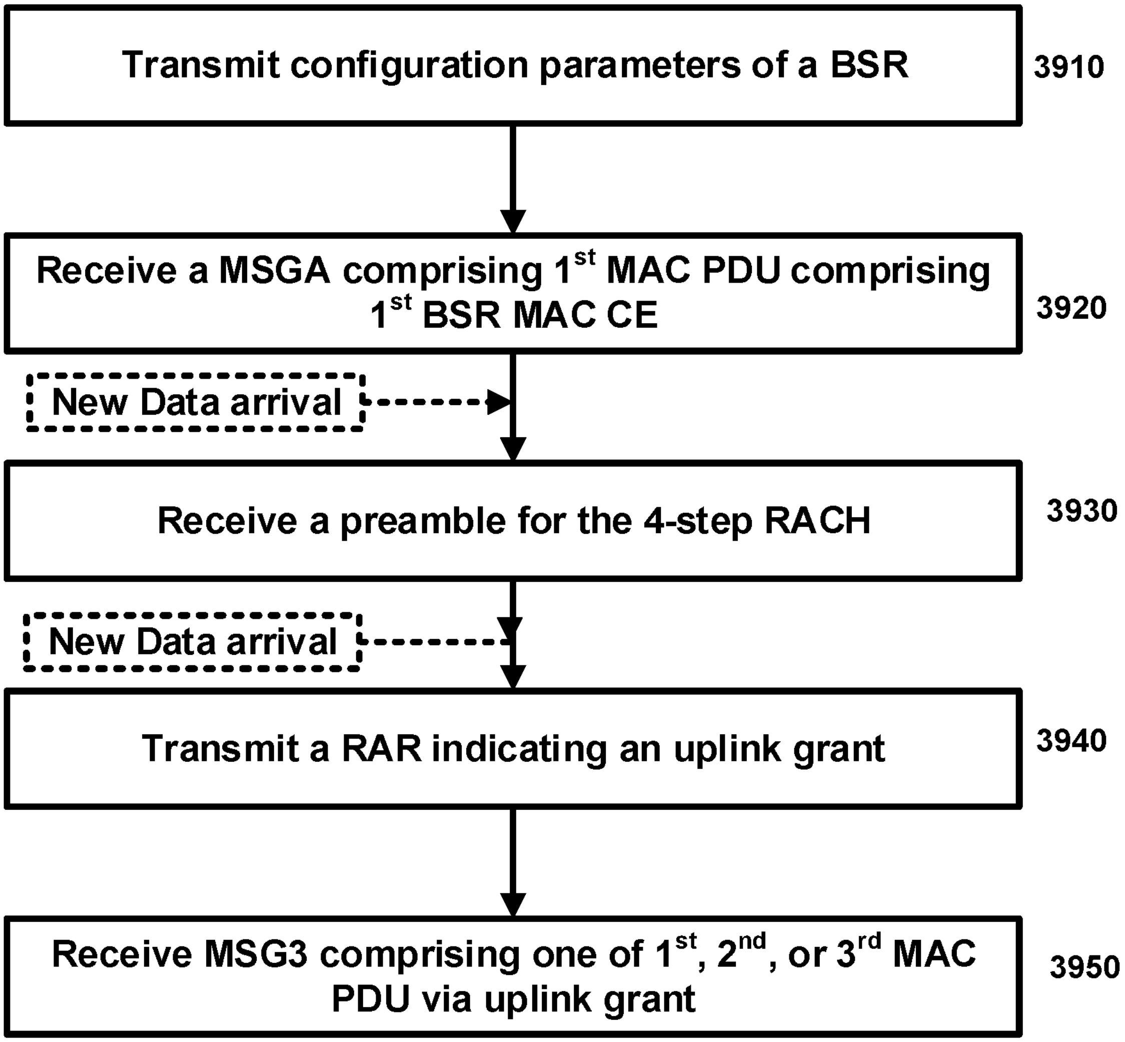
FIG. 38B shows an example method for performing random access-based buffer status reporting procedure.

The features as described herein with FIG. 37 and FIG. 38A/FIG. 38B may be combined. At step 3735 of FIG. 37, the wireless device may determine whether the uplink grant can accommodate all available data, for example, after the wireless device determines that the BSR validation timer expired earlier than the arrival of new data at step 3835 of FIG. 38A. The wireless device may perform, after performing the steps 3835 and 3735, either the steps 3740-3745 or the steps 3750-3755.

A wireless device may send (e.g., transmit) (e.g., to a base station) RRC messages comprising configuration parameters of wireless device capability (or assistance) information for a BSR. The configuration parameters may indicate a value for the BSR size threshold (or a message 3 buffer size threshold) used for determining whether a new BSR MAC CE could be generated based on (e.g., after or in response to) new data arriving after the wireless device transmits an old BSR MAC CE (via a message A of 2-step RA) and before the wireless device transmits a message 3 of a 4-step RA.

A wireless device may send (e.g., transmit) to a base station RRC messages comprising configuration parameters of wireless device capability information for a BSR. The configuration parameters may indicate whether the wireless device supports regeneration of a BSR MAC CE based on (e.g., after or in response to) new data arriving after the wireless device has already sent (e.g., transmitted) the BSR MAC CE via an RA (e.g., 2-step and/or 4-step) procedure in an NTN. The wireless device may generate a new BSR MAC CE based on (e.g., after or in response to) new data arriving after the wireless device has already sent (e.g., transmitted) the BSR MAC CE and if the wireless device has not completed the RA procedure (e.g., has not sent or transmitted a Message 3), for example, based on (e.g., after or in response to) the regeneration of the BSR MAC CE being supported in the RA procedure. The wireless device may reuse the old BSR MAC CE based on (e.g., after or in response to) new data arriving after the wireless device has already sent (e.g., transmitted) the BSR MAC CE and the wireless device has not completed the RA procedure (e.g., has not sent or transmitted a Message 3), for example, based on (e.g., after or in response to) the regeneration of the BSR MAC CE not being supported in the RA procedure.

A wireless device may send (e.g., transmit) to a base station RRC messages comprising configuration parameters of wireless device capability (or assistance) information for a BSR. The configuration parameters may indicate a (recommended/supported) timer value for a BSR validation timer. The wireless device may use the BSR validation timer to determine whether the wireless device may generate a new BSR MAC CE based on (e.g., after or in response to) new data arriving after the wireless device has already sent (e.g., transmitted) the BSR MAC CE via an RA (e.g., 2-step and/or 4-step) procedure and before the wireless device transmits a message 3 of a 4-step RA in an NTN.

The wireless device may generate a new BSR MAC CE for new data arriving within a time window, for example, if the BSR validation timer is running. The new BSR MAC CE may indicate an updated volume of uplink data comprising: the initial data triggering the BSR, and the new data arriving before the BSR validation timer expires. The wireless device may dump (or flush) a message 3 buffer and/or copy the new BSR MAC CE into the message 3 buffer. The wireless device may send (e.g., transmit) the new BSR MAC CE (comprised in a new MAC PDU) in a message 3 to the base station. The wireless device may not generate a new BSR MAC CE, for example, for new data arriving after the BSR validation timer expires. The wireless device may copy the MAC PDU (comprising the old BSR MAC CE) into the message 3 buffer. The wireless device may send (e.g., transmit) the same MAC PDU in a message 3 to the base station.

In FIG. 36, FIG. 37, and/or FIG. 38A/FIG. 38B, a wireless device may trigger an RA procedure on one or more RACH resources dedicatedly configured for a BSR. The wireless device may send (e.g., transmit) a MSGA comprising aa MAC PDU comprising BSR MAC CE indicating a volume of uplink data available for uplink transmission. The wireless device may determine that new data are available after the wireless device transmits the MSGA. The wireless device may determine whether to generate a new MAC PDU (e.g., second MAC PDU) comprising a new BSR MAC CE (e.g., second BSR MAC CE) based on one or more criteria comprising at least one of: a BSR validation timer, a BSR size threshold, a size of the uplink grant, or a wireless device capability, etc. The wireless device implementing the features as described herein may reduce power consumption of a wireless device, and/or transmission latency of uplink data delivery.

A wireless device may receive (e.g., detect), from a base station, configuration parameters of an RA procedure associated with a BSR. The configuration parameters comprise a timer value of an RA delay trigger timer for the BSR. The wireless device may trigger the BSR based on (e.g., after or in response to) uplink data being available. The wireless device may start the RA delay trigger timer based on the timer value and based on (e.g., after or in response to) the triggering the BSR. The wireless device may initiate the RA procedure associated with the BSR, based on (e.g., after or in response to) an expiry of the RA delay trigger timer. The wireless device may send (e.g., transmit), based on (e.g., after or in response to) initiating the RA procedure, a message comprising a preamble and a BSR MAC CE based on a volume of the uplink data.

The RA procedure may be a 2-step RA type. The message may comprise the preamble and the BSR MAC CE based on (e.g., after or in response to) the RA procedure being the 2-step RA type. The configuration parameters may indicate/determine: one or more RACH resources associated with the RA procedure for the BSR, and one or more PUSCH resources associated with the RA procedure for the BSR. The sending (e.g., transmitting) the message may comprise sending (e.g., transmitting) the preamble via at least one of the one or more RACH resources and sending (e.g., transmitting) the BSR MAC CE via at least one of the one or more PUSCH resources.

The wireless device may refrain from initiating the RA procedure during a time period in which the RA delay trigger timer is running. The wireless device may initiate the RA procedure based on (e.g., after or in response to) uplink radio resource not being available for transmission of the uplink data. The BSR MAC CE may comprise a field indicating the volume of the uplink data. The wireless device may initiate the RA procedure based on (e.g., after or in response to) configured uplink grant(s) being configured for the wireless device, and the BSR being triggered for a logical channel with a logical channel mask parameter being set to a first value. The first value may indicate “false” and/or the like. The logic channel mask parameter may be configured in the configuration parameters.

The wireless device may initiate the RA procedure based on (e.g., after or in response to) a logical channel, triggering the BSR, not being allowed to be associated with available uplink radio resources. The wireless device may send (e.g., transmit) a MAC PDU comprising the BSR MAC CE based on (e.g., after or in response to) the BSR being triggered and not being cancelled, uplink radio resources being available and the uplink radio resources accommodating the BSR MAC CE plus the BSR MAC CE’s subheader. The wireless device may stop the RA procedure associated with the BSR, based on (e.g., after or in response to) at least one of: sending (e.g., transmitting) a MAC PDU comprising the uplink data via first uplink radio resources or a MAC PDU comprising the BSR MAC CE which contains buffer status up to a last event that triggered the BSR prior to a MAC PDU assembly.

The first uplink radio resources may be different from at least one of: second uplink radio resources indicated by a random access response corresponding to a second preamble or third uplink radio resources associated with the transmission of the message. The second preamble may be associated with a 4-step RA procedure. The wireless device may switch from a 2-step RA procedure to the 4-step RA procedure based on (e.g., after or in response to) a message transmission counter for transmission of the message being greater than a threshold. The wireless device may send (e.g., transmit) the second preamble based on (e.g., after or in response to) switching from the 2-step RA procedure to the 4-step RA procedure for the BSR. The wireless device may monitor a downlink control channel for receiving the random access response corresponding to the second preamble. The wireless device may stop the RA procedure associated with the BSR, based on (e.g., after or in response to) uplink radio resources accommodating pending data available for uplink transmission.

A wireless device may receive (e.g., detect) configuration parameters of an RA procedure associated with a BSR. The wireless device may trigger the BSR based on (e.g., after or in response to) uplink data being available. The wireless device may initiate the RA procedure associated with the BSR. The wireless device may send (e.g., transmit), based on (e.g., after or in response to) initiating the RA procedure, a message comprising a preamble and a BSR MAC CE based on a volume of the uplink data. The wireless device may receive (e.g., detect) a response to the message. The wireless device may cancel the triggered BSR based on (e.g., after or in response to) receiving the response. The RA procedure may be a 2-step RA type. The message may comprise the preamble sent (e.g., transmitted) via a RACH resource and the BSR MAC CE sent (e.g., transmitted) via a PUSCH resource. The response may be a DCI message via a PDCCH transmission. The response may be an RAR MAC CE. The wireless device may complete the RA procedure based on (e.g., after or in response to) receiving the response. The wireless device may cancel the triggered BSR based on (e.g., after or in response to) completing the RA procedure for the triggered BSR.

A wireless device may receive (e.g., detect) configuration parameters of RACH resources associated with a BSR. The wireless device may trigger the BSR based on (e.g., after or in response to) uplink data being available. The wireless device may initiate an RA procedure based on (e.g., after or in response to) triggering the BSR and the RACH resources being associated with the BSR. The wireless device may send (e.g., transmit) a preamble via at least one of the RACH resources. The wireless device may receive (e.g., detect) an uplink grant before receiving a random access response corresponding to the preamble. The wireless device may send (e.g., transmit), via the uplink grant, a BSR MAC CE indicating a volume of the uplink data. The wireless device may stop the RA procedure based on (e.g., after or in response to) the sending (e.g., transmitting) the BSR MAC CE.

A wireless device may receive (e.g., detect) configuration parameters of RACH resources associated with a BSR. The wireless device may trigger the BSR based on (e.g., after or in response to) uplink data being available. The wireless device may initiate an RA procedure based on (e.g., after or in response to) triggering the BSR and the RACH resources being associated with the BSR. The wireless device may send (e.g., transmit) a preamble via at least one of the RACH resources. The wireless device may receive (e.g., detect) an uplink grant before receiving a random access response corresponding to the preamble. The wireless device may send (e.g., transmit) the uplink data via the uplink grant. The wireless device may stop the RA procedure based on (e.g., after or in response to) the sending (e.g., transmitting) the uplink grant. Stopping the RA procedure may comprise at least one of stopping monitoring PDCCH transmission for receiving the random access response, stopping sending (e.g., transmitting) the preamble, or the like.

A wireless device may receive (e.g., detect) configuration parameters of a BSR associated with an RA procedure, wherein the configuration parameters comprise a timer value of a BSR validation timer. The wireless device may start the BSR validation timer based on (e.g., after or in response to) triggering the BSR based on (e.g., after or in response to) first uplink data being available. The wireless device may send (e.g., transmit), based on (e.g., after or in response to) initiating the RA procedure with a 2-step RA type, a first message comprising a first BSR MAC CE based on a volume of the first uplink data. The wireless device may continue, based on (e.g., after or in response to) switching from the 2-step RA type to a 4-step RA type, the RA procedure comprising sending (e.g., transmitting) a preamble. The wireless device may send (e.g., transmit), via an uplink grant indicated in a random access response corresponding to the preamble, a second message comprising a second BSR MAC CE. The second BSR MAC CE may indicate a second volume of second uplink data and the first uplink data. The second uplink data may arrive after the BSR validation timer expires. The wireless device may send (e.g., transmit) to a base station RRC messages comprising configuration parameters of wireless device capability (or assistance) information for a BSR. The configuration parameters may indicate a (recommended/supported) timer value for the BSR validation timer.

A wireless device may start a BSR validation timer based on (e.g., after or in response to) triggering a BSR based on (e.g., after or in response to) first uplink data being available. The wireless device may send (e.g., transmit), based on (e.g., after or in response to) initiating an RA procedure with a 2-step RA type for the BSR, a first message comprising a first BSR MAC CE. The wireless device may continue, based on (e.g., after or in response to) switching from the 2-step RA type to a 4-step RA type, the RA procedure comprising sending (e.g., transmitting) a preamble. The wireless device may determine that second data arrives after the BSR validation timer expires. The wireless device may send (e.g., transmit), via an uplink grant indicated in an RAR corresponding to the preamble, a second message comprising a second BSR MAC CE based on (e.g., after or in response to) a total volume of the first uplink data and second uplink data arriving after the BSR validation timer expires.

A wireless device may start a BSR validation timer based on (e.g., after or in response to) triggering a BSR based on (e.g., after or in response to) first uplink data being available. The wireless device may send (e.g., transmit), based on (e.g., after or in response to) initiating an RA procedure with a 2-step RA type for the BSR, a first message comprising a first BSR MAC CE. The wireless device may continue, based on (e.g., after or in response to) switching from the 2-step RA type to a 4-step RA type, the RA procedure comprising sending (e.g., transmitting) a preamble. The wireless device may determine second data arrives before the BSR validation timer expires. The wireless device may send (e.g., transmit), via an uplink grant indicated in an RAR corresponding to the preamble, a second message comprising the first BSR MAC CE based on (e.g., after or in response to) the second uplink data arriving before the BSR validation timer expires.

A wireless device may start a BSR validation timer based on (e.g., after or in response to) triggering a BSR based on (e.g., after or in response to) first uplink data being available. The wireless device may send (e.g., transmit), based on (e.g., after or in response to) initiating an RA procedure with a 2-step RA type for the BSR, a first message comprising a first BSR MAC CE. The wireless device may continue, based on (e.g., after or in response to) switching from the 2-step RA type to a 4-step RA type, the RA procedure comprising sending (e.g., transmitting) a preamble. The wireless device may determine second data arrives. The wireless device may determine whether to generate a second BSR MAC CE based on whether the second data arrives after an expiry of the BSR validation timer.

The wireless device may reuse the first BSR MAC CE if the second data arrives before the expiry of the BSR validation timer. The wireless device may send (e.g., transmit), via an uplink grant indicated in an RAR corresponding to the preamble, a second message comprising the first BSR MAC CE, for example, after second data arriving before the expiry of the BSR validation timer. The wireless device may generate a second BSR MAC CE indicating a total volume of the first uplink data and the second uplink data, for example, based on (e.g., after or in response to) the second data arriving after the expiry of the BSR validation timer. The wireless device may send (e.g., transmit), via an uplink grant indicated in an RAR corresponding to the preamble, a second message comprising the second BSR MAC CE.

The wireless device may create/generate a second BSR MAC CE if the second data arrives before the expiry of the BSR validation timer. The wireless device may be able to generate a new MAC CE (e.g., before actual transmission of the MAC CE), for example, based on wireless device's capability, for example, based on (e.g., after or in response to) the second data arriving before the expiry of the BSR validation timer. The wireless device may generate a second BSR MAC CE indicating a total volume of the first uplink data and the second uplink data. The wireless device may send (e.g., transmit), via an uplink grant indicated in an RAR corresponding to the preamble, a second message comprising the second BSR MAC CE. The wireless device may not be able to create the second BSR MAC CE reflecting the data volume of the second uplink data (e.g., due to wireless device's capability), for example, based on (e.g., after or in response to) the second data arriving after the expiry of the BSR validation timer. The wireless device may reuse a latest MAC CE (e.g., the first MAC CE, or a third MAC CE generated before the expiry of the BSR validation timer) for transmission. The wireless device may send (e.g., transmit), via an uplink grant indicated in an RAR corresponding to the preamble, a second message comprising the first BSR MAC CE (or the third MAC CE).

A wireless device may receive (e.g., detect) configuration parameters of an RA procedure associated with a BSR, wherein the configuration parameters comprise a BSR size threshold. The wireless device may trigger a BSR based on (e.g., after or in response to) first uplink data being available. The wireless device may send (e.g., transmit), based on (e.g., after or in response to) initiating an RA procedure with a 2-step RA type for the BSR, a first message comprising a first BSR MAC CE. The wireless device may continue, based on (e.g., after or in response to) switching from the 2-step RA type to a 4-step RA type, the RA procedure comprising sending (e.g., transmitting) a preamble. The wireless device may determine second data arrives. The wireless device may send (e.g., transmit), via an uplink grant indicated in an RAR corresponding to the preamble, a second message comprising the first BSR MAC CE based on (e.g., after or in response to) a volume of the second data being less than the BSR size threshold.

The wireless device may send (e.g., transmit) to a base station RRC messages comprising configuration parameters of wireless device capability (or assistance) information for a BSR. The configuration parameters may indicate a value for the BSR size threshold used for determining whether a new BSR MAC CE is generated based on (e.g., after or in response to) new data arriving after the wireless device transmits an old BSR MAC CE (via a message A of 2-step RA) and before the wireless device transmits a message 3 of a 4-step RA.

A wireless device may receive (e.g., detect) configuration parameters of an RA procedure associated with a BSR, wherein the configuration parameters indicate that a MAC PDU is allowed to be regenerated for the RA procedure and the BSR. The wireless device may trigger a BSR based on (e.g., after or in response to) first uplink data being available. The wireless device may send (e.g., transmit), based on (e.g., after or in response to) initiating an RA procedure with a 2-step RA type for the BSR, a first message comprising a first BSR MAC CE. The wireless device may continue, based on (e.g., after or in response to) switching from the 2-step RA type to a 4-step RA type, the RA procedure comprising sending (e.g., transmitting) a preamble. The wireless device may determine that second uplink data arrives after the wireless device transmits the first BSR MAC CE. The wireless device may send (e.g., transmit), based on the configuration parameters and via an uplink grant indicated in an RAR corresponding to the preamble, a second message comprising a second BSR MAC CE based on (e.g., after or in response to) second uplink data arriving after sending (e.g., transmitting) the first BSR MAC CE.

The wireless device may send (e.g., transmit) to a base station RRC messages comprising configuration parameters of wireless device capability information for a BSR. The configuration parameters may indicate whether the wireless device supports regeneration of a BSR MAC CE based on (e.g., after or in response to) new data arriving after the wireless device has already sent (e.g., transmitted) the BSR MAC CE via an RA (e.g., 2-step and/or 4-step) procedure in an NTN. The wireless device may generate a new BSR MAC CE based on (e.g., after or in response to) new data arriving after the wireless device has already sent (e.g., transmitted) the BSR MAC CE and the wireless device has not completed the RA procedure (e.g., has not sent or transmitted a Message 3), for example, based on (e.g., after or in response to) the regeneration of the BSR MAC CE being supported in the RA procedure. The wireless device may reuse the old BSR MAC CE based on (e.g., after or in response to) new data arriving after the wireless device has already sent (e.g., transmitted) the BSR MAC CE and the wireless device has not completed the RA procedure (e.g., has not sent or transmitted a Message 3), for example, based on (e.g., after or in response to) the regeneration of the BSR MAC CE not being supported in the RA procedure.

FIG. 38B shows an example method for performing random access-based buffer status reporting procedure. At step 3910, a base station may send (e.g., transmit to a wireless device) one or more messages (e.g., RRC message) comprising configuration parameters of a BSR (e.g., based on examples as described herein with respect to FIG. 25A and/or FIG. 25B). The configuration parameters may be implemented based on examples as described herein with respect to FIG. 33. At step 3920, the base station may receive a message A (e.g., MSGA, comprising a preamble and first MAC PDU) from the wireless device, for example, if an RA procedure (e.g., a 2-step RA type) is triggered based on (e.g., after or in response to) triggering a BSR. The first MAC PDU may comprise first BSR MAC CE indicating a volume of data (e.g., uplink data associated with a logical channel being available for uplink transmission). The first MAC PDU may comprise a timber value for a BSR validation timer, which may be used by the wireless device. The BSR validation timer may be used to determine whether the wireless device may generate a new BSR MAC CE based on (e.g., after or in response to) new uplink data arriving after the wireless device has already sent (e.g., transmitted) the BSR MAC CE via an RA (e.g., 2-step and/or 4-step) procedure and before the wireless device transmits a message 3 of a 4-step RA in an NTN.

At step 3930, the base station may receive a preamble for a 4-step RACH from the wireless device switching from the 2-step RA type to a 4-step RA type to continue the RA procedure for the triggered BSR. At step 3940, the base station may send (e.g., transmit) an RAR message comprising an uplink grant. At step 3950, the base station may receive a message (e.g., MSG3 from the wireless device), via the uplink grant, for example, comprising MAC PDU. The MAC PDU may be first MAC PDU comprising the first BSR MAC CE, for example, if new uplink data arrived earlier than the expiry of the BSR validation timer. The MAC PDU may be second MAC PDU comprising the initial uplink data and the new uplink data, for example, if the uplink grant accommodates all available data. The MAC PDU may be third MAC PDU comprising a new BSR MAC CE and the new uplink data, for example, if the uplink grant is not accommodating all available data. The third MAC PDU may comprise partial of the initial uplink data and/or the new uplink data based on (e.g., after or in response to) a remaining size of the uplink grant after including the new BSR MAC CE into the third MAC PDU.

A wireless device may perform a method comprising multiple operations. The wireless device may receive configuration parameters for random access (RA) associated with buffer status reporting. The wireless device may trigger, based on data being available for uplink transmission, a buffer status report (BSR) and may initiate an RA procedure associated with the BSR. The wireless device may initiate the RA procedure based on uplink radio resource not being available for the uplink transmission. The RA procedure may be a 2-step RA procedure. The wireless device may transmit a message associated with the RA procedure. The message may comprise a preamble and a medium access control control element (MAC CE) associated with the BSR. The MAC CE associated with the BSR may comprise a field indicating a quantity of the data being available for the uplink transmission. The wireless device may transmit the message by transmitting the preamble via at least one random access channel (RACH) resource indicated by the configuration parameters; and transmitting the MAC CE associated with the BSR via at least one physical uplink shared channel (PUSCH) resource indicated by the configuration parameters. The wireless device may maintain the BSR at least until after the earliest of receiving a response to the message and expiration of a random access response window. The wireless device may receive the configuration parameters indicating a value of an RA delay trigger timer. The wireless device may receive the configuration parameters indicating one or more RACH resources associated with the RA procedure for the BSR; and one or more physical uplink shared channel (PUSCH) resources associated with the RA procedure for the BSR. The wireless device may, based on the BSR being triggered, start the RA delay trigger timer. The wireless device may refrain from initiating the RA procedure during a time period when the RA delay trigger timer is running. The wireless device may initiate, based on an expiry of the RA delay trigger timer, the RA procedure associated with the BSR. The wireless device may initiate the RA procedure based on a configured uplink grant being configured for the wireless device and the BSR being triggered for a logical channel with a logical channel mask parameter being set to a first value. The first value may indicate false. The logic channel mask parameter may be configured in the configuration parameters. The wireless device may initiate the RA procedure based on a logical channel, triggering the BSR, not being allowed to be mapped to available uplink radio resources. The wireless device may transmit a MAC protocol data unit (PDU) comprising the BSR MAC CE based on the BSR being triggered, the BSR not being cancelled, uplink radio resources being available, and the uplink radio resources accommodating the BSR MAC CE plus the BSR MAC CE's subheader.

The wireless device may receive an uplink grant before receiving the response to the message. The wireless device may transmit, via the uplink grant, a second medium access control control element (MAC CE), associated with the BSR, indicating a quantity of the data, and may stop the RA procedure based on the second MAC CE being transmitted. The wireless device may stop the RA procedure associated with the BSR, based on at least one of transmitting a MAC PDU comprising the uplink data via first uplink radio resources, and the MAC PDU comprising the BSR MAC CE which contains buffer status up to a last event that triggered the BSR prior to a MAC PDU. The first uplink radio resources may be different from at least one of: second uplink radio resources indicated by a random access response corresponding to a second preamble; and third uplink radio resources associated with the transmitting the message. The second preamble may be associated with a 4-step RA procedure. The wireless device may switch from a 2-step RA procedure to the 4-step RA procedure based on a message transmission counter for the transmitting the message being greater than a threshold. The wireless device may transmit the second preamble based on switching from the 2-step RA procedure to the 4-step RA procedure for the BSR. The wireless device may monitor a downlink control channel for receiving the random access response corresponding to the second preamble. The wireless device may stop the RA procedure associated with the BSR, based on uplink radio resources accommodating all pending data available for uplink transmission. The wireless device may maintain the BSR by at least one of keeping the BSR pending or storing the data in a buffer. The wireless device may cancel the BSR based on the response to the message.

The wireless device may receive configuration parameters of a random access (RA) procedure associated with a buffer status report (BSR), trigger the BSR based on uplink data being available, and initiate the RA procedure associated with the BSR. The wireless device may transmit, based on initiating the RA procedure, a message comprising a preamble and a BSR medium access control control element (MAC CE) based on a quantity of the uplink data, wherein the BSR is kept pending, receive a response to the message; and cancel the triggered BSR based on receiving the response.

The wireless device may receive configuration parameters of random access channel (RACH) resources associated with a buffer status report (BSR), trigger the BSR based on uplink data being available, initiate a random access (RA) procedure based on triggering the BSR, and the RACH resources being associated with the BSR. The wireless device may transmit, via at least one of the RACH resources, a preamble, receive an uplink grant before receiving a random access response corresponding to the preamble, transmit, via the uplink grant, a BSR medium access control control element (MAC CE) indicating a quantity of the uplink data, and stop the RA procedure based on the transmitting the BSR MAC CE.

The wireless device may receive configuration parameters of random access channel (RACH) resources associated with a buffer status report (BSR), trigger the BSR based on uplink data being available, initiate a random access (RA) procedure based on triggering the BSR; and the RACH resources being associated with the BSR. The wireless device may transmit, via at least one of the RACH resources, a preamble, receive an uplink grant before receiving a random access response corresponding to the preamble, transmit the uplink data via the uplink grant; and stop the RA procedure based on the transmitting the uplink data.

The wireless device may receive configuration parameters of a random access (RA) procedure associated with a buffer status report (BSR). The configuration parameters may comprise a timer value of a BSR validation timer. The wireless device may start the BSR validation timer based on triggering the BSR based on first uplink data being available, transmit, based on initiating the RA procedure with a 2-step RA type, a first message comprising a first BSR medium access control control element (MAC CE) based on a quantity of the first uplink data, continue, based on switching from the 2-step RA type to a 4-step RA type, the RA procedure comprising transmitting a preamble, and transmit, via an uplink grant indicated in a random access response corresponding to the preamble, a second message comprising a second BSR MAC CE. The second BSR MAC CE may be based on a second quantity of second uplink data and the first uplink data. The second uplink data may arrive after the BSR validation timer expires.

The wireless device may start a buffer status report (BSR) validation timer based on triggering a BSR based on first uplink data being available, transmit, based on initiating a random access (RA) procedure with a 2-step RA type for the BSR, a first message comprising a first BSR medium access control control element (MAC CE), and continue, based on switching from the 2-step RA type to a 4-step RA type, the RA procedure comprising transmitting a preamble. Second data may arrive after the BSR validation timer expires. The wireless device may transmit, via an uplink grant indicated in a random access response corresponding to the preamble, a second message comprising a second BSR MAC CE based on a total quantity of the first uplink data, and second uplink data arriving after the BSR validation timer expires.

The wireless device may start a buffer status report (BSR) validation timer based on triggering a BSR based on first uplink data being available, transmit, based on initiating a random access (RA) procedure with a 2-step RA type for the BSR, a first message comprising a first BSR medium access control control element (MAC CE), and continue, based on switching from the 2-step RA type to a 4-step RA type, the RA procedure comprising transmitting a preamble. Second data may arrive before the BSR validation timer expires. The wireless device may transmit, via an uplink grant indicated in a random access response corresponding to the preamble, a second message comprising the first BSR MAC CE based on second uplink data arriving before the BSR validation timer expires.

The wireless device may receive configuration parameters of a random access (RA) procedure associated with a buffer status report (BSR). The configuration parameters may comprise a BSR size threshold. The wireless device may trigger a BSR based on first uplink data being available, transmit, based on initiating a random access (RA) procedure with a 2-step RA type for the BSR, a first message comprising a first BSR medium access control control element (MAC CE). The wireless device may continue, based on switching from the 2-step RA type to a 4-step RA type, the RA procedure comprising transmitting a preamble. Second data may arrive after a BSR validation timer expires. The wireless device may transmit, via an uplink grant indicated in a random access response corresponding to the preamble, a second message comprising the first BSR MAC CE based on a quantity of the second data being less than the BSR size threshold.

The wireless device may receive configuration parameters of a random access (RA) procedure associated with a buffer status report (BSR). The configuration parameters may indicate that a MAC PDU is allowed to be regenerated during the RA procedure for the BSR. The wireless device may trigger a BSR based on first uplink data being available, and transmit, based on initiating the RA procedure with a 2-step RA type for the BSR, a first message comprising a first BSR medium access control control element (MAC CE). The wireless device may continue, based on switching from the 2-step RA type to a 4-step RA type, the RA procedure comprising transmitting a preamble, and transmit, based on the configuration parameters and via an uplink grant indicated in a random access response corresponding to the preamble, a second message comprising a second BSR MAC CE based on second uplink data arriving after transmitting the first BSR MAC CE.

The wireless device may receive configuration parameters of a random access (RA) procedure associated with a buffer status report (BSR). The configuration parameters may comprise a timer value of a RA delay trigger timer for the BSR. The wireless device may trigger the BSR based on uplink data being available, and start the RA delay trigger timer based on the timer value and the BSR triggered. The wireless device may initiate the RA procedure associated with the BSR, based on an expiry of the RA delay trigger timer, and transmit, based on the initiating the RA procedure, a message comprising a preamble and a BSR medium access control control element (MAC CE) based on a quantity of the uplink data.

A wireless device may perform a method comprising multiple operations. The wireless device may receive configuration parameters for random access (RA) associated with buffer status reporting. The wireless device may trigger, based on data being available for uplink transmission, buffer status reporting (BSR). The wireless device may transmit a message associated for an RA procedure associated with the BSR. The RA procedure may be a 2-step RA procedure. The message may comprise a preamble and a medium access control control element (MAC CE) comprising a buffer status report. The MAC CE may comprise a field indicating a quantity of the data being available for the uplink transmission. The wireless device may transmit the message by transmitting the preamble via at least one random access channel (RACH) resource indicated by the configuration parameters, and transmitting the MAC CE via at least one physical uplink shared channel (PUSCH) resource indicated by the configuration parameters. The wireless device may keep the BSR triggered at least until after the earliest of receiving a response to the message and expiration of a random access response window.

The wireless device may receive the configuration parameters indicating a value of an RA delay trigger timer. The wireless device may receive the configuration parameters indicating one or more RACH resources for the RA procedure associated with the BSR; and one or more physical uplink shared channel (PUSCH) resources for the RA procedure associated with the BSR. The wireless device may, based on the BSR being triggered, start the RA delay trigger timer. The wireless device may refrain from initiating the RA procedure during a time period when the RA delay trigger timer is running. The wireless device may initiate, based on an expiry of the RA delay trigger timer, the RA procedure for the BSR. The wireless device may initiate the RA procedure based on a configured uplink grant being configured for the wireless device and the BSR being triggered for a logical channel with a logical channel mask parameter being set to a first value. The first value may indicate false. The logic channel mask parameter may be configured in the configuration parameters. The wireless device may initiate the RA procedure based on a logical channel, triggering the BSR, not being allowed to be mapped to available uplink radio resources. The wireless device may transmit a MAC protocol data unit (PDU) comprising the BSR MAC CE based on the BSR being triggered, the BSR triggered not being cancelled, uplink radio resources being available, and the uplink radio resources accommodating the BSR MAC CE plus the BSR MAC CE's subheader.

The wireless device may receive an uplink grant before receiving the response to the message. The wireless device may transmit, via the uplink grant, a second medium access control control element (MAC CE), associated with the BSR, indicating a quantity of the data, and may stop the RA procedure based on the second MAC CE being transmitted. The wireless device may stop the RA procedure associated with the BSR, based on at least one of transmitting a MAC PDU comprising the uplink data via first uplink radio resources, and the MAC PDU comprising the BSR MAC CE which contains buffer status up to a last event that triggered the BSR prior to a MAC PDU. The first uplink radio resources may be different from at least one of: second uplink radio resources indicated by a random access response corresponding to a second preamble; and third uplink radio resources associated with the transmitting the message. The second preamble may be associated with a 4-step RA procedure. The wireless device may switch from a 2-step RA procedure to the 4-step RA procedure based on a message transmission counter for the transmitting the message being greater than a threshold. The wireless device may transmit the second preamble based on switching from the 2-step RA procedure to the 4-step RA procedure for the BSR. The wireless device may monitor a downlink control channel for receiving the random access response corresponding to the second preamble. The wireless device may stop the RA procedure associated with the BSR, based on uplink radio resources accommodating all pending data available for uplink transmission. The wireless device may keep the BSR triggered by at least one of maintaining the BSR triggered, keeping the BSR triggered pending or storing the data in a buffer. The wireless device may cancel the BSR triggered based on the response to the message.

The wireless device may receive configuration parameters of a random access (RA) procedure associated with buffer status reporting (BSR), trigger the BSR based on uplink data being available. The wireless device may transmit a message for an RA procedure, the message comprising a preamble and a BSR medium access control control element (MAC CE) based on a quantity of the uplink data, wherein the BSR triggered is kept pending, receive a response to the message; and cancel the BSR triggered based on receiving the response.

The wireless device may receive configuration parameters of random access channel (RACH) resources associated with buffer status reporting (BSR), trigger the BSR based on uplink data being available, initiate a random access (RA) procedure for the BSR, and the RACH resources being associated the BSR. The wireless device may transmit, via at least one of the RACH resources, a preamble, receive an uplink grant before receiving a random access response corresponding to the preamble, transmit, via the uplink grant, a BSR medium access control control element (MAC CE) indicating a quantity of the uplink data, and stop the RA procedure based on the transmitting the BSR MAC CE.

The wireless device may receive configuration parameters of random access channel (RACH) resources associated with buffer status reporting (BSR), trigger the BSR based on uplink data being available, initiate a random access (RA) procedure based on triggering the BSR; and the RACH resources being associated with the BSR. The wireless device may transmit, via at least one of the RACH resources, a preamble, receive an uplink grant before receiving a random access response corresponding to the preamble, transmit the uplink data via the uplink grant; and stop the RA procedure based on the transmitting the uplink data.

The wireless device may receive configuration parameters of a random access (RA) procedure associated with buffer status reporting (BSR). The configuration parameters may comprise a timer value of a buffer status report validation timer. The wireless device may start the buffer status report validation timer based on triggering the BSR based on first uplink data being available, transmit, based on initiating the RA procedure with a 2-step RA type, a first message comprising a first BSR medium access control control element (MAC CE) based on a quantity of the first uplink data, continue, based on switching from the 2-step RA type to a 4-step RA type, the RA procedure comprising transmitting a preamble, and transmit, via an uplink grant indicated in a random access response corresponding to the preamble, a second message comprising a second BSR MAC CE. The second BSR MAC CE may be based on a second quantity of second uplink data and the first uplink data. The second uplink data may arrive after the buffer status report validation timer expires.

The wireless device may start a buffer status report validation timer based on triggering buffer status reporting (BSR) based on first uplink data being available, transmit, based on initiating a random access (RA) procedure with a 2-step RA type for the BSR, a first message comprising a first BSR medium access control control element (MAC CE), and continue, based on switching from the 2-step RA type to a 4-step RA type, the RA procedure comprising transmitting a preamble. Second data may arrive after the buffer status report validation timer expires. The wireless device may transmit, via an uplink grant indicated in a random access response corresponding to the preamble, a second message comprising a second BSR MAC CE based on a total quantity of the first uplink data, and second uplink data arriving after the buffer status report validation timer expires.

The wireless device may start a buffer status report validation timer based on triggering buffer status reporting (BSR) based on first uplink data being available, transmit, based on initiating a random access (RA) procedure with a 2-step RA type for the BSR, a first message comprising a first BSR medium access control control element (MAC CE), and continue, based on switching from the 2-step RA type to a 4-step RA type, the RA procedure comprising transmitting a preamble. Second data may arrive before the buffer status report validation timer expires. The wireless device may transmit, via an uplink grant indicated in a random access response corresponding to the preamble, a second message comprising the first BSR MAC CE based on second uplink data arriving before the buffer status report validation timer expires.

The wireless device may receive configuration parameters of a random access (RA) procedure associated with buffer status reporting (BSR). The configuration parameters may comprise a buffer status report size threshold. The wireless device may trigger a BSR based on first uplink data being available, transmit, based on initiating a random access (RA) procedure with a 2-step RA type for the BSR, a first message comprising a first BSR medium access control control element (MAC CE). The wireless device may continue, based on switching from the 2-step RA type to a 4-step RA type, the RA procedure comprising transmitting a preamble. Second data may arrive after a buffer status report validation timer expires. The wireless device may transmit, via an uplink grant indicated in a random access response corresponding to the preamble, a second message comprising the first BSR MAC CE based on a quantity of the second data being less than the buffer status report size threshold.

The wireless device may receive configuration parameters of a random access (RA) procedure associated with buffer status reporting (BSR). The configuration parameters may indicate that a MAC PDU is allowed to be regenerated during the RA procedure for the BSR. The wireless device may trigger the BSR based on first uplink data being available, and transmit, based on initiating the RA procedure with a 2-step RA type for the BSR, a first message comprising a first BSR medium access control control element (MAC CE). The wireless device may continue, based on switching from the 2-step RA type to a 4-step RA type, the RA procedure comprising transmitting a preamble, and transmit, based on the configuration parameters and via an uplink grant indicated in a random access response corresponding to the preamble, a second message comprising a second BSR MAC CE based on second uplink data arriving after transmitting the first BSR MAC CE.

The wireless device may receive configuration parameters of a random access (RA) procedure associated with buffer status reporting (BSR). The configuration parameters may comprise a timer value of a RA delay trigger timer for the BSR. The wireless device may trigger the BSR based on uplink data being available, and start the RA delay trigger timer based on the timer value and the BSR triggered. The wireless device may initiate the RA procedure associated with the BSR, based on an expiry of the RA delay trigger timer, and transmit, based on the initiating the RA procedure, a message comprising a preamble and a BSR medium access control control element (MAC CE) based on a quantity of the uplink data.

The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A base station may transmit configuration parameters for random access (RA) associated with buffer status reporting, wherein based on data being available for uplink transmission, buffer status reporting (BSR) is triggered, the RA delay trigger timer is started after the BSR being triggered, and an RA procedure for the BSR is initiated. The configuration parameters indicate a value of an RA delay trigger timer. The base station may receive, based on an expiry of the RA delay trigger timer, a message associated with the RA procedure. The RA procedure may be a 2-step RA procedure. The message may comprise a preamble, and a medium access control control element (MAC CE) comprising a buffer status report. The message may indicate a quantity of the data being available for the uplink transmission. The base station may transmit a response to the message before cancellation of the BSR triggered. The base station may receive the preamble via at least one random access channel (RACH) resource indicated by the configuration parameters; and may receive the MAC CE via at least one physical uplink shared channel (PUSCH) resource indicated by the configuration parameters. The MAC CE associated with the BSR may comprise a field indicating a quantity of the data being available for the uplink transmission. The base station may transmit an uplink grant before transmitting a response to the message; and receive, via the uplink grant, a second medium access control control element (MAC CE), associated with the BSR, indicating a quantity of the data, and based on the receiving the second MAC CE, stop the RA procedure.

The base station may receive a message for an RA procedure associated with the BSR, wherein the message comprises a preamble. The base station may transmit an uplink grant before transmitting a random access response corresponding to the preamble. The base station may receive, via the uplink grant, a BSR medium access control control element (MAC CE) indicating a quantity of the data being available for the uplink transmission. The base station may stop the RA procedure based on the BSR MAC CE received. The base station may transmit configuration parameters indicating a value of an RA delay trigger timer. The base station may receive the message based on an expiry of the RA delay trigger timer that is started after the BSR is triggered. The base station may receive the preamble via at least one random access channel (RACH) resource indicated by the configuration parameters. The base station may receive the BSR MAC CE via at least one physical uplink shared channel (PUSCH) resource indicated by the configuration parameters.

The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a wireless device configured to send the at least one resource assignment. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a wireless device, configuration parameters for random access (RA) associated with buffer status reporting;

based on data being available for uplink transmission, triggering buffer status reporting (BSR);

transmitting a message for an RA procedure associated with the BSR, wherein the message comprises:

a preamble; and a medium access control control element (MAC CE) comprising a buffer status report; and keeping the BSR triggered at least until after the earliest of:

receiving a response to the message; and expiration of a random access response window.

2. The method of claim 1, wherein the configuration parameters indicate a value of an RA delay trigger timer, and wherein the method further comprises:

based on the triggering the BSR, starting the RA delay trigger timer; and initiating the RA procedure based on an expiry of the RA delay trigger timer.

3. The method of claim 1, further comprising:

receiving an uplink grant before receiving the response to the message; and transmitting, via the uplink grant, a second medium access control control element (MAC CE), associated with the BSR, indicating a quantity of the data; and based on the transmitting the second MAC CE, stopping the RA procedure.

4. The method of claim 1, wherein the keeping the BSR triggered comprises at least one of:
maintaining the BSR triggered;
keeping the BSR pending; or
storing the data in a buffer.

5. The method of claim 1, further comprising:
receiving a response to the message; and
based on the receiving the response to the message, cancelling the BSR triggered.

6. The method of claim 1, wherein the RA procedure is a 2-step RA procedure.

7. The method of claim 1, wherein the transmitting the message comprises:
transmitting the preamble via at least one random access channel (RACH) resource indicated by the configuration parameters; and
transmitting the MAC CE via at least one physical uplink shared channel (PUSCH) resource indicated by the configuration parameters.

8. The method of claim 1, wherein the MAC CE comprises a field indicating a quantity of the data being available for the uplink transmission.

9. The method of claim 1, wherein the wireless device initiates the RA procedure based on uplink radio resource not being available for the uplink transmission.

10. A method comprising:
receiving, by a wireless device, configuration parameters for random access (RA) associated with buffer status reporting, wherein the configuration parameters comprise a value of a RA delay trigger timer;
based on data being available for uplink transmission, triggering buffer status reporting (BSR);
based on the triggering the BSR, starting the RA delay trigger timer;
based on an expiry of the RA delay trigger timer, initiating an RA procedure associated with the BSR; and
transmitting a message for the RA procedure, wherein the message comprises:
a preamble; and
a medium access control control element (MAC CE) comprising a buffer status report.

11. The method of claim 10, further comprising keeping the BSR triggered at least until after the earliest of:
receiving a response to the message; and
expiration of a random access response window.

12. The method of claim 10, wherein the RA procedure is a 2-step RA procedure.

13. The method of claim 10, wherein the transmitting the message comprises:
transmitting the preamble via at least one random access channel (RACH) resource indicated by the configuration parameters; and
transmitting the MAC CE via at least one physical uplink shared channel (PUSCH) resource indicated by the configuration parameters.

14. The method of claim 10, further comprising:
receiving a response to the message; and
based on the receiving the response to the message, cancelling the BSR triggered.

15. The method of claim 10, further comprising:
receiving an uplink grant before receiving a response to the message; and
transmitting, via the uplink grant, a second medium access control control element (MAC CE), associated with the BSR, indicating a quantity of the data; and
based on the transmitting the second MAC CE, stopping the RA procedure.

16. The method of claim 10, wherein the MAC CE associated with the BSR comprises a field indicating a quantity of the data being available for the uplink transmission.

17. A method comprising:
receiving, by a wireless device, configuration parameters for random access (RA) associated with buffer status reporting;
based on data being available for uplink transmission, triggering buffer status reporting (BSR);
transmitting a message for an RA procedure associated with the BSR, wherein the message comprises a preamble;
receiving an uplink grant before receiving a random access response corresponding to the preamble;
transmitting, via the uplink grant, a BSR medium access control control element (MAC CE) indicating a quantity of the data being available for the uplink transmission; and
based on the transmitting the BSR MAC CE, stopping the RA procedure.

18. The method of claim 17, further comprising keeping the BSR triggered at least until after the earliest of:
receiving a response to the message; and
expiration of a random access response window.

19. The method of claim 17, wherein the configuration parameters indicate a value of an RA delay trigger timer, and wherein the method further comprises:
based on the triggering the BSR, starting the RA delay trigger timer; and
initiating the RA procedure based on an expiry of the RA delay trigger timer.

20. The method of claim 17, wherein the transmitting the message comprises:
transmitting the preamble via at least one random access channel (RACH) resource indicated by the configuration parameters; and
transmitting the BSR MAC CE via at least one physical uplink shared channel (PUSCH) resource indicated by the configuration parameters.

* * * * *